United States Patent
Tamura et al.

(10) Patent No.: US 10,355,630 B2
(45) Date of Patent: Jul. 16, 2019

(54) INVERTER CONTROL DEVICE

(71) Applicant: Hitachi Automotive Systems, Ltd., Hitachinaka-shi, Ibaraki (JP)

(72) Inventors: Hiroshi Tamura, Tokyo (JP); Hiroyuki Yamada, Hitachinaka (JP); Shigeyuki Nonomura, Hitachinaka (JP); Hirokazu Matsui, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/571,881

(22) PCT Filed: Apr. 28, 2016

(86) PCT No.: PCT/JP2016/063306
§ 371 (c)(1),
(2) Date: Nov. 6, 2017

(87) PCT Pub. No.: WO2016/181851
PCT Pub. Date: Nov. 17, 2016

(65) Prior Publication Data
US 2018/0138845 A1 May 17, 2018

(30) Foreign Application Priority Data
May 12, 2015 (JP) .................................. 2015-096994

(51) Int. Cl.
*H02P 21/00* (2016.01)
*H02P 21/22* (2016.01)
(Continued)

(52) U.S. Cl.
CPC ............... *H02P 21/22* (2016.02); *H02P 6/10* (2013.01); *H02P 6/28* (2016.02); *B62D 5/046* (2013.01)

(58) Field of Classification Search
None
See application file for complete search history.

(56) References Cited

U.S. PATENT DOCUMENTS

2011/0214934 A1* 9/2011 Ueda .................... B62D 5/046
180/446
2013/0106332 A1 5/2013 Williams et al.
(Continued)

FOREIGN PATENT DOCUMENTS

JP 2003-259698 A 9/2003
JP 2004-120814 A 4/2004
(Continued)

OTHER PUBLICATIONS

International Search Report (PCT/ISA/210) issued in PCT Application No. PCT/JP2016/063306 dated Aug. 16, 2016 with English translation (Four (4) pages).
(Continued)

*Primary Examiner* — Eduardo Colon Santana
*Assistant Examiner* — Zemenay T Truneh
(74) *Attorney, Agent, or Firm* — Crowell & Moring LLP

(57) ABSTRACT

An object of the invention is to correct a variation of a gain of a current sensor without causing an increase in size and a high cost of an inverter control device. An inverter control device according to the invention includes a 3-phase/dq-axis conversion unit which converts the output current detected by a current sensor into a dq-axis current and a gain adjustment unit which adjusts a detection gain of the current sensor for each phase. In a case where a current value of a secondary harmonic component contained in the dq-axis current is equal to or more than a predetermined threshold, the gain adjustment unit corrects the gain of the current sensor such that the current value of the secondary harmonic component becomes less than the threshold.

11 Claims, 26 Drawing Sheets

(51) Int. Cl.
*H02P 6/28* (2016.01)
*H02P 6/10* (2006.01)
*B62D 5/04* (2006.01)

(56) References Cited

U.S. PATENT DOCUMENTS

2014/0254217 A1    9/2014    Li et al.
2016/0028340 A1*  1/2016    Nakai .................... H02P 21/05
                                                          318/400.02

FOREIGN PATENT DOCUMENTS

JP        2004-274813 A    9/2004
JP        2013-187945 A    9/2013

OTHER PUBLICATIONS

Japanese-language Written Opinion Report (PCT/ISA/237) issued in PCT Application No. PCT/JP2016/063306 dated Aug. 16, 2016 (Four (4) pages).
Extended European Search Report issued in counterpart European Application No. 16792576.7 dated Dec. 5, 2018 (eight (8) pages).

* cited by examiner

INVERTER CONTROL DEVICE

TECHNICAL FIELD

The present invention relates to a control device of an on-vehicle inverter, and particularly to a method of correcting a detection gain of a motor current.

BACKGROUND ART

JP 2004-120814 A (PTL 1) is disclosed in the art to which the invention pertains. In the publication, there is described "there is provided an inverter which controls an electric motor, a current detection unit which is controlled by the inverter and detects currents of a plurality of phases flowing to windings of the electric motor, a current calculation unit which obtains at least one of a d-axis current (an excited current component) and a q-axis current (a torque current component) from the current detected by the current detection unit, a frequency component calculation unit which calculates a real-axis component or an imaginary-axis component of a secondary frequency when it is seen in an electrical angular frequency from at least one of the d-axis current and the q-axis current, and a unit which corrects a detection gain between a plurality of phases of the current detection unit from the real-axis component or the imaginary-axis component of the secondary frequency of at least one of the d-axis current and the q-axis current". With this configuration, a variation of the detection gain between the plurality of phases can be corrected, and thus a torque ripple of the motor can be reduced.

CITATION LIST

Patent Literature

PTL 1: JP 2004-120814 A

SUMMARY OF INVENTION

Technical Problem

A method disclosed in PTL 1 necessarily calculates the real-axis component or the imaginary-axis component of the secondary frequency when it is seen in the electrical angular frequency from at least one of the d-axis current and the q-axis current using a phase difference between the current and the voltage of the motor when the variation of the detection gain between the plurality of phases is corrected. However, a specific acquisition method of the phase difference is not disclosed in PTL 1. In addition, there may be a need to provide an additional voltage sensor to detect a voltage of the motor, for example, in order to acquire the phase difference. Further, there is also need to provide an additional memory to store the value of the real-axis component or the imaginary-axis component in advance according to the phase difference between the voltage and the current of the motor. In other words, in PTL 1, there is a need to provide the additional voltage sensor and memory in order to correct the variation of the detection gain between the plurality of phases, and there is a problem in that an inverter and an inverter control device are increased in size and require a high cost.

An object of the invention is to correct a variation of a gain of a current sensor without causing an increase in size and a high cost of an inverter control device.

Solution to Problem

An inverter control device according to the invention controls an output current of a 3-phase AC motor, and includes a 3-phase/dq-axis conversion unit which converts the output current detected by a current sensor into a dq-axis current and a gain adjustment unit which adjusts a detection gain of the current sensor for each phase. In a case where a current value of a secondary harmonic component contained in the dq-axis current is equal to or more than a predetermined threshold, the gain adjustment unit adjusts the detection gain such that the current value of the secondary harmonic component becomes less than the threshold, and corrects a variation of a gain of the current sensor.

Advantageous Effects of Invention

An inverter control device according to the invention can correct a variation of a gain of a current sensor without causing an increase in size and a high cost of a device.

DESCRIPTION OF EMBODIMENTS

Figure 1:
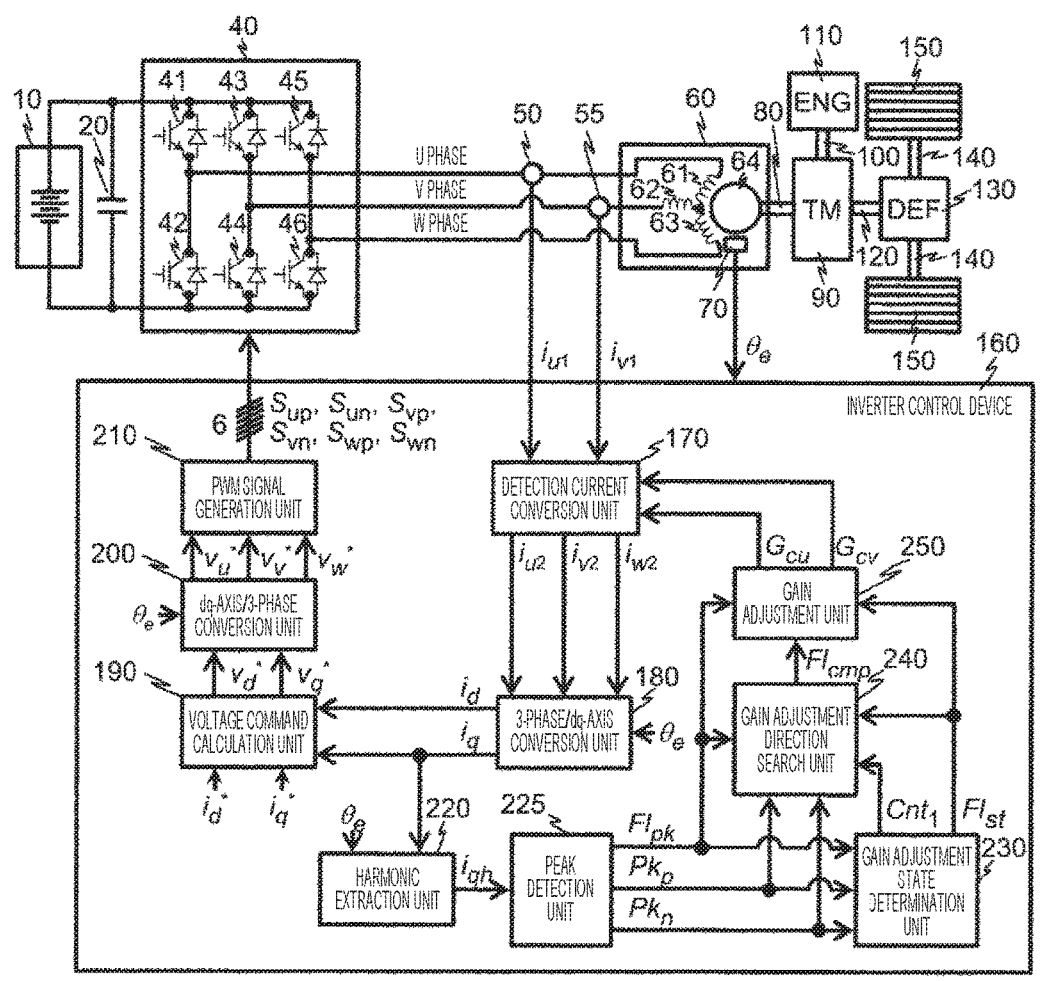
FIG. 1 is a diagram for describing a vehicle system according to a first embodiment.

Hereinafter, embodiments of a power conversion device according to the invention will be described with reference to the drawings. Further, the same components in the respective drawings will be denoted with the same reference numerals, and the redundant description thereof will be omitted.

First Embodiment

FIG. 1 is a diagram for describing a vehicle system according to a first embodiment. The vehicle system according to this embodiment includes a battery 10, a smoothing capacitor 20, an inverter 40, a U-phase current sensor 50, a V-phase current sensor 55, a motor 60, an angle sensor 70, an output shaft 80 of the motor 60, a transmission 90, a crank shaft 100, an engine 110, a propeller shaft 120, a differential gear 130, a drive shaft 140, a driving wheel 150, and an inverter control device 160.

The battery 10 is connected to the smoothing capacitor 20 in parallel on a DC side of the inverter 40, and supplies a DC voltage to the inverter 40. The U phase of the inverter 40 is connected to a U-phase winding 61 of the motor 60 through the U-phase current sensor 50. The V phase of the inverter 40 is connected to a V-phase winding 62 of the motor 60 through the V-phase current sensor 55. The W phase of the inverter 40 is connected to a W-phase winding 63 of the motor 60. Herein, the description will be given about a configuration that the current sensors are attached to the U phase and the V phase, but the configuration may be a 2-phase current detection system in which the current sensors are attached to the U phase and the W phase or the V phase and the W phase.

In addition, the inverter 40 turns on or off the switching elements 41 to 46 of the upper and lower arms of the respective phases on the basis of PWM signals Sup, Sun, Svp, Svn, Swp, and Swn generated by the inverter control device 160, and converts the DC voltage supplied from the battery 10 into 3-phase AC voltages having variable voltage and variable frequency. Then, the inverter 40 applies the converted 3-phase AC voltages to 3-phase windings 61 to 63 wound around a stator of the motor 60, and causes the 3-phase windings 61 to 63 wound around the stator of the motor 60 to generate 3-phase AC currents. The motor 60 generates a rotating magnetic field by the 3-phase AC currents flowing to the 3-phase windings 61 to 63 wound around the stator, accelerates or decelerates the rotor 64 by the generated rotating magnetic field, and generates torque of the motor 60.

A main circuit of the inverter 40 according to this embodiment includes switching elements 41 to 46. The switching elements 41 to 46 are configured by combining an insulated gate bipolar transistor (IGBT) or a metal oxide film field effect transistor (MOSFET) with a diode. In the following, the description will be given on an assumption of the main circuit of the inverter 40 in which the IGBT and the diode are applied to the switching elements 41 to 46. Further, a circuit configuration of the inverter 40 according to this embodiment is well known, and thus the detailed description herein will be omitted. The switching element 41 of the U-phase upper arm of the inverter 40 turns on or off on the basis of the PWM signal Sup generated by the inverter control device 160. Similarly, the switching elements 42, 43, 44, 45, and 46 turn on or off on the basis of the PWM signals Sun, Svp, Svn, Swp, and Swn respectively.

The inverter control device 160 according to this embodiment includes a detection current conversion unit 170, a 3-phase/dq-axis conversion unit 180, a voltage command calculation unit 190, a dq-axis/3-phase conversion unit 200, a PWM signal generation unit 210, a harmonic extraction unit 220, a peak detection unit 225, a gain adjustment state determination unit 230, a gain adjustment direction search unit 240, and a gain adjustment unit 250.

The inverter control device 160 inputs a U-phase current iu1 detected by the U-phase current sensor 50, a V-phase current iv1 detected by the V-phase current sensor 55, a U-phase detection gain Gcu adjusted by the gain adjustment unit 250 described below, and a V-phase detection gain Gcv to the detection current conversion unit 170. The inverter control device 160 corrects a variation of a gain Gsu of the U-phase current sensor 50 and a gain Gsv of the V-phase current sensor 55, and newly calculates a U-phase current iu2, a V-phase current iv2, and a W-phase current iw2. The inverter control device 160 inputs the UVW-phase currents iu2, iv2, and iw2 calculated by the detection current conversion unit 170, and the electrical angle θe of the rotor 64 of the motor 60 detected by the angle sensor 70 to the 3-phase/dq-axis conversion unit 180, and calculates a d-axis current id and a q-axis current iq.

The inverter control device 160 inputs the q-axis current iq calculated by the 3-phase/dq-axis conversion unit 180 and the electrical angle θe of the rotor 64 of the motor 60 detected by the angle sensor 70 to the harmonic extraction unit 220, and calculates a harmonic current having two times the electrical angular frequency fe of the rotor 64 of the motor 60 which is contained in the q-axis current iq (or the d-axis current id). The inverter control device 160 inputs a q-axis harmonic current iqh (or a d-axis harmonic current idh) calculated by the harmonic extraction unit 220 to the peak detection unit 225, detects a positive peak value Pkp and a negative peak value Pkn of the q-axis harmonic current (or the d-axis harmonic current), and generates a peak detection flag Flpk which is turned on only when the positive and negative peak values Pkp and Pkn are detected. The inverter control device 160 inputs the positive and negative peak values Pkp and Pkn of the q-axis harmonic current (or the d-axis harmonic current) generated by the peak detection unit 225 and the peak detection flag Flpk to the gain adjustment state determination unit 230, and generates an adjustment state determination flag Flst which determines an adjustment state (search of an adjustment direction, adjustment start, adjustment continuation, adjustment end, reset) of the U-phase detection gain Gcu and the V-phase detection gain Gcv. In addition, the inverter control device 160 generates a first count value Cnt1 which is counted down only when the peak detection flag Flpk is turned on in a state where the adjustment state determination flag Flst indicates "Search".

The inverter control device 160 inputs the positive and negative peak values Pkp and Pkn of the q-axis harmonic current (or the d-axis harmonic current) generated by the peak detection unit 225, the peak detection flag Flpk, the adjustment state determination flag Flst generated by the gain adjustment state determination unit 230, and the first count value Cnt1 to the gain adjustment direction search unit 240, and generates an adjustment direction determination flag Flcmp which is used to determine a direction (whether to increase a positive direction or to increase a negative direction) to adjust the U-phase detection gain Gcu and the V-phase detection gain Gcv. Further, the inverter control device 160 inputs the peak detection flag Flpk generated by the peak detection unit 225, the adjustment state determination flag Flst generated by the gain adjustment state determination unit 230, and the adjustment direction determination flag Flcmp generated by the gain adjustment direction search unit 240 to the gain adjustment unit 250, and adjusts the U-phase detection gain Gcu and the V-phase detection gain Gcv to balance a variation of the gain Gsu of the U-phase current sensor 50 and the gain Gsv of the V-phase current sensor 55.

Then, the inverter control device 160 inputs the d-axis current id and the q-axis current iq calculated by the 3-phase/dq-axis conversion unit 180, and a d-axis current command id* and a q-axis current command iq* to the voltage command calculation unit 190, and generates a d-axis voltage command vd* and a q-axis voltage command vq*. The inverter control device 160 inputs the d-axis voltage command vd* and the q-axis voltage command vq* generated by the voltage command calculation unit 190, and the electrical angle θe of the rotor of the motor 60 detected by the angle sensor 70 to the dq-axis/3-phase conversion unit 200, and generates a U-phase voltage command vu*, a V-phase voltage command vv*, and a W-phase voltage command vw*. The inverter control device 160 inputs the U-phase voltage command vu*, the V-phase voltage command vv*, and the W-phase voltage command vw* calculated by the dq-axis/3-phase conversion unit 200 to the PWM signal generation unit 210, and generates the PWM signals Sup, Sun, Svp, Svn, Swp, and Swn which control turning on and off of the IGBTs of the switching elements 41 to 46 of the upper and lower arms of the respective phases of the inverter 40.

In the following, the description will be given about a case where the harmonic current iqh having two times the electrical angular frequency fe of the rotor 64 of the motor 60 which is contained in the q-axis current iq is used, but the harmonic current idh having two times the electrical angular frequency fe of the rotor 64 of the motor 60 which is contained in the d-axis current id may be used.

(Description of Process of Detection Current Conversion Unit 170)

Figure 2:
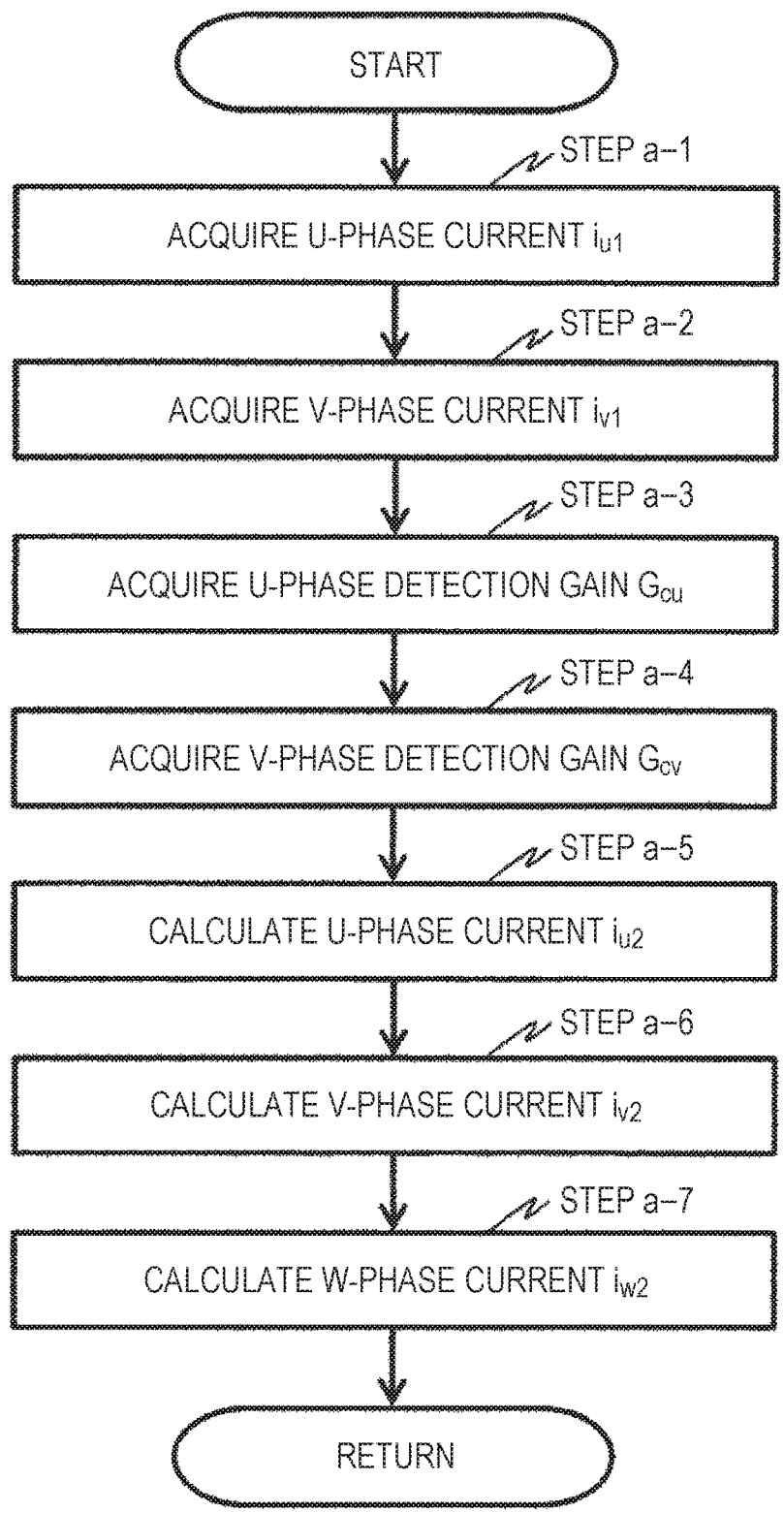
FIG. 2 is a diagram for describing a processing procedure of a detection current conversion unit 170.

FIG. 2 is a diagram for describing a processing procedure of the detection current conversion unit 170. First, the detection current conversion unit 170 acquires the U-phase current iu1 detected by the U-phase current sensor 50 and the V-phase current iv1 detected by the V-phase current sensor 55 in Steps a-1 and a-2. Next, the detection current conversion unit 170 acquires the U-phase detection gain Gcu and the V-phase detection gain Gcv adjusted by the gain adjustment unit 250 (described below) in Steps a-3 and a-4. Next, the detection current conversion unit 170 substitutes the U-phase current iu1 acquired in Step a-1 and the U-phase detection gain Gcu acquired in Step a-3 into Expression (1) and calculates the U-phase current iu2 in Step a-5.

[Math. 1]

$$i_{u2} = i_{u1} G_{cu} \tag{1}$$

Herein, the U-phase current iu1 acquired in Step a-1 is represented by Expression (2) using a true U-phase current iut flowing to the U-phase winding 61 of the motor 60 and the gain Gsu of the U-phase current sensor 50.

[Math. 2]

$$i_{u1} = i_{ut} G_{su} \tag{2}$$

Therefore, the U-phase current iu2 can be represented by Expression (3) by substituting Expression (2) into Expression (1).

[Math. 3]

$$i_{u2} = i_{u1} G_{cu} = i_{ut} G_{su} G_{cu} \tag{3}$$

Next, the detection current conversion unit 170 substitutes the V-phase current iv1 acquired in Step a-2 and the V-phase detection gain Gcv acquired in Step a-4 into Expression (4) and calculates the V-phase current iv2 in Step a-6.

[Math. 4]

$$i_{v2} = i_{v1} G_{cv} \tag{4}$$

Herein, the V-phase current iv1 acquired in Step a-2 is defined by Expression (5) using a true V-phase current ivt flowing to the V-phase winding 62 of the motor 60 and the gain Gsv of the V-phase current sensor 55.

[Math. 5]

$$i_{v1} = i_{vt} G_{sv} \tag{5}$$

Therefore, the V-phase current iv2 can be represented by Expression (6) by substituting Expression (5) into Expression (4).

[Math. 6]

$$i_{v2} = i_{v1} G_{cv} = i_{vt} G_{sv} G_{cv} \tag{6}$$

Next, the detection current conversion unit 170 substitutes the U-phase current iu2 calculated in Step a-5 and the V-phase current iv2 calculated in Step a-6 into Expression (7) and calculates the W-phase current iw2 in Step a-7.

[Math. 7]

$$i_{w2} = -i_{u2} - i_{v2} \quad (7)$$

While the details will be described below, the gain adjustment unit 250 adjusts the values of the U-phase detection gain Gcu and the V-phase detection gain Gcv such that the multiplied value of the gain Gsu of the U-phase current sensor 50 and the U-phase detection gain Gcu shown in Expression (3) and the multiplied value of the gain Gsv of the V-phase current sensor 55 and the V-phase detection gain Gcv shown in Expression (6) become equal. In this way, a variation of the gains of the current sensors 50 and 55 of the UV phases can be corrected by adjusting the U-phase detection gain Gcu and the V-phase detection gain Gcv.

(Description of Process of 3-Phase/Dq-Axis Conversion Unit 180)

Figure 3:
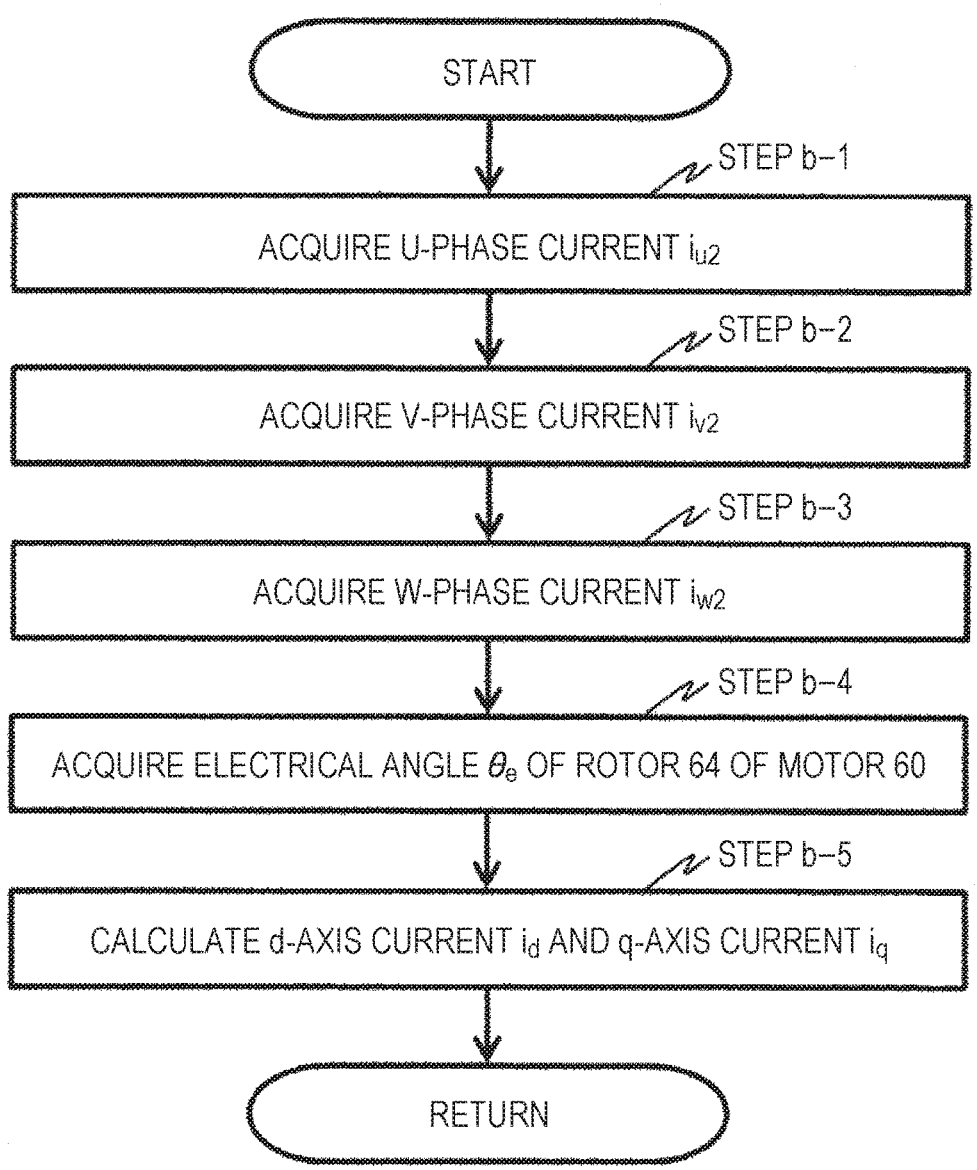
FIG. 3 is a diagram for describing a processing procedure of a 3-phase/dq-axis conversion unit 180.

FIG. 3 is a diagram for describing a processing procedure of the 3-phase/dq-axis conversion unit 180. First, the 3-phase/dq-axis conversion unit 180 acquires the U-phase current iu2, the V-phase current iv2, and the W-phase current iw2 calculated by the detection current conversion unit 170 in Steps b-1 to b-3. Next, the 3-phase/dq-axis conversion unit 180 acquires the electrical angle θe of the rotor 64 of the motor 60 detected by the angle sensor 70 in Step b-4.

Then, the 3-phase/dq-axis conversion unit 180 substitutes the U-phase current iu2, the V-phase current iv2, the W-phase current iw2, and the electrical angle θe of the rotor 64 of the motor 60 acquired in Steps b-1 to b-4 into Expression (8) and calculates the d-axis current id and the q-axis current iq in Step b-5.

[Math. 8]

$$\begin{bmatrix} i_d \\ i_q \end{bmatrix} = \sqrt{\frac{2}{3}} \begin{bmatrix} \cos\theta_e & \cos\left(\theta_e - \frac{2}{3}\pi\right) & \cos\left(\theta_e + \frac{2}{3}\pi\right) \\ -\sin\theta_e & -\sin\left(\theta_e - \frac{2}{3}\pi\right) & -\sin\left(\theta_e + \frac{2}{3}\pi\right) \end{bmatrix} \begin{bmatrix} i_{u2} \\ i_{v2} \\ i_{w2} \end{bmatrix} \quad (8)$$

(Description of Process of Harmonic Extraction Unit 220)

Figure 4:
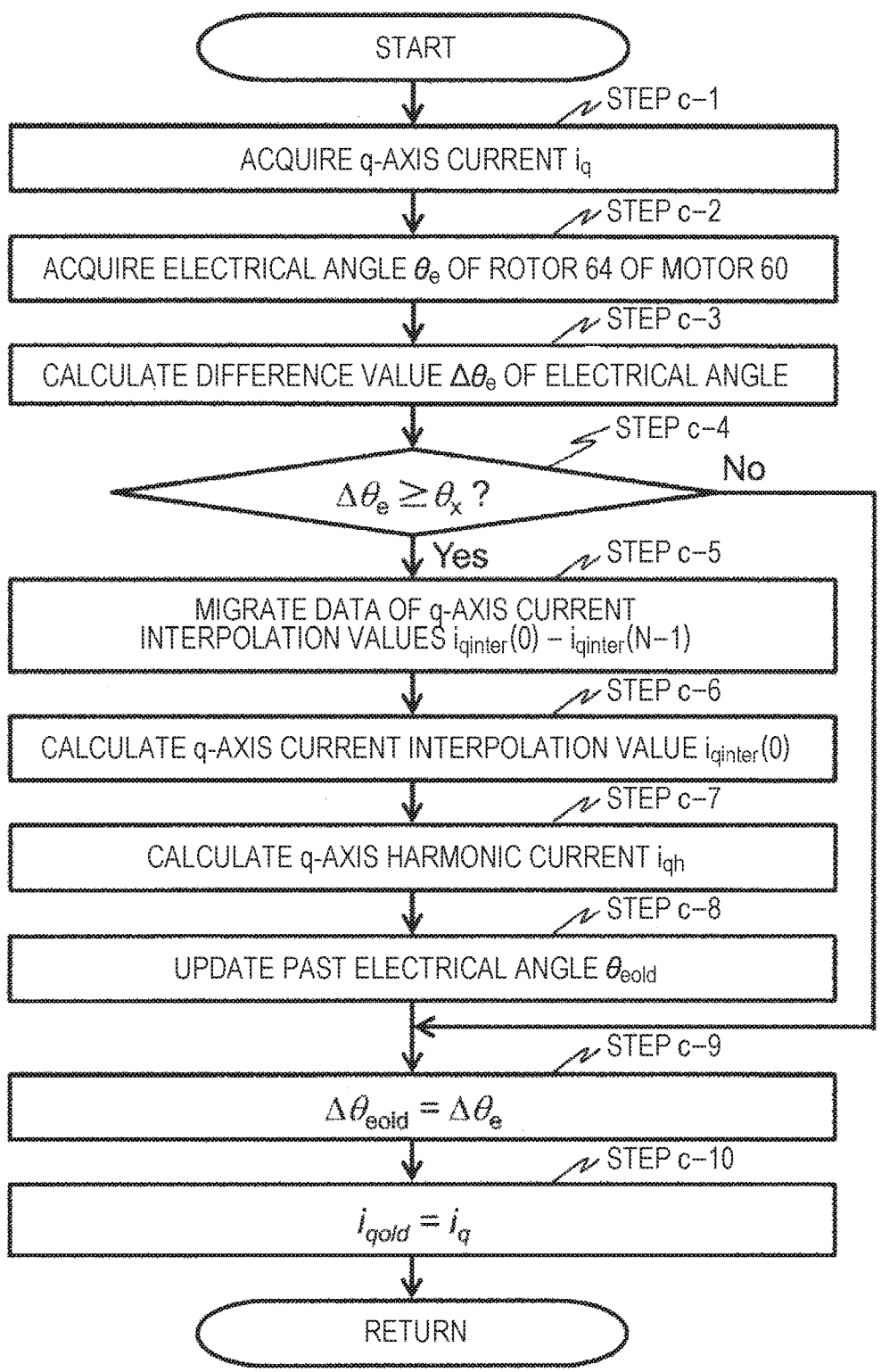
FIG. 4 is a diagram for describing a processing procedure of a harmonic extraction unit 220.

FIG. 4 is a diagram for describing a processing procedure of the harmonic extraction unit 220. First, the harmonic extraction unit 220 acquires the q-axis current iq calculated by the 3-phase/dq-axis conversion unit 180 in Step c-1. Next, the harmonic extraction unit 220 acquires the electrical angle θe of the rotor 64 of the motor 60 detected by the angle sensor in Step c-2. Next, the harmonic extraction unit 220 substitutes the newest electrical angle θe acquired in Step c-2 and a past electrical angle θeold calculated in Step c-8 (described below) into Expression (9) and calculates a difference value Δθe between the newest electrical angle θe and the past electrical angle θeold in Step c-3.

[Math. 9]

$$\Delta\theta_e = \theta_e - \theta_{eold} \quad (9)$$

In a case where the difference value Δθe of the electrical angle calculated in Expression (9) is a negative value, the harmonic extraction unit 220 substitutes the newest electrical angle θe and the past electrical angle θeold into Expression (10) and calculates the difference value Δθe of the newest electrical angle again in Step c-3.

[Math. 10]

$$\Delta\theta_e = \theta_e + 2\pi - \theta_{eold} \quad (10)$$

Next, the harmonic extraction unit 220 determines whether the difference value Δθe of the newest electrical angle calculated in Step c-3 is equal to or more than a predetermined value θx in Step c-4. Herein, the predetermined value θx is predetermined by Expression (11).

[Math. 11]

$$\theta_x = \frac{2\pi}{8+m} \quad (m = 0, 1, 2, \ldots) \quad (11)$$

In a case where it is determined that the difference value Δθe of the newest electrical angle is equal to or more than the predetermined value θx in Step c-4, the harmonic extraction unit 220 migrates data of q-axis current interpolation values iqinter(0) to iqinter(N−1) stored in a memory of a microcontroller in Step c-5. Specifically, the q-axis current interpolation value iqinter(N−1) which is the time-sequentially second oldest data is overwritten on the q-axis current interpolation value iqinter(N) which is the oldest data. Next, the q-axis current interpolation value iqinter(N−2) which is the third oldest data is overwritten on the q-axis current interpolation value iqinter(N−1) which is the second oldest data. In this way, the data of the q-axis current interpolation values iqinter(0) to iqinter(N−1) is migrated in a time-sequentially old order, and such a migration is stopped at a time point when the q-axis current interpolation value iqinter(0) which is the newest data is overwritten on the q-axis current interpolation value iqinter(1) which is the second newest data. Further, N is a value shown in Expression (12).

[Math. 12]

$$N = \frac{2\pi}{\theta_x} - 1 \quad (12)$$

Next, in Step c-6, the harmonic extraction unit 220 substitutes the newest q-axis current iq acquired in Step c-1, the difference value Δθe of the newest electrical angle calculated in Step c-3, a difference value Δθeold of the electrical angle calculated before one calculation cycle in Step c-9 (described below), a q-axis current iqold calculated before one calculation cycle in Step c-10 (described below), and the predetermined value θx into Expression (13), and calculates an interpolation value iqinter(0) of the q-axis current at a point where only the predetermined value θx is changed from the past electrical angle θeold calculated in Step c-8 (described below).

[Math. 13]

$$i_{qinter}(0) = \qquad (13)$$
$$(1-\alpha)i_{qold} + \alpha i_q = \left(1 - \frac{\theta_x - \Delta\theta_{eold}}{\Delta\theta_e - \Delta\theta_{eold}}\right)i_{qold} + \left(\frac{\theta_x - \Delta\theta_{eold}}{\Delta\theta_e - \Delta\theta_{eold}}\right)i_q$$

Next, in Step c-7, the harmonic extraction unit 220 substitutes the q-axis current interpolation values iqinter(0) to iqinter(N) of one cycle of the electrical angle θe of the rotor 64 of the motor 60 into Expression (14), and calculates the q-axis harmonic current iqh having two times the electrical angular frequency fe of the rotor 64 of the motor 60.

[Math. 14]

$$i_{qh} = \frac{\theta_x}{\pi} \sqrt{Re^2 + Im^2} \cos\left\{\tan^{-1}\left(\frac{Im}{Re}\right)\right\} \quad (14)$$

$$= \frac{\theta_x}{\pi} \sqrt{\left[\sum_{n=0}^{N}\{i_{qinter}(n)\cos(2n\theta_x)\}\right]^2 + \left[\sum_{n=0}^{N}\{i_{qinter}(n)\cdot-\sin(2n\theta_x)\}\right]^2}$$

$$\cos\left\{\tan^{-1}\left(\frac{Im}{Re}\right)\right\}$$

Then, in Step c-8, the harmonic extraction unit 220 substitutes the newest electrical angle θe acquired in Step c-2, the newest difference value Δθe calculated in Step c-3, and the predetermined value θx into Expression (15), and updates the value of the past electrical angle θeold.

[Math. 15]

$$\theta_{eold} = \theta_e - (\Delta\theta_e - \theta_x) \quad (15)$$

Herein, in a case where the past electrical angle θeold calculated by Expression (15) is a negative value, the harmonic extraction unit 220 substitutes the newest electrical angle θe acquired in Step c-2, the newest difference value Δθe calculated in Step c-3, and the predetermined value θx into Expression (16), and calculates the past electrical angle θeold again in Step c-8.

[Math. 16]

$$\theta_{eold} = \theta_e + 2\pi - (\Delta\theta_e - \theta_x) \quad (16)$$

Next, the harmonic extraction unit 220 sets the difference value Δθe of the newest electrical angle calculated in Step c-3 as the difference value θeold of the electrical angle before one calculation cycle in Step c-9. Next, the harmonic extraction unit 220 sets the q-axis current iq acquired in Step c-1 as the q-axis current iqold before one calculation cycle in Step c-10.

In addition, in Step c-4, in a case where it is determined that the difference value Δθe of the newest electrical angle is not equal to or more than the predetermined value θx, the harmonic extraction unit 220 performs processes of Steps c-9 and c-10 described above.

Figure 5:
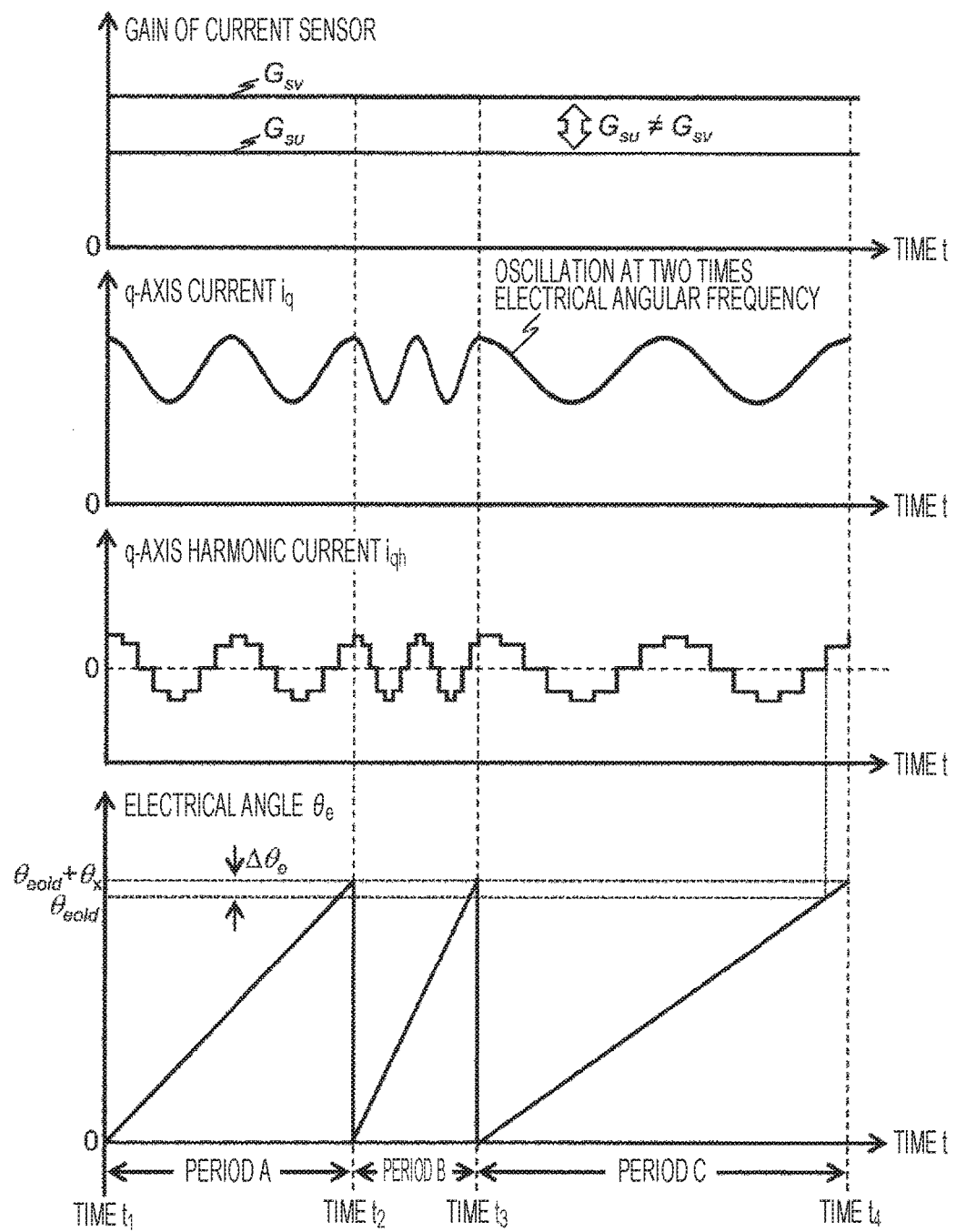
FIG. 5 is a diagram for describing a relation among a gain Gsu of a U-phase current sensor 50, a gain Gsv of a V-phase current sensor 55, a q-axis current iq calculated by the 3-phase/dq-axis conversion unit 180, an electrical angle θe of a rotor 64 of a motor 60, and a q-axis harmonic current iqh extracted by the process of FIG. 4.

FIG. 5 is a diagram for describing a relation among the gain Gsu of the U-phase current sensor 50, the gain Gsv of the V-phase current sensor 55, the q-axis current iq calculated by the 3-phase/dq-axis conversion unit 180, the electrical angle θe of the rotor 64 of the motor 60, and the q-axis harmonic current iqh extracted by the process of FIG. 4.

First, when the values of the gain Gsu of the U-phase current sensor and the gain Gsv of the V-phase current sensor are different, it can be seen that pulsations having two times the electrical angular frequency fe of the rotor 64 of the motor occurs in the q-axis current iq calculated by the 3-phase/dq-axis conversion unit 180. In addition, it can be seen that the q-axis current harmonic wave iqh is updated when the electrical angle θe is changed by the predetermined value ex from the past electrical angle θeold. In addition, in FIG. 5, an electrical angular frequency fe1 of the rotor 64 of the motor 60 in Period A from time t1 to time t2 is set by Expression (17).

[Math. 17]

$$f_{e1} = \frac{1}{t_2 - t_1} \quad (17)$$

Therefore, an electrical angle θe1 of the rotor 64 of the motor 60 in Period A is represented by Expression (18).

[Math. 18]

$$\theta_{e1} = 2\pi f_{e1} t \quad (18)$$

In addition, an electrical angular frequency fe2 of the rotor 64 of the motor 60 in Period B from time t2 to time t3 is set by Expression (19).

[Math. 19]

$$f_{e2} = \frac{1}{t_3 - t_2} \quad (19)$$

Therefore, an electrical angle θe2 of the rotor 64 of the motor 60 in Period B is represented by Expression (20).

[Math. 20]

$$\theta_{e2} = 2\pi f_{e2} t \quad (20)$$

In addition, an electrical angular frequency fe3 of the rotor 64 of the motor 60 in Period C from time t3 to time t4 is set by Expression (21).

[Math. 21]

$$f_{e3} = \frac{1}{t_4 - t_3} \quad (21)$$

Therefore, an electrical angle θe3 of the rotor 64 of the motor 60 in Period C is represented by Expression (22).

[Math. 22]

$$\theta_{e3} = 2\pi f_{e3} t \quad (22)$$

In addition, a magnitude relation among the electrical angular frequencies fe1 to fe3 of the rotor 64 of the motor 60 in Period A to Period C is set by Expression (23).

[Math. 23]

$$f_{e2} > f_{e1} > f_{e3} \quad (23)$$

From Expressions (17) to (23), with respect to a time required for the electrical angle θe of the rotor 64 of the motor 60 to be changed by the predetermined value θx from the past electrical angle θeold, it can be seen that Period B is the shortest, Period A is the next, and Period C is the longest. Therefore, with respect to a time interval of updating the q-axis harmonic current iqh, Period B is the shortest, Period A is the next, and Period C is the longest.

In this way, an update timing of the q-axis harmonic current iqh is determined on the basis of the change amount of the electrical angle θe. Therefore, even in a case where the electrical angular frequency fe of the rotor 64 of the motor 60 varies, the q-axis current harmonic current iqh can be extracted with a high accuracy.

(Description of Process of Peak Detection Unit 225)

Figure 6:
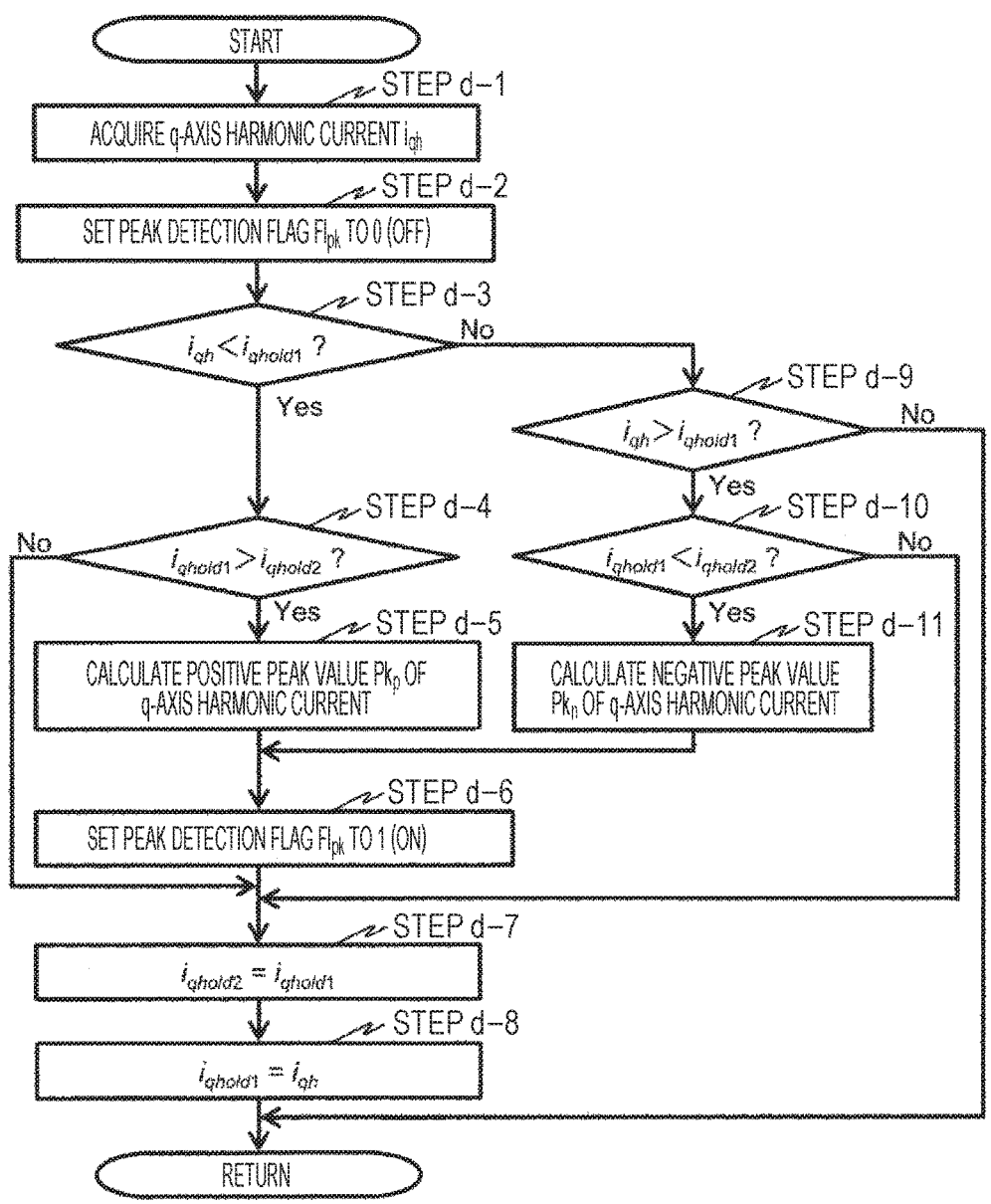
FIG. 6 is a diagram for describing a processing procedure of a peak detection unit 225.

FIG. 6 is a diagram for describing a processing procedure of the peak detection unit 225 according to the first embodiment. First, the peak detection unit 225 acquires the q-axis harmonic current iqh extracted by a harmonic extraction unit 220 in Step d-1. Next, the peak detection unit 225 sets the peak detection flag Flpk to "0" (off) in Step d-2.

Next, in Step d-3, the peak detection unit 225 determines whether the newest q-axis harmonic current iqh acquired in Step d-1 is smaller than a past value ighold1 of a first q-axis harmonic current calculated in Step d-8 described below. In a case where it is determined that the newest q-axis harmonic current iqh is smaller than the past value ighold1 of the first q-axis harmonic current in Step d-3, the peak detection unit 225 determines in Step d-4 whether the past value ighold1 of the first q-axis harmonic current is larger than a past value ighold2 of a second q-axis harmonic current calculated in Step d-7 described below. In a case where it is determined that the past value iqhold1 of the first q-axis harmonic current is larger than the past value ighold2 of the second q-axis harmonic current in Step d-4, the peak detection unit 225 substitutes the past value iqhold1 of the first q-axis harmonic current calculated in Step d-8 (described below) into Expression (24), and calculates the positive peak value Pkp of the q-axis harmonic current in Step d-5.

[Math. 24]

$$P_{kp} = i_{qhold1} \quad (24)$$

Next, the peak detection unit 225 sets the peak detection flag Flpk to "1" (on) in Step d-6. Next, the peak detection unit 225 sets the past value iqhold1 of the first q-axis harmonic current as the past value ighold2 of the second q-axis harmonic current in Step d-7. Next, the peak detection unit 225 sets the newest q-axis harmonic current iqh as the past value iqhold1 of the first q-axis harmonic current in Step d-8.

On the other hand, in a case where it is determined that the past value ighold1 of the first q-axis harmonic current is not larger than the past value ighold2 of the second q-axis harmonic current in Step d-4, the peak detection unit 225 performs the processes of Steps d-7 and d-8 described above.

In addition, in a case where it is determined that the newest q-axis harmonic current iqh is not smaller than the past value ighold1 of the first q-axis harmonic current in Step d-3, the peak detection unit 225 determines whether the newest q-axis harmonic current iqh is larger than the past value ighold1 of the first q-axis harmonic current in Step d-9. In a case where it is determined that the newest q-axis harmonic current iqh is larger than the past value ighold1 of the first q-axis harmonic current in Step d-9, the peak detection unit 225 determines whether the past value ighold1 of the first q-axis harmonic current is smaller than the past value ighold2 of the second q-axis harmonic current in Step d-10. In a case where it is determined that the past value ighold1 of the first q-axis harmonic current is smaller than the past value ighold2 of the second q-axis harmonic current in Step d-10, the peak detection unit 225 substitutes the past value ighold1 of the first q-axis harmonic current calculated in Step d-8 into Expression (25) and calculates the negative peak value Pkp of the q-axis harmonic current in Step d-11.

[Math. 25]

$$P_{kn} = i_{qhold1} \quad (25)$$

Then, the peak detection unit 225 performs the processes of Steps d-6 to d-8 described above. On the other hand, in a case where it is determined that the past value iqhold1 of the first q-axis harmonic current is not smaller than the past value ighold2 of the second q-axis harmonic current in Step d-10, the peak detection unit 225 performs the processes of Steps d-7 and d-8 described above.

In addition, in a case where it is determined that the newest q-axis harmonic current iqh is not larger than the past value iqhold1 of the first q-axis harmonic current in Step d-9, the peak detection unit 225 restarts the process from Step d-1 at the next calculation timing without performing any process.

In this way, since the positive and negative peak values Pkp and Pkn of the q-axis harmonic current are calculated, when the past value iqhold1 of the first q-axis harmonic current is larger than the newest q-axis harmonic current iqh and the past value ighold2 of the second q-axis harmonic current, the past value iqhold1 of the first q-axis harmonic current becomes the positive peak value Pkp of the q-axis harmonic current. Further, when the past value iqhold1 of the first q-axis harmonic current is smaller than the newest q-axis harmonic current iqh and the past value ighold2 of the second q-axis harmonic current, the past value iqhold1 of the first q-axis harmonic current becomes the negative peak value Pkn of the q-axis harmonic current. In addition, the peak detection flag Flpk becomes a signal which is turned on only at the time when the positive and negative peak values Pkp and Pkn of the q-axis harmonic current are calculated.

(Description of Process of Gain Adjustment State Determination Unit 230)

Figure 7:
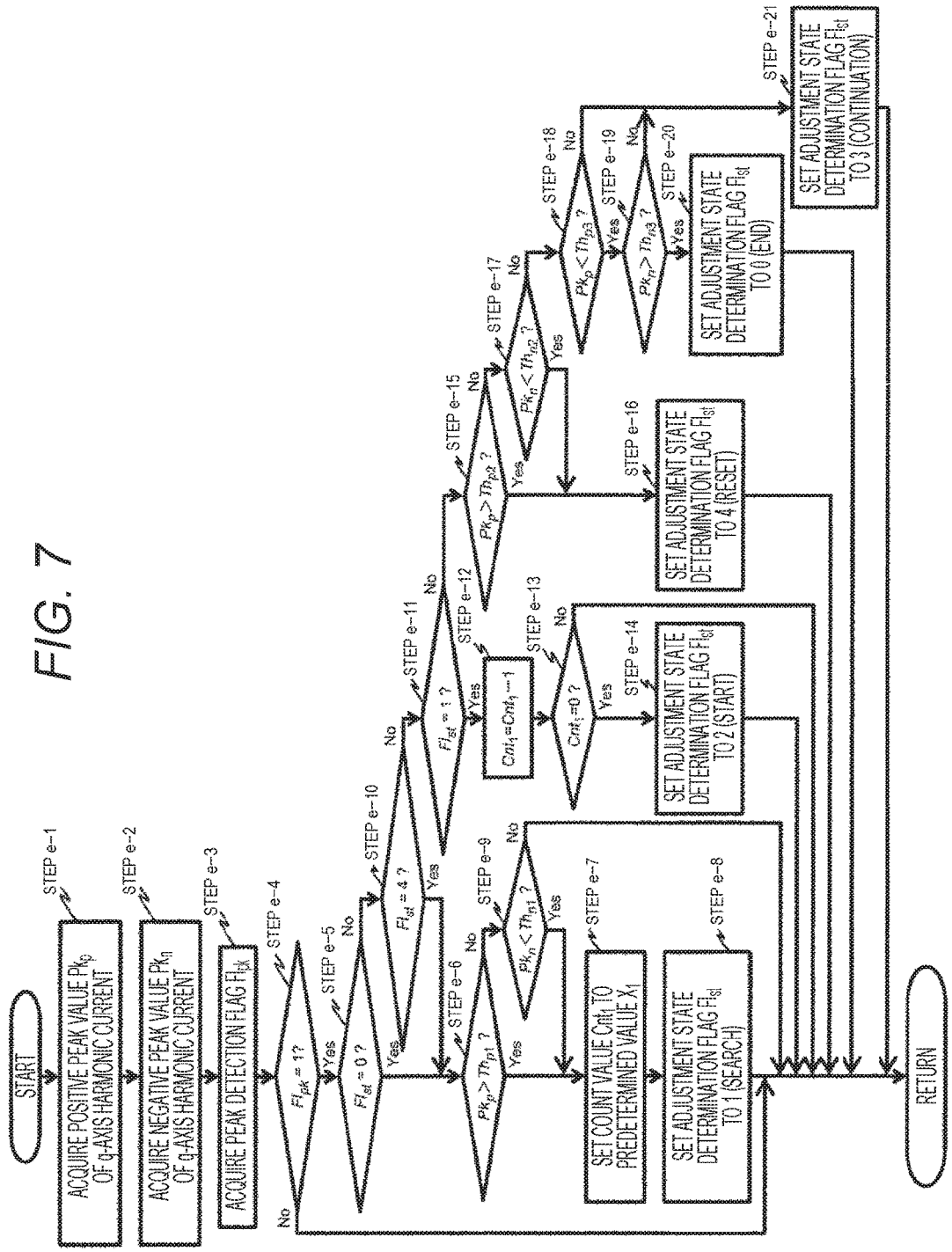
FIG. 7 is a diagram for describing a processing procedure of a gain adjustment state determination unit 230.

FIG. 7 is a diagram for describing a processing procedure of the gain adjustment state determination unit 230 according to the first embodiment. First, the gain adjustment state determination unit 230 acquires the positive and negative peak values Pkp and Pkn of the q-axis harmonic current generated by the peak detection unit 225 in Steps e-1 and e-2. Next, the gain adjustment state determination unit 230 acquires the peak detection flag Flpk generated by the peak detection unit 225 in Step e-3.

Next, the gain adjustment state determination unit 230 determines whether the peak detection flag Flpk acquired in Step e-3 is "1" (on) in Step e-4. In a case where it is determined that the peak detection flag Flpk is turned on in Step e-4, the gain adjustment state determination unit 230 determines whether the adjustment state determination flag Flst set in Step e-8, e-14, e-16, e-20, or e-21 (described below) is "0" (end) in Step e-5. In a case where it is determined that the adjustment state determination flag Flst is "0" (end) in Step e-5, the gain adjustment state determination unit 230 determines whether the positive peak value Pkp of the q-axis harmonic current acquired in Step e-1 is larger than a first predetermined positive threshold Thp1 in Step e-6. In a case where it is determined that the positive peak value Pkp of the q-axis harmonic current is larger than the first positive threshold Thp1 in Step e-6, the gain adjustment state determination unit 230 sets the first count value Cnt1 as a predetermined value X1 in Step e-7. Herein, the predetermined value X1 is set to a positive integer which is a multiple of "2". Next, the gain adjustment state determination unit 230 sets the adjustment state determination flag Flst to "1" (search) in Step e-8.

On the other hand, in a case where it is determined that the positive peak value Pkp of the q-axis harmonic current is not larger than the first positive threshold Thp1 in Step e-6, the gain adjustment state determination unit 230 determines whether the negative peak value Pkn of the q-axis harmonic current acquired in Step e-2 is smaller than a first negative threshold Thn1 in Step e-9. In a case where it is determined that the negative peak value Pkn of the q-axis harmonic current is smaller than the first negative threshold Thn1 in Step e-9, the gain adjustment direction determination unit 230 performs the processes of Steps e-7 and e-8 described above. On the other hand, in a case where it is determined that the negative peak value Pkn of the q-axis harmonic current is not smaller than the first negative threshold Thn1 in Step e-9, the gain adjustment state determination unit 230 restarts the process from Step e-1 at the next calculation timing without performing any process.

In addition, in a case where it is determined that the adjustment state determination flag Flst is not "0" (end) in Step e-5, the gain adjustment state determination unit 230 determines whether the adjustment state determination flag Flst is "4" (reset) in Step e-10. In a case where it is determined that the adjustment state determination flag Flst is "4" (reset) in Step e-10, the gain adjustment state determination unit 230 proceeds to the process of Step e-6 described above. On the other hand, in a case where it is determined that the adjustment state determination flag Flst is not "4" (reset) in Step e-10, the gain adjustment state determination unit 230 determines whether the adjustment state determination flag Flst is "1" (search) in Step e-11.

In a case where it is determined that the adjustment state determination flag Flst is "1" (search) in Step e-11, the gain adjustment state determination unit 230 counts down the first count value Cnt1 in Step e-12. Next, the gain adjustment state determination unit 230 determines whether the first count value Cnt1 is "0" in Step e-13. In a case where it is determined that the first count value Cnt1 is "0" in Step e-13, the gain adjustment state determination unit 230 sets the adjustment state determination flag Flst to "2" (adjustment start) in Step e-14. In other words, the gain adjustment state determination unit 230 keeps the state of "1" (search) of the adjustment state determination flag until the first count value Cnt1 is reduced from the predetermined value X1 to "0". On the other hand, in a case where it is determined that the first count value Cnt1 is not "0" in Step e-13, the gain adjustment state determination unit 230 restarts the process from Step e-1 at the next calculation timing without performing any process.

In addition, in a case where it is determined that the adjustment state determination flag Flst is not "1" (search) in Step e-11, the gain adjustment state determination unit 230 determines whether the positive peak value Pkp of the q-axis harmonic current is larger than a second positive threshold Thp2 in Step e-15. In a case where it is determined that the positive peak value Pkp of the q-axis harmonic current is larger than the second positive threshold Thp2, the gain adjustment state determination unit 230 sets the adjustment state determination flag Flst to "4" (reset) in Step e-16. In addition, in a case where it is determined that the positive peak value Pkp of the q-axis harmonic current is not larger than the second positive threshold Thp2 in Step e-15, the gain adjustment state determination unit 230 determines whether the negative peak value Pkn of the q-axis harmonic current is smaller than a second negative threshold Thn2 in Step e-17. In a case where it is determined that the negative peak value Pkn of the q-axis harmonic current is smaller than the second predetermined negative threshold Thn2 in Step e-17, the gain adjustment state determination unit 230 performs the process of Step e-16 described above. On the other hand, in a case where it is determined that the negative peak value Pkn of the q-axis harmonic current is not smaller than the second negative threshold Thn2 in Step e-17, the gain adjustment state determination unit 230 determines whether the positive peak value Pkp of the q-axis harmonic current is smaller than a third positive threshold Thp3 in Step e-18.

In a case where it is determined that the positive peak value Pkp of the q-axis harmonic current is smaller than the third positive threshold Thp3 in Step e-18, the gain adjustment state determination unit 230 determines whether the negative peak value Pkn of the q-axis harmonic current is larger than a third negative threshold Thn3 in Step e-19. In a case where it is determined that the negative peak value Pkn of the q-axis harmonic current is larger than the third negative threshold Thn3 in Step e-19, the gain adjustment state determination unit 230 sets the adjustment state determination flag Flst to "0" (end) in Step e-20. On the other hand, in a case where it is determined that the negative peak value Pkn of the q-axis harmonic current is not larger than the third negative threshold Thn3 in Step e-19, the gain adjustment state determination unit 230 sets the adjustment state determination flag Flst to "3" (continuation) in Step e-21. In addition, in a case where it is determined that the positive peak value Pkp of the q-axis harmonic current is not smaller than the third positive threshold Thp3 in Step e-18, the gain adjustment state determination unit 230 performs the process of Step e-21 described above. In addition, in a case where it is determined that the peak detection flag Flpk is not "1" (on) in Step e-4, the gain adjustment state determination unit 230 restarts the process from Step e-1 at the next calculation timing without performing any process. Herein, the magnitude relation of the first to third positive thresholds described above is set as Expression (26).

[Math. 26]

$$Th_{p2} > Th_{p1} > Th_{p3} \qquad (26)$$

In addition, the magnitude relation of the first to third negative thresholds described above is set as Expression (27).

[Math. 27]

$$Th_{n2} < Th_{n1} < Th_{n3} \qquad (27)$$

Since the adjustment state determination flag Flst is generated in this way, even in a case where the gain adjustment unit 250 described below fails in adjusting the U-phase detection gain Gcu and the V-phase detection gain Gcv, the failure of gain adjustment is detected in Step e-15 and Step e-17 described above, and a signal to reset the U-phase detection gain Gcu and the V-phase detection gain Gcv to initial values can be generated by the process of Step e-16. Therefore, the gain adjustment unit 250 can perform the adjustment of the U-phase detection gain Gcu and the V-phase detection gain Gcv again. In addition, in a case where the adjustment of the U-phase detection gain Gcu and the V-phase detection gain Gcv succeeds, the adjustment state determination flag Flst is regularly changed in an order of "1" (search of the adjustment direction of the detection gain), "2" (adjustment start of the detection gain), "3" (adjustment continuation of the detection gain), and "0" (adjustment end of the detection gain).

(Description of Process of Gain Adjustment Direction Search Unit 240)

Figure 8:
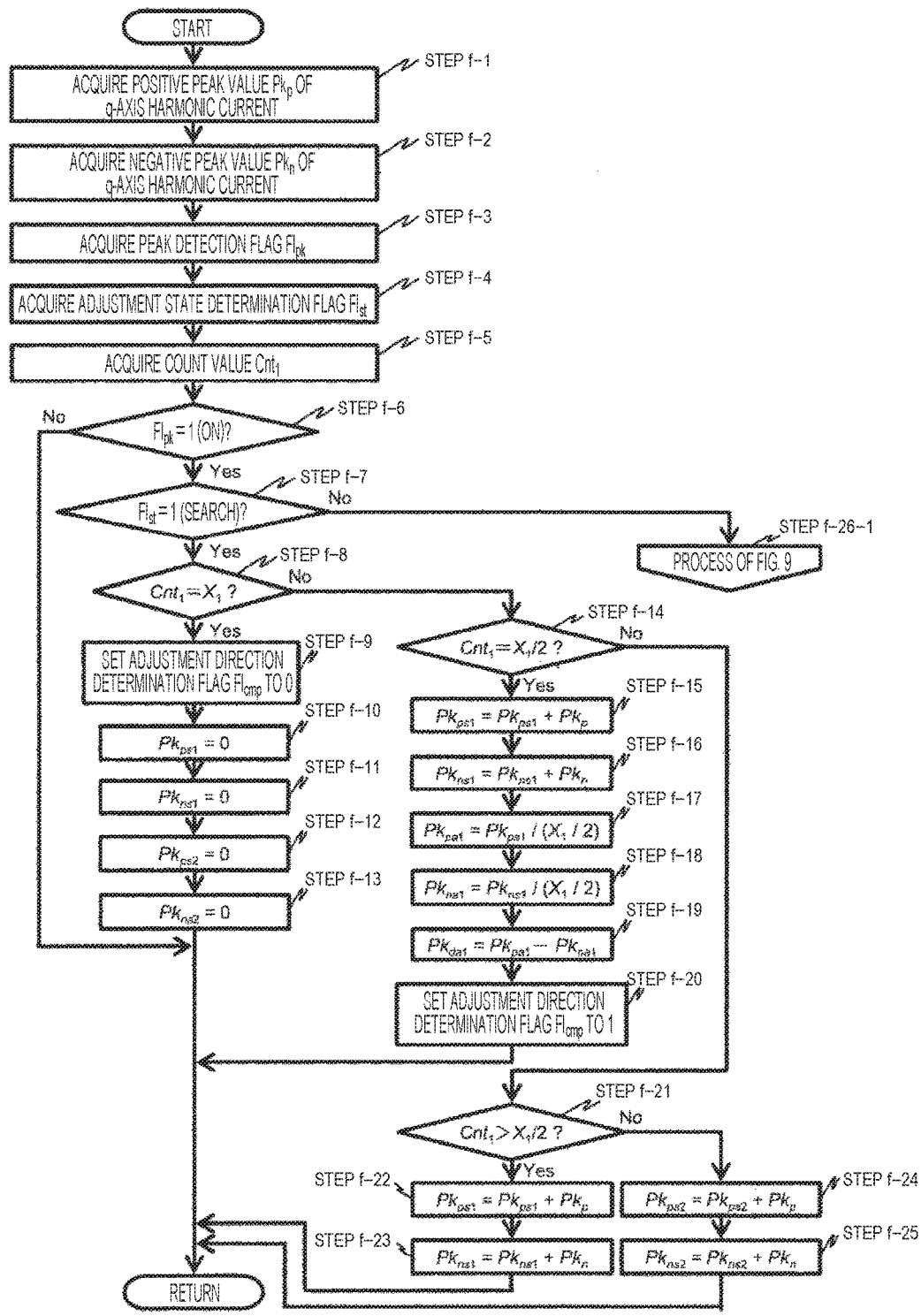
FIG. 8 is a diagram for describing a processing procedure of a gain adjustment direction search unit 240.

FIG. 8 is a diagram for describing a processing procedure of the gain adjustment direction search unit 240. First, the gain adjustment direction search unit 240 acquires the positive and negative peak values Pkp and Pkn of the q-axis harmonic current which are calculated by the peak detection unit 225 in Steps f-1 and f-2 respectively. Next, the gain adjustment direction search unit 240 acquires the peak detection flag Flpk generated by the peak detection unit 225 in Step f-3. Next, the gain adjustment direction search unit 240 acquires the adjustment state determination flag Flst generated by the gain adjustment state determination unit 230 and the first count value Cnt1 in Steps f-4 and f-5.

Next, in Step f-6, the gain adjustment direction search unit 240 determines whether the peak detection flag Flpk acquired in Step f-3 is "1" (on). In a case where it is determined that the peak detection flag Flpk is "1" (on) in Step f-6, the gain adjustment direction search unit 240 determines whether the adjustment state determination flag Flst acquired in Step f-4 is "1" (search) in Step f-7. In a case where it is determined that the adjustment state determination flag Flst is "1" (search) in Step f-7, the gain adjustment direction search unit 240 determines whether the first count value Cnt1 acquired in Step f-5 is equal to the predetermined value X1 in Step f-8.

In a case where it is determined that the first count value Cnt1 is equal to the predetermined value X1 in Step f-8, the gain adjustment direction search unit 240 sets the adjustment direction determination flag Flcmp to "0" (a signal to increase the U-phase detection gain Gcu in a positive direction, and the V-phase detection gain Gcv in a negative direction) in Step f-9. Next, the gain adjustment direction search unit 240 resets an integrated value Pkps1 of a first positive peak value obtained by integrating the positive peak value of the q-axis harmonic current, an integrated value Pkps2 of a second positive peak value obtained by integrating the positive peak value of the q-axis harmonic current, an integrated value Pkns1 of a first negative peak value obtained by integrating the negative peak value of the q-axis harmonic current, and an integrated value Pkps2 of a second negative peak value obtained by integrating the negative peak value of the q-axis harmonic current to "0" in Steps f-10 to f-13.

On the other hand, in a case where it is determined that the first count value Cnt1 is not the predetermined value X1 in Step f-8, the gain adjustment direction search unit 240 determines whether the first count value Cnt1 is equal to (X1/2) in Step f-14.

In a case where it is determined that the first count value Cnt1 is equal to (X1/2) in Step f-14, the gain adjustment direction search unit 240 adds the positive peak value Pkp of the q-axis harmonic current acquired in Step f-1 to the integrated value Pkps1 of the first positive peak value calculated at the last time, and calculates the integrated value Pkps1 of the newest first positive peak value in Step f-15. Next, the gain adjustment direction search unit 240 adds the negative peak value Pkn of the q-axis harmonic current acquired in Step f-2 to the integrated value Pkns1 of the first negative peak value calculated at the last time, and calculates the integrated value Pkns1 of the newest first negative peak value in Step f-16. Next, the gain adjustment direction search unit 240 divides the integrated value Pkps1 of the newest first positive peak value calculated in Step f-15 by (X1/2), and calculates an average value Pkpa1 of the first positive peak value in Step f-17. Next, the gain adjustment direction search unit 240 divides the integrated value Pkns1 of the newest first negative peak value calculated in Step f-16 by (X1/2), and calculates an average value Pkna1 of the first negative peak value in Step f-18. Next, the gain adjustment direction search unit 240 subtracts the average value Pkna1 of the first negative peak value calculated in Step f-18 from the average value Pkpa1 of the first positive peak value calculated in Step f-17, and calculates an average value Pkda1 of a first peak-to-peak value in Step f-19. Next, the gain adjustment direction search unit 240 sets the adjustment direction determination flag Flcmp to "1" (a signal to increase the U-phase detection gain Gcu in a negative direction, and the V-phase detection gain Gcv in a positive direction) in Step f-20.

In addition, in a case where it is determined that the first count value Cnt1 is not equal to (X1/2) in Step f-14, the gain adjustment direction search unit 240 determines whether the first count value Cnt1 is larger than (X1/2) in Step f-21.

In a case where it is determined that the first count value Cnt1 is larger than (X1/2) in Step f-21, the gain adjustment direction search unit 240 adds the positive peak value Pkp of the q-axis harmonic current acquired in Step f-1 to the integrated value Pkps1 of the first positive peak value calculated at the last time, and calculates the integrated value Pkps1 of the newest first positive peak value in Step f-22. Next, the gain adjustment direction search unit 240 adds the negative peak value Pkn of the q-axis harmonic current acquired in Step f-2 to the integrated value Pkns1 of the first negative peak value calculated at the last time, and calculates the integrated value Pkns1 of the newest first negative peak value in Step f-23.

On the other hand, in a case where it is determined that the first count value Cnt1 is not larger than (X1/2) Step f-21, the gain adjustment direction search unit 240 adds the positive peak value Pkp of the q-axis harmonic current acquired in Step f-1 to the integrated value Pkps2 of the second positive peak value calculated at the last time, and calculates the integrated value Pkps2 of the newest second positive peak value in Step f-24. Next, the gain adjustment direction search unit 240 adds the negative peak value Pkn of the q-axis harmonic current acquired in Step f-2 to the integrated value Pkns2 of the second negative peak value calculated at the last time, and calculates the integrated value Pkns2 of the newest second negative peak value in Step f-25.

In addition, in a case where it is determined that the adjustment state determination flag Flst is not "1" (search) in Step f-7, the gain adjustment direction search unit 240 proceeds to a process of FIG. 9 (described below) in Step f-26-1. In addition, in a case where it is determined that the peak detection flag Flpk is not "1" (on) in Step f-6, the gain adjustment direction search unit 240 restarts the process from Step f-1 at the next calculation timing without performing any process.

Figure 9:
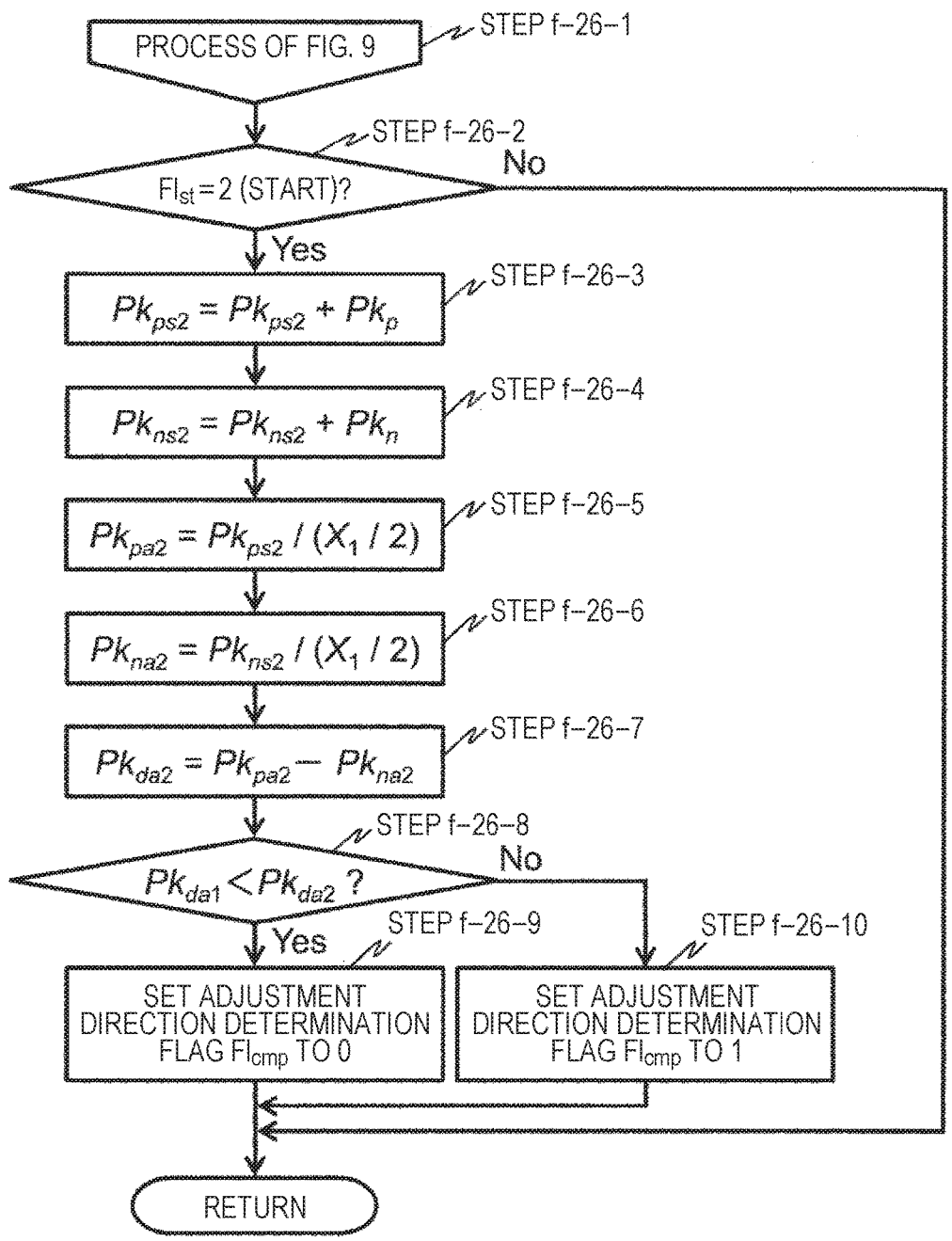
FIG. 9 is a diagram for describing a processing procedure of the gain adjustment direction search unit 240 when an adjustment state determination flag Flst is not "1" (search) in Step f-7 of FIG. 8.

FIG. 9 is a diagram for describing a processing procedure of the gain adjustment direction search unit 240 when the adjustment state determination flag Flst is not "1" (search) in Step f-7 of FIG. 8. First, the gain adjustment direction search unit 240 determines whether the adjustment state determination flag Flst is "2" (start) in Step f-26-2.

In a case where it is determined that the adjustment state determination flag Flst is "2" (start) in Step f-26-2, the gain adjustment direction search unit 240 adds the positive peak value Pkp of the q-axis harmonic current acquired in Step f-1 of FIG. 8 to the integrated value Pkps2 of the second positive peak value calculated at the last time, and calculates the integrated value Pkps2 of the newest second positive peak value in Step f-26-3. Next, the gain adjustment direction search unit 240 adds the negative peak value Pkn of the q-axis harmonic current acquired in Step f-2 of FIG. 8 to the integrated value Pkns2 of the second negative peak value calculated at the last time, and calculates the integrated value Pkns2 of the newest second negative peak value in Step f-26-4. Next, the gain adjustment direction search unit 240 divides the integrated value Pkps2 of the newest second positive peak value calculated in Step f-26-3 by (X1/2), and calculates an average value Pkpa2 of the second positive peak value in Step f-26-5. Next, the gain adjustment direction search unit 240 divides the integrated value Pkns2 of the newest second negative peak value calculated in Step f-26-4 by (X1/2), and calculates an average value Pkna2 of the second negative peak value in Step f-26-6. Next, the gain adjustment direction search unit 240 subtracts the average value Pkna2 of the second negative peak value calculated in Step f-26-6 from the average value Pkpa2 of the second positive peak value calculated in Step f-26-5, and calculates an average value Pkda2 of a second peak-to-peak value in Step f-26-7. Next, the gain adjustment direction search unit 240 determines whether the average value Pkda1 of the first peak-to-peak value is smaller than the average value Pkda2 of the second peak-to-peak value in Step f-26-8.

In a case where it is determined that the average value Pkda1 of the first peak-to-peak value is smaller than the average value Pkda2 of the second peak-to-peak value in Step f-26-8, the gain adjustment direction search unit 240 sets the adjustment direction determination flag Flcmp to "0" (a signal to increase the U-phase detection gain Gcu in a positive direction, and the V-phase detection gain Gcv in a negative direction) in Step f-26-9. On the other hand, in a case where it is determined that the average value Pkda1 of the first peak-to-peak value is not smaller than the average value Pkda2 of the second peak-to-peak value in Step f-26-8, the gain adjustment direction search unit 240 sets the adjustment direction determination flag Flcmp to "1" (a signal to increase the U-phase detection gain Gcu in a negative direction, and the V-phase detection gain Gcv in a positive direction) in Step f-26-10.

In addition, in a case where it is determined that the adjustment state determination flag Flst is not "2" (start) in Step f-26-2, the gain adjustment direction search unit 240 restarts the process from Step f-1 of FIG. 8 at the next calculation timing without performing any process.

In this way, the final adjustment direction determination flag Flcmp is determined on the basis of the magnitude relation between the average value Pkda1 of the first peak-to-peak value and the average value Pkda2 of the second peak-to-peak value calculated in a period when the adjustment state determination flag Flst is "1" (search). Therefore, the gain adjustment unit 250 (described below) can adjust the U-phase detection gain Gcu and the V-phase detection gain Gcv to make the peak-to-peak value of the q-axis current harmonic wave small. Further, even in a case where the q-axis harmonic current iqh calculated by the harmonic extraction unit 220 or the positive and negative peak values of the q-axis harmonic current calculated by the peak detection unit 225 are deviated due to an influence of noises, the adjustment direction determination flag Flcmp can be determined with accuracy to make the peak-to-peak value of the q-axis current harmonic wave small. Herein, the description has been given about a method of adjusting both the U-phase detection gain Gcu and the V-phase detection gain Gcv. However, only the V-phase detection gain Gcv may be adjusted with the U-phase detection gain Gcu as a reference gain, or only the U-phase detection gain Gcu may be adjusted with the V-phase detection gain Gcv as a reference gain.

(Description of Process of Gain Adjustment Unit 250)

Figure 10:
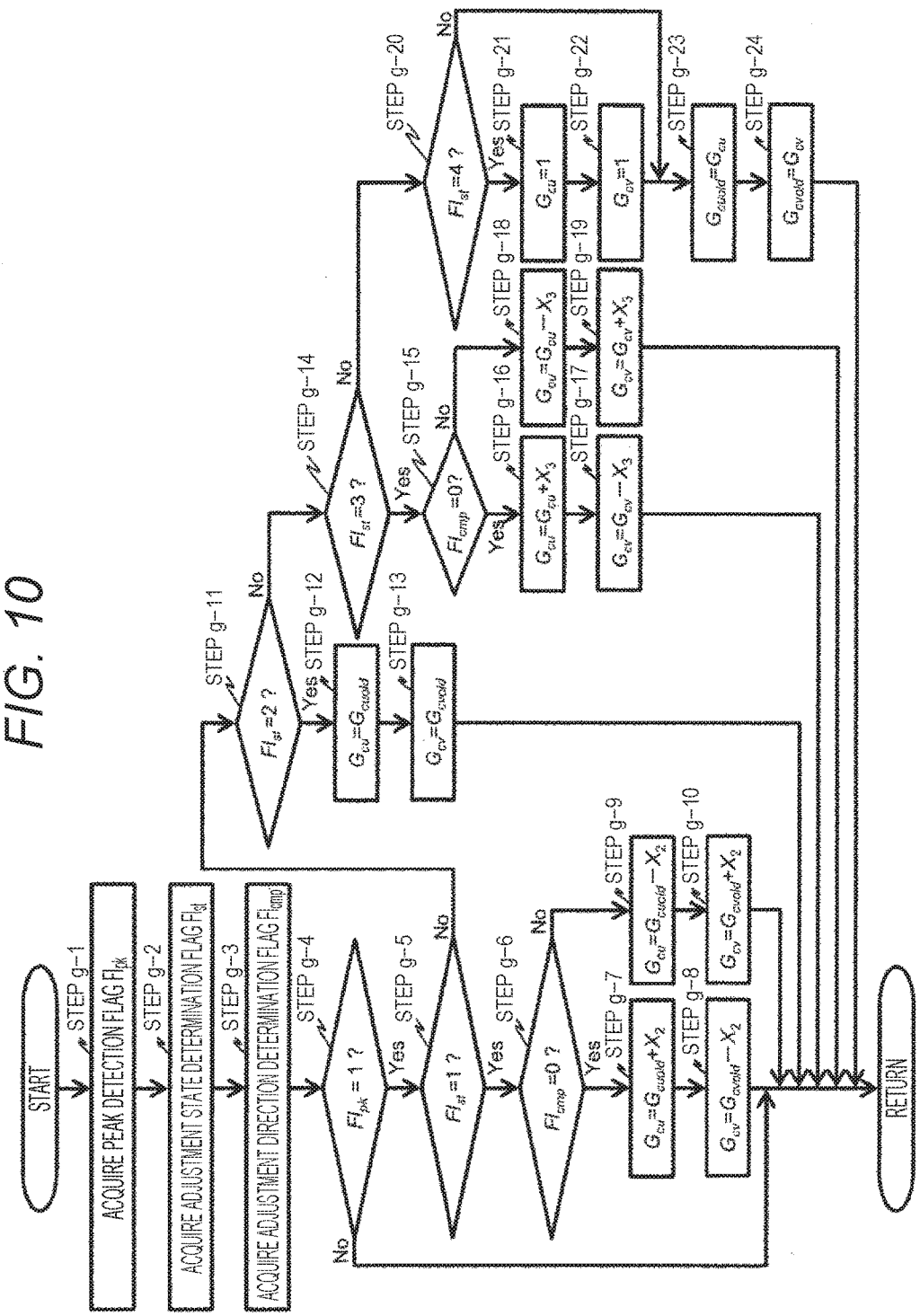
FIG. 10 is a diagram for describing a processing procedure of a gain adjustment unit 250.

FIG. 10 is a diagram for describing a processing procedure of the gain adjustment unit 250. First, the gain adjustment unit 250 acquires the peak detection flag Flpk generated by the peak detection unit 225 in Step g-1. Next, the gain adjustment unit 250 acquires the adjustment state determination flag Flst generated by the gain adjustment state determination unit 230 in Step g-2. Next, the gain adjustment unit 250 acquires the adjustment direction determination flag Flcmp generated by the gain adjustment direction search unit 240 in Step g-3. Next, the gain adjustment unit 250 determines whether the peak detection flag Flpk acquired in Step g-1 is "1" (on) in Step g-4.

In a case where it is determined that the peak detection flag Flpk is "1" (on) in Step g-4, the gain adjustment unit 250 determines whether the adjustment state determination flag Flst acquired in Step g-2 is "1" (search) in Step g-5. In a case where it is determined that the adjustment state determination flag Flst is "1" (search) in Step g-5, the gain adjustment unit 250 determines whether the adjustment direction determination flag Flcmp is "0" (a signal to increase the U-phase detection gain Gcu in a positive direction, and the V-phase detection gain Gcv in a negative direction) in Step g-6.

In a case where it is determined that the adjustment direction determination flag Flcmp is "0" (a signal to increase the U-phase detection gain Gcu in a positive direction, and the V-phase detection gain Gcv in a negative direction) in Step g-6, the gain adjustment unit 250 adds a predetermined value X2 to a past value Gcuold of the U-phase detection gain, and increases the U-phase detection gain Gcu in a positive direction in Step g-7. Next, the gain adjustment unit 250 subtracts the predetermined value X2 from a past value Gcvold of the V-phase detection gain, and increases the V-phase detection gain Gcv in a negative direction in Step g-8.

On the other hand, in a case where it is determined that the adjustment direction determination flag Flcmp is not "0" (a signal to increase the U-phase detection gain Gcu in a positive direction, and the V-phase detection gain Gcv in a negative direction) in Step g-6, the gain adjustment unit 250 subtracts the predetermined value X2 from the past value Gcuold of the U-phase detection gain and increases the U-phase detection gain Gcu in the negative direction in Step g-9. Next, the gain adjustment unit 250 adds the predetermined value X2 to the past value Gcvold of the V-phase detection gain, and increases the V-phase detection gain Gcv in the positive direction in Step g-10.

In addition, in a case where it is determined that the adjustment state determination flag Flst is not "1" (search) in Step g-5, the gain adjustment unit 250 determines whether the adjustment state determination flag Flst is "2" (start) in Step g-11. In a case where it is determined that the adjustment state determination flag Flst is "2" (start) in Step g-11, the gain adjustment unit 250 sets the past value Gcuold of the U-phase detection gain as the U-phase detection gain Gcu in Step g-12. Next, the gain adjustment unit 250 sets the past value Gcvold of the V-phase detection gain as the V-phase detection gain Gcv in Step g-13.

On the other hand, in a case where it is determined that the adjustment state determination flag Flst is not "2" (start) in Step g-11, the gain adjustment unit 250 determines whether the adjustment state determination flag Flst is "3" (continuation) in Step g-14. In a case where it is determined that the adjustment state determination flag Flst is "3" (continuation) in Step g-14, the gain adjustment unit 250 determines whether the adjustment direction determination flag Flcmp is "0" (a signal to increase the U-phase detection gain Gcu in a positive direction, and the V-phase detection gain Gcv in a negative direction) in Step g-15. In a case where it is determined that the adjustment direction determination flag Flcmp is "0" (a signal to increase the U-phase detection gain Gcu in a positive direction, and the V-phase detection gain Gcv in a negative direction) in Step g-15, the gain adjustment unit 250 adds a predetermined value X3 to the U-phase detection gain Gcu calculated at the last time, and calculates the newest U-phase detection gain Gcu in Step g-16. Next, the gain adjustment unit 250 subtracts the predetermined value X3 from the V-phase detection gain Gcv calculated at the last time, and calculates the newest V-phase detection gain Gcv in Step g-17.

On the other hand, in a case where it is determined that the adjustment direction determination flag Flcmp is not "0" (a signal to increase the U-phase detection gain Gcu in a positive direction, and the V-phase detection gain Gcv in a negative direction) in Step g-15, the gain adjustment unit 250 subtracts the predetermined value X3 from the U-phase detection gain Gcu calculated at the last time, and calculates the newest U-phase detection gain Gcu in Step g-18. Next, the gain adjustment unit 250 adds the predetermined value X3 to the V-phase detection gain Gcv calculated at the last time, and calculates the newest V-phase detection gain Gcv in Step g-19.

In addition, in a case where it is determined that the adjustment state determination flag Flst is not "3" (continuation) in Step g-14, the gain adjustment unit 250 determines whether the adjustment state determination flag Flst is "4" (reset) in Step g-20. In a case where it is determined that the adjustment state determination flag Flst is "4" (reset) in Step g-20, the gain adjustment unit 250 sets the U-phase detection gain Gcu to "1" (initial value) in Step g-21. Next, the gain adjustment unit 250 sets the V-phase detection gain Gcv to "1" (initial value) in Step g-22. Next, the gain adjustment unit 250 sets the U-phase detection gain Gcu set in Step g-21 as the past value Gcuold of the U-phase detection gain in Step g-23. Next, the gain adjustment unit 250 sets the V-phase detection gain Gcv set in Step g-22 as the past value Gcvold of the V-phase detection gain in Step g-24.

In addition, in a case where it is determined that the adjustment state determination flag Flst is not "4" (reset) in Step g-20, the gain adjustment unit 250 performs the processes of Steps g-23 and g-24 described above. In addition, in a case where it is determined that the peak detection flag Flpk is not "1" (on) in Step g-4, the gain adjustment unit 250 restarts the process from Step g-1 at the next calculating timing without performing any process.

In this way, the peak-to-peak value of the q-axis current harmonic wave can be reduced by adjusting the U-phase detection gain Gcu and the V-phase detection gain Gcv on the basis of the state of the adjustment direction determination flag Flcmp. In other words, it is possible to correct a variation of the gains of the U-phase current sensor 50 and the V-phase current sensor 55. In addition, the U-phase detection gain Gcu and the V-phase detection gain Gcv are adjusted when the electrical angle θe of the rotor 64 of the motor 60 is changed by π/2. Herein, the description has been given about a method of adjusting both the U-phase detection gain Gcu and the V-phase detection gain Gcv. However, only the V-phase detection gain Gcv may be adjusted with the U-phase detection gain Gcu as a reference gain, or only the U-phase detection gain Gcu may be adjusted with the V-phase detection gain Gcv as a reference gain.

(Description of Relation Among q-Axis Harmonic Current iqh, Each Flag, and Detection Flag)

Figure 11:
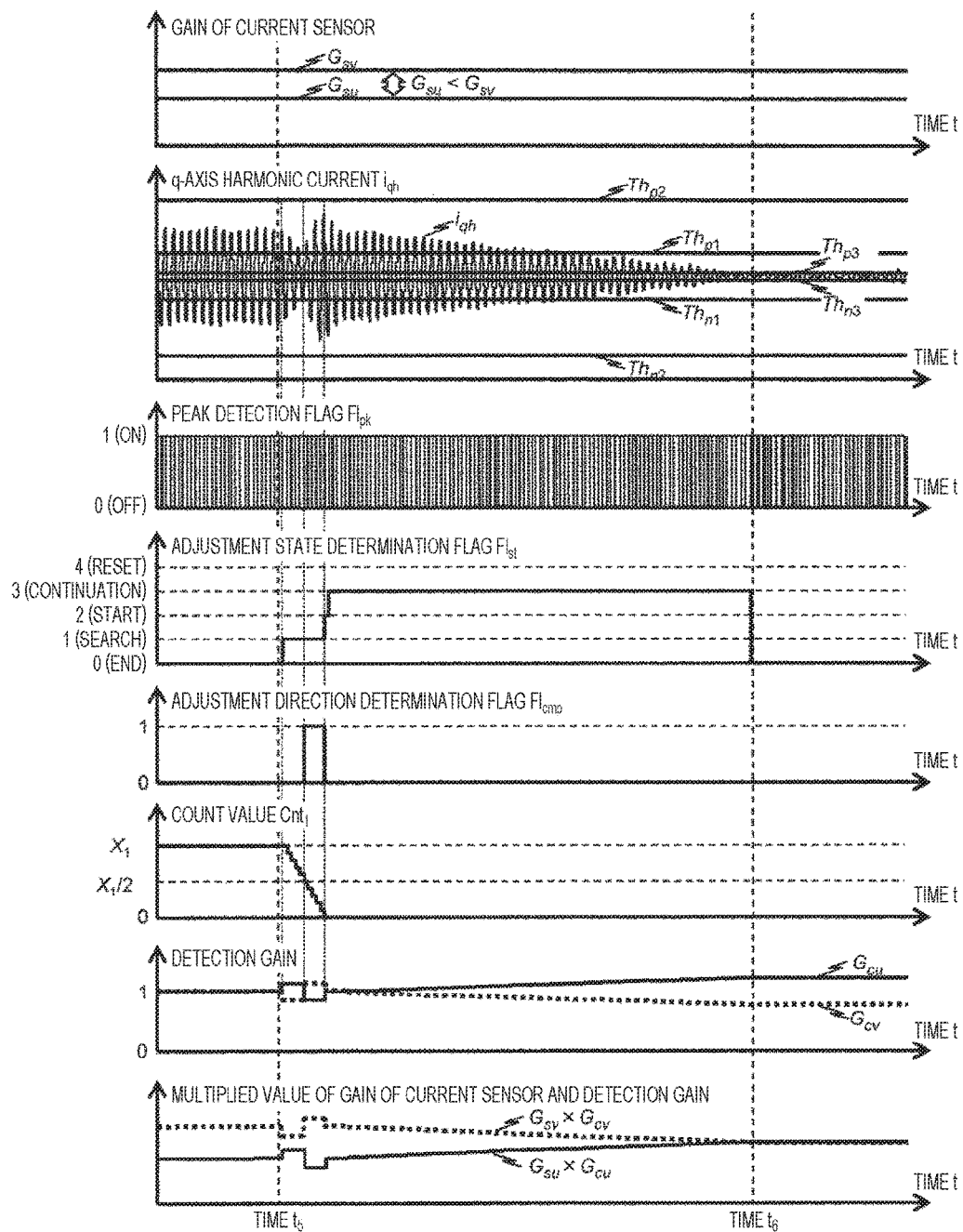
FIG. 11 is a diagram for describing a relation among the gain Gsu of the U-phase current sensor 50, Gsv of the V-phase current sensor 55, the q-axis harmonic current iqh, the peak detection flag Flpk, the adjustment state determination flag Flst, the adjustment direction determination flag Flcmp, the first count value Cnt1, the U-phase detection gain Gcu, and the V-phase detection gain Gcv.

FIG. 11 is a diagram for describing a relation among the gain Gsu of the U-phase current sensor 50, the gain Gsv of the V-phase current sensor 55, the q-axis harmonic current iqh, the peak detection flag Flpk, the adjustment state determination flag Flst, the adjustment direction determination flag Flcmp, the first count value Cnt1, and the U-phase detection gain Gcu and the V-phase detection gain Gcv which are adjusted in the above-described order. Herein, it is assumed that the gain Gsu of the U-phase current sensor 50 is smaller than the gain Gsv of the V-phase current sensor 55, and a variation of the gain Gsu of the U-phase current sensor 60 and the gain Gsv of the V-phase current sensor 55 is set to be corrected from time t5.

First, at time t5, the negative peak value Pkn of the q-axis harmonic current iqh is smaller than the first negative threshold Thn1, and thus the adjustment state determination flag Flst is switched from "0" (end) to "1" (search) immediately after time t5. The first count value Cnt1 starts to be counted down from the predetermined value X1 at the moment when the adjustment state determination flag Flst is switched from "0" (end) to "1" (search). Then, at the moment when the first count value Cnt1 becomes equal to (X1/2), the adjustment direction determination flag Flcmp is switched from "0" (a signal to increase the U-phase detection gain Gcu in a positive direction, and the V-phase detection gain Gcv in a negative direction) to "1" (a signal to increase the U-phase detection gain Gcu in a negative direction, and the V-phase detection gain Gcv in a positive direction).

Then, when the adjustment state determination flag Flst is "1" (search) and the adjustment direction determination flag Flcmp is "0", the U-phase detection gain Gcu is increased from "1" (initial value) by the predetermined value X2 in the positive direction, and the V-phase detection gain Gcv is increased from "1" (initial value) by the predetermined value X2 in the negative direction. Herein, a period where the U-phase detection gain Gcu is increased from "1" (initial value) by the predetermined value X2 in the positive direction and the V-phase detection gain Gcv is increased from "1" (initial value) by the predetermined value X2 in the negative direction is referred to as Period D.

On the other hand, when the adjustment state determination flag Flst is "1" (search) and the adjustment direction determination flag Flcmp is "1", the U-phase detection gain Gcu is increased from "1" (initial value) by the predetermined value X2 in the negative direction, and the V-phase detection gain Gcv is increased from "1" (initial value) by the predetermined value X2 in the positive direction. Herein, a period when the U-phase detection gain Gcu is increased from "1" (initial value) by the predetermined value X2 in the negative direction and the V-phase detection gain Gcv is increased from "1" (initial value) by the predetermined value X2 in the positive direction is referred to as Period E.

Next, it can be seen that the average value of the peak-to-peak value of the q-axis harmonic current iqh of Period D is smaller than the average value of the peak-to-peak value of the q-axis harmonic current iqh of Period E. Therefore, the adjustment direction determination flag Flcmp is switched from "1" (a signal to increase the U-phase detection gain Gcu in a negative direction, and the V-phase detection gain Gcv in a positive direction) to "0" (a signal to increase the U-phase detection gain Gcu in a positive direction, and the V-phase detection gain Gcv in a negative direction) at the moment when the first count value Cnt1 becomes "0" and the adjustment state determination flag Flst is switched from "1" (search) to "2" (start).

Then, the adjustment state determination flag Flst is switched from "2" (start) to "3" (continuation) immediately after the adjustment direction determination flag Flcmp is switched from "1" (a signal to increase the U-phase detection gain Gcu in a negative direction, and the V-phase detection gain Gcv in a positive direction) to "0" (a signal to increase the U-phase detection gain Gcu in a positive direction, and the V-phase detection gain Gcv in a negative direction). Then, when the adjustment state determination flag Flst is "3" (continuation) and the adjustment direction determination flag Flcmp is "0", the U-phase detection gain Gcu is gradually increased at a pitch of the predetermined value X3 in the positive direction, and the V-phase detection gain Gcv is gradually increased at a pitch of the predetermined value X3 in the negative direction. Finally, at time t6, the positive and negative peak values Pkp and Pkn of the q-axis harmonic current iqh fall within the range of the third positive and negative thresholds Thp3 and Thn3.

Therefore, the adjustment state determination flag Flst is switched from "3" (continuation) to "0" (end), and the adjustment of the U-phase detection gain Gcu and the V-phase detection gain Gcv is ended. These processes are performed only at the moment when the peak detection flag Flpk is switched from "0" (off) to "1" (on).

In this way, the multiplied value of the gain Gsu of the U-phase current sensor 50 and the U-phase detection gain Gcu can be substantially matched with the multiplied value of the gain Gsv of the V-phase current sensor 55 and the V-phase detection gain Gcv by adjusting the U-phase detection gain Gcu and the V-phase detection gain Gcv. In other words, it is possible to correct a variation of the gain Gsv of the U-phase current sensor 50 and the gain Gsv of the V-phase current sensor 55. In addition, the harmonic current iqh having two times the electrical angular frequency fe of the rotor 64 of the motor 60 which is contained in the q-axis current iq draws a waveform which is increased only in a certain period after being decreased (or increased) only in a certain period, and then is gradually decreased immediately after the variation of the gain Gsu of the U-phase current sensor 50 and the gain Gsv of the V-phase current sensor 55 starts to be corrected.

(Description of Process of Voltage Command Calculation Unit 190)

Figure 12:
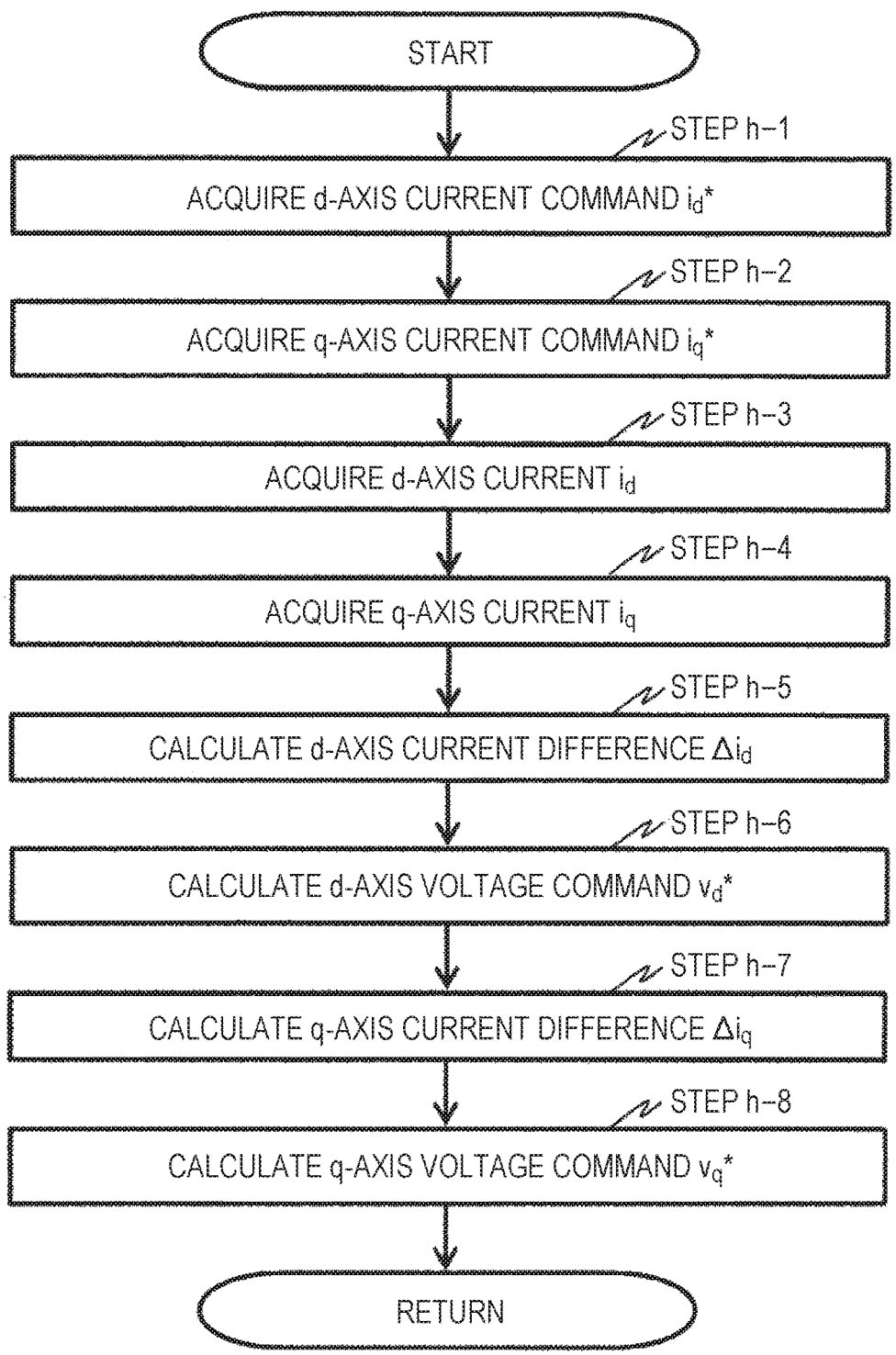
FIG. 12 is a diagram for describing a processing procedure of a voltage command calculation unit 190.

FIG. 12 is a diagram for describing a processing procedure of the voltage command calculation unit 190 according to the first embodiment. First, the voltage command calculation unit 190 acquires the d-axis current command id* and the q-axis current command iq* in Steps h-1 and h-2. Next, the voltage command calculation unit 190 acquires the d-axis current id and the q-axis current iq calculated by the 3-phase/dq-axis conversion unit 180 in Steps h-3 and h-4. Next, the voltage command calculation unit 190 substitutes the d-axis current command id* acquired in Step h-1 and the d-axis current id acquired in Step h-3 into Expression (28), and calculates a difference Δid between the d-axis current command id* and the d-axis current id in Step h-5.

[Math. 28]

$$\Delta i_d = i_d^* - i_d \quad (28)$$

Next, the voltage command calculation unit 190 substitutes a d-axis current deviation Δid calculated in Step h-5 into Expression (29), and calculates the d-axis voltage command vd* in Step h-6. Herein, the values of a d-axis proportional gain Kpd and a d-axis integral gain Kid are stored in the memory of the microcontroller in advance.

[Math. 29]

$$v_d^* = K_{pd} \Delta i_d + K_{id} \int \Delta i_d dt \quad (29)$$

Next, the voltage command calculation unit 190 substitutes the q-axis current command iq* acquired in Step h-2 and the q-axis current iq acquired in Step h-4 into Expression (30), and calculates a difference Δiq between the q-axis current command iq* and the q-axis current iq in Step h-7.

[Math. 30]

$$\Delta i_q = i_q^* - i_q \quad (30)$$

Next, the voltage command calculation unit 190 substitutes the difference Δiq of the q-axis current calculated in Step h-7 into Expression (31), and calculates the q-axis voltage command vq* in Step h-8. Herein, the values of a q-axis proportional gain Kpq and a q-axis integral gain Kiq are stored in the memory of the microcontroller in advance.

[Math. 31]

$$v_q^* = K_{pq} \Delta i_q + K_{iq} \int \Delta i_q dt \quad (31)$$

(Description of Process of Dq-Axis/3-Phase Conversion Unit 200)

Figure 13:
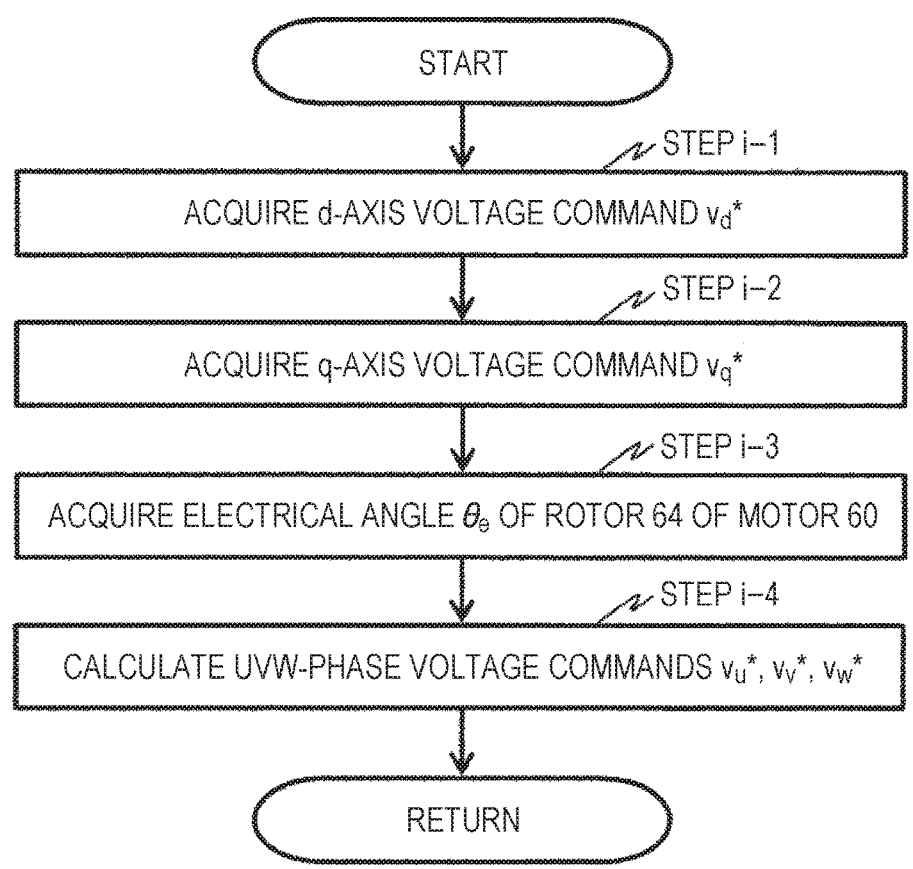
FIG. 13 is a diagram for describing a processing procedure of a dq-axis/3-phase conversion unit 200.

FIG. 13 is a diagram for describing a processing procedure of the dq-axis/3-phase conversion unit 200. First, the dq-axis/3-phase conversion unit 200 acquires the d-axis voltage command vd* and the q-axis voltage command vq* calculated by the voltage command calculation unit 190 in Steps i-1 and i-2 respectively. Next, the dq-axis/3-phase conversion unit 200 acquires the electrical angle θe of the rotor 64 of the motor 60 detected by the angle sensor 70 in Step i-3. Next, the dq-axis/3-phase conversion unit 200 substitutes the d-axis voltage command vd*, the q-axis voltage command vq*, and the electrical angle θe of the rotor 64 of the motor 60 acquired in Steps i-1 to i-3 into Expression (32), and calculates the U-phase voltage command vu*, the V-phase voltage command vv*, and the W-phase voltage command vw* in Step i-4.

[Math. 32]

$$\begin{bmatrix} v_u^* \\ v_v^* \\ v_w^* \end{bmatrix} = \sqrt{\frac{2}{3}} \begin{bmatrix} \cos\theta_e & -\sin\theta_e \\ \cos\left(\theta_e - \frac{2}{3}\pi\right) & -\sin\left(\theta_e - \frac{2}{3}\pi\right) \\ \cos\left(\theta_e + \frac{2}{3}\pi\right) & -\sin\left(\theta_e + \frac{2}{3}\pi\right) \end{bmatrix} \begin{bmatrix} v_d^* \\ v_q^* \end{bmatrix} \quad (32)$$

(Description of Process of PWM Signal Generation Unit 210)

Figure 14:
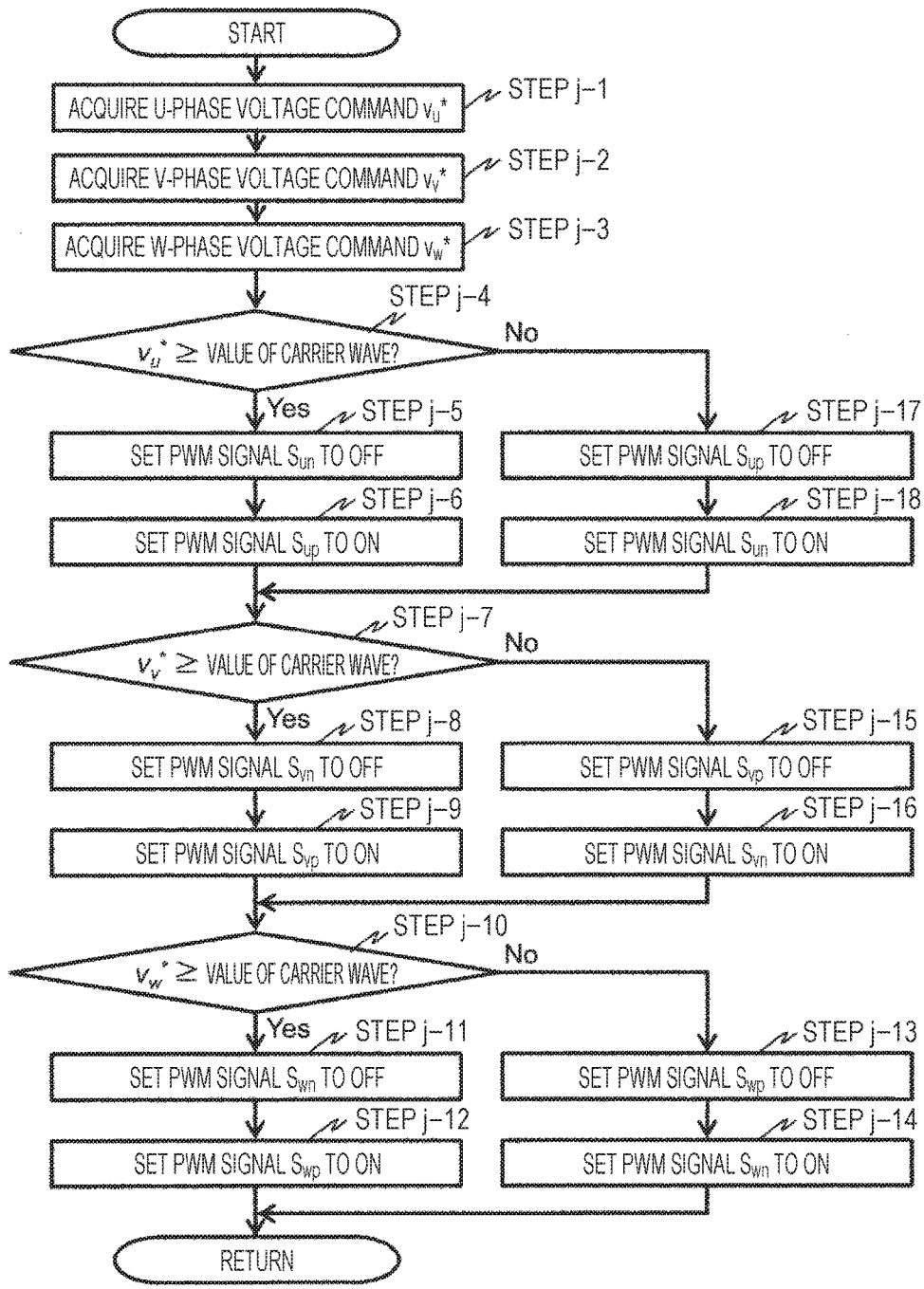
FIG. 14 is a diagram for describing a processing procedure of a PWM signal generation unit 210.

FIG. 14 is a diagram for describing a processing procedure of the PWM signal generation unit 210. First, the PWM signal generation unit 210 acquires the U-phase voltage command vu*, the V-phase voltage command vv*, and the W-phase voltage command vw* calculated by the dq-axis/3-phase conversion unit 200 in Steps j-1 to j-3 respectively.

Next, the PWM signal generation unit 210 determines whether the U-phase voltage command vu* acquired in Step j-1 is equal to or more than a value of carrier wave (not illustrated) in Step j-4.

In a case where it is determined that the U-phase voltage command vu* is equal to or more than the value of carrier wave in Step j-4, the PWM signal generation unit 210 sets the PWM signal Sun off in Step j-5, and then sets the PWM signal Sup on in Step j-6. Next, the PWM signal generation unit 210 determines whether the V-phase voltage command vv* acquired in Step j-2 is equal to or more than the value of carrier wave in Step j-7.

In a case where it is determined that the V-phase voltage command vv* is equal to or more than the value of carrier wave in Step j-7, the PWM signal generation unit 210 sets the PWM signal Svn off in Step j-8, and then sets the PWM signal Svp on in Step j-9. Next, the PWM signal generation unit 210 determines whether the W-phase voltage command vw* acquired in Step j-3 is equal to or more than the value of carrier wave in Step j-10.

In a case where it is determined that the W-phase voltage command vw* is equal to or more than the value of carrier wave in Step j-10, the PWM signal generation unit 210 sets the PWM signal Swn off in Step j-11, and then sets the PWM signal Swp on in Step j-12. On the other hand, in a case where it is determined that the W-phase voltage command vw* is not equal to or more than the value of carrier wave in Step j-10, the PWM signal generation unit 210 sets the PWM signal Swp off in Step j-13, and then sets the PWM signal Swn on in Step j-14.

In addition, in a case where it is determined that the V-phase voltage command vv* is not equal to or more than the value of carrier wave in Step j-7, the PWM signal generation unit 210 sets the PWM signal Svp off in Step j-15, and then sets the PWM signal Svn on in Step j-16.

In addition, in a case where it is determined that the U-phase voltage command vu* is not equal to or more than the value of carrier wave in Step j-4, the PWM signal generation unit 210 sets the PWM signal Sup off in Step j-17, and then sets the PWM signal Sun on in Step j-18.

In this way, since the PWM signals Sup, Sun, Svp, Svn, Swp, and Swn are generated, the average values of the UVW-phase voltages output by the inverter 40 can be controlled to be matched with the UVW-phase voltage commands vu*, vv*, and vw*. Such a PWM signal generation method is generally known as a triangular-wave comparison method. In addition, the method of generating the PWM signal is not limited to the triangular-wave comparison method, and a spatial vector modulation method or the like may be used.

Second Embodiment

Figure 15:
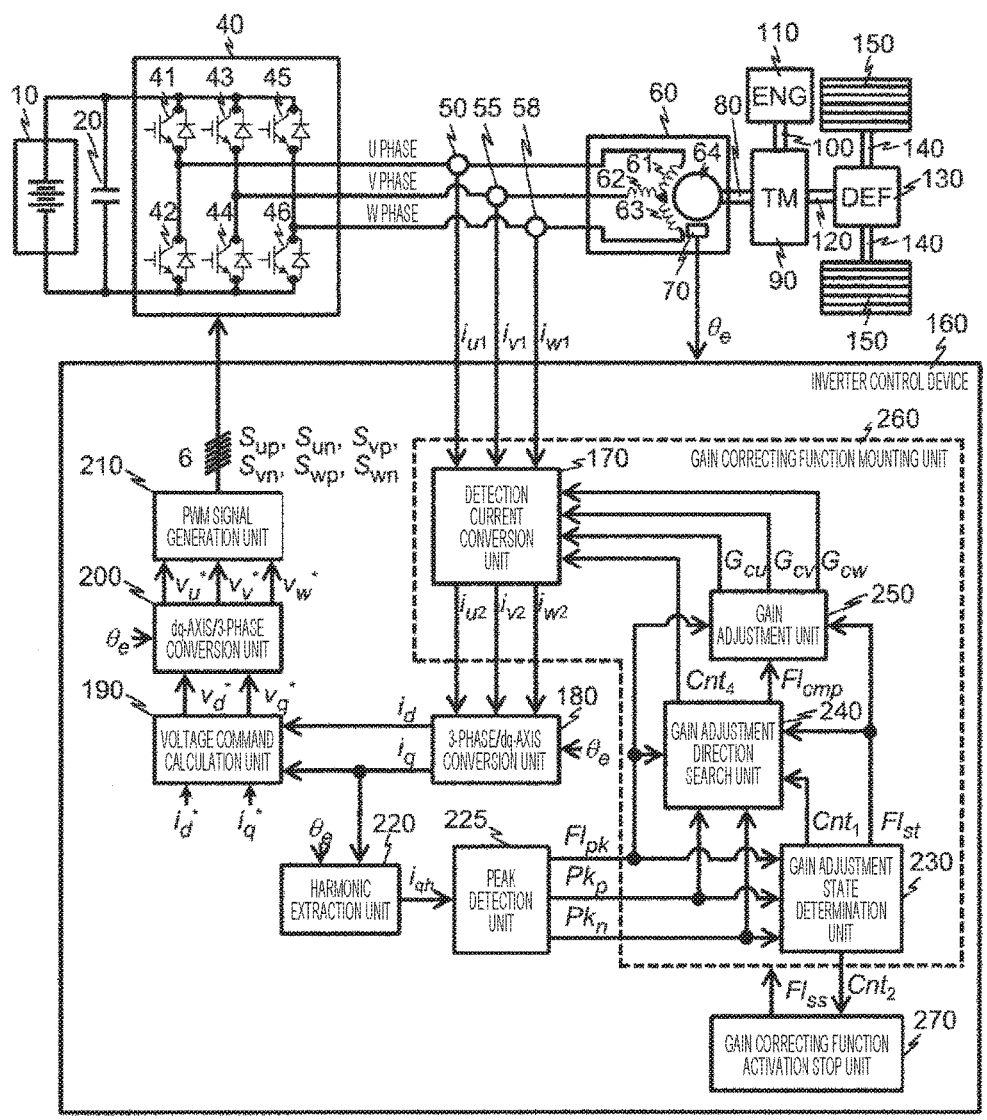
FIG. 15 is a diagram for describing a vehicle system according to a second embodiment.

FIG. 15 is a diagram for describing a vehicle system according to a second embodiment. The first embodiment described above is a method of correcting a gain unbalance of two current sensors in a 2-phase current detection system in which the current sensors are attached to the U phase and the V phase, the U phase and the W phase, or the V phase and the W phase. This embodiment is a method of correcting a gain unbalance of three current sensors in a 3-phase current detection system in which the current sensors are attached to all the UVW phases. The configurations of the inverter control device 160 except a gain correcting function mounting unit 260 and a gain correcting function activation stop unit 270 are the same as those of the first embodiment, and thus the description thereof will be omitted.

The gain correcting function mounting unit 260 according to this embodiment includes the detection current conversion unit 170, the gain adjustment state determination unit 230, the gain adjustment direction search unit 240, and the gain adjustment unit 250.

The gain correcting function mounting unit 260 starts or stops to correct a variation of the gain Gsu of the U-phase current sensor 50, the gain Gsv of the V-phase current sensor 55, and a gain Gsw of a W-phase current sensor 58 on the basis of a correcting function activation stop flag Flss generated by the gain correcting function activation stop unit 270 described below. The gain correcting function activation stop unit 270 determines a timing for correcting a variation of the gain Gsu of the U-phase current sensor 50, the gain Gsv of the V-phase current sensor 55, and the gain Gsw of the W-phase current sensor 58 according to an algorithm of activating/stopping a gain correcting function provided in the gain correcting function activation stop unit 270.

Figure 16:
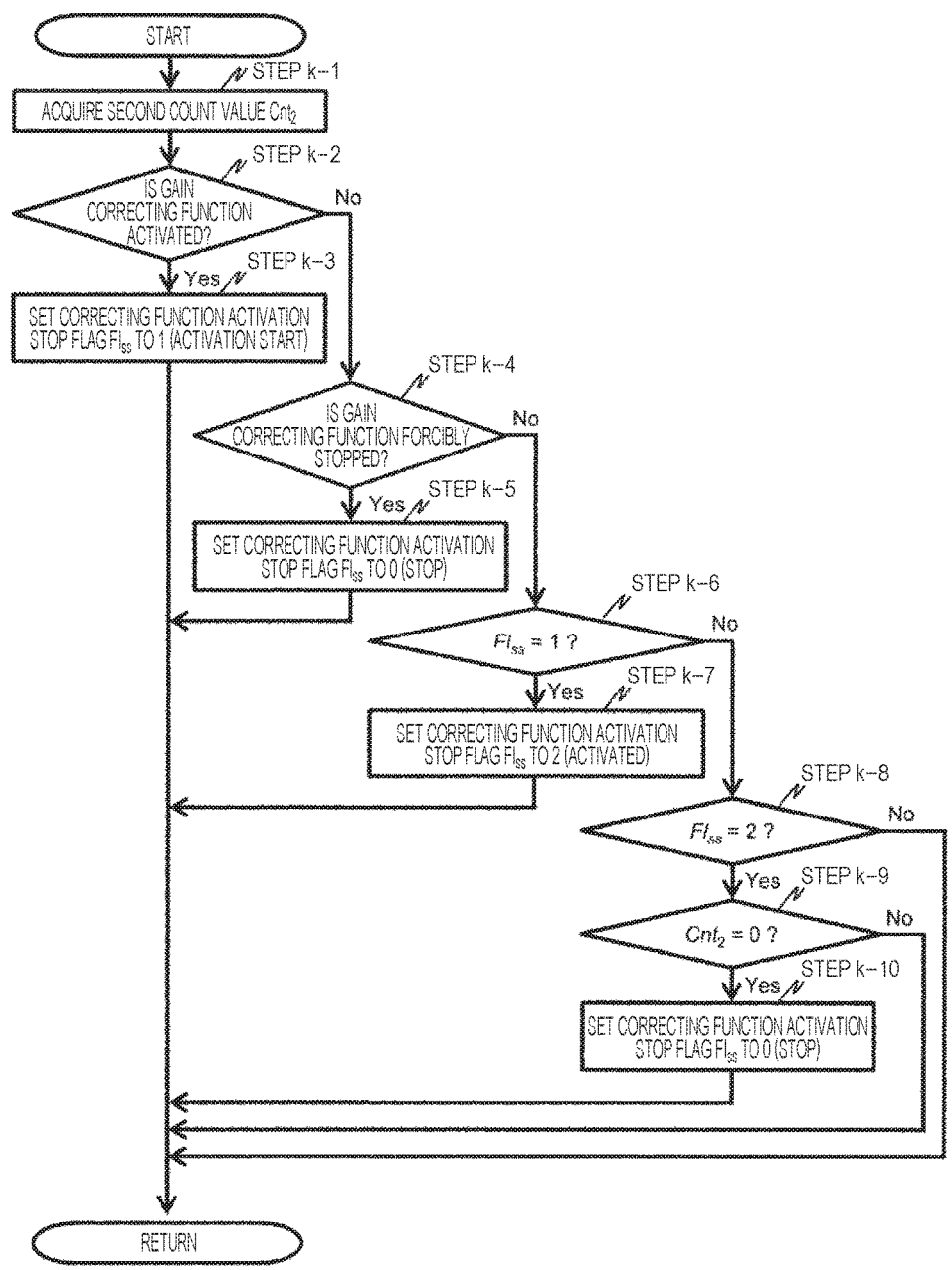
FIG. 16 is a diagram for describing a processing procedure of a gain correcting function activation stop unit 270 according to the second embodiment.

FIG. 16 is a diagram for describing a processing procedure of the gain correcting function activation stop unit 270 according to the second embodiment. First, the gain correcting function activation stop unit 270 acquires a second count value Cnt2 generated by the gain adjustment state determination unit 230 (described below) in Step k-1. While the details will be described below, the second count value Cnt2 will be set to "0" when the correction of the variation of the gain Gsu of the U-phase current sensor 50, the gain Gsv of the V-phase current sensor 55, and the gain Gsw of the W-phase current sensor 58 is ended. Next, the gain correcting function activation stop unit 270 determines whether the gain correcting function is activated in Step k-2. Herein, a timing of activating the gain correcting function is previously set, for example, to a case where a temperature sensor (not illustrated) is attached to the inverter control device 160 or the motor 60 and the temperature detected by the temperature sensor is changed, or to a predetermined time interval.

In a case where it is determined that the gain correcting function is activated in Step k-2, the gain correcting function activation stop unit 270 sets the correcting function activation stop flag Flss to "1" (activation start) in Step k-3. On the other hand, in a case where it is determined that the gain correcting function is not activated in Step k-2, the gain correcting function activation stop unit 270 determines whether the gain correcting function is forcibly stopped in Step k-4.

In a case where it is determined that the gain correcting function is forcibly stopped in Step k-4, the gain correcting function activation stop unit 270 sets the correcting function activation stop flag Flss to "0" (stop) in Step k-5. On the other hand, in a case where it is determined that the gain correcting function is not forcibly stopped in Step k-4, the gain correcting function activation stop unit 270 determines whether the correcting activation stop flag Flss is "1" (activation start) in Step k-6.

In a case where it is determined that the correcting activation stop flag Flss is "1" (activation start) in Step k-6, the gain correcting function activation stop unit 270 sets the correcting function activation stop flag Flss to "2" (activated) in Step k-7. On the other hand, in a case where it is determined that the correcting activation stop flag Flss is not "1" (activation start) in Step k-6, the gain correcting function activation stop unit 270 determines whether the correcting function activation stop flag Flss is (activated) in Step k-8.

In a case where it is determined that the correcting function activation stop flag Flss is "2" (activated) in Step k-8, the gain correcting function activation stop unit 270 determines whether the second count value Cnt2 acquired in Step k-1 is "0" in Step k-9. In a case where it is determined that the second count value Cnt2 is "0" in Step k-9, the gain correcting function activation stop unit 270 sets the correcting function activation stop flag Flss to "0" (stop) in Step k-10. On the other hand, in a case where it is determined that the second count value Cnt2 is not "0" in Step k-9, the gain correcting function activation stop unit 270 restarts the process from Step k-1 at the next calculation timing without performing any process.

In addition, in a case where it is determined that the correcting function activation stop flag Flss is not "2" (activated) in Step k-8, the gain correcting function activation stop unit 270 restarts the process from Step k-1 at the next calculation timing without performing any process.

(Description of Process of Gain Adjustment State Determination Unit 230)

Figure 17:
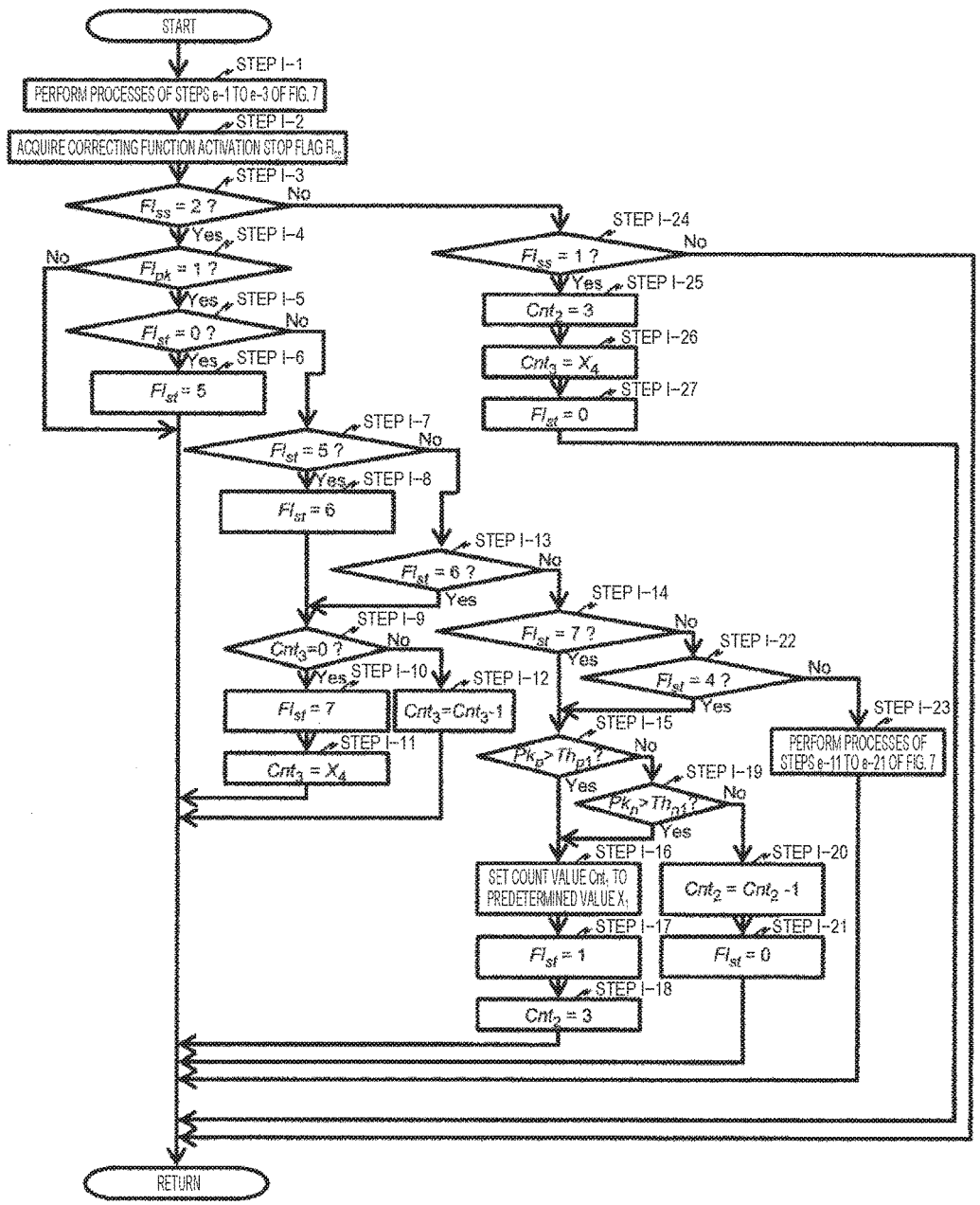
FIG. 17 is a diagram for describing a processing procedure of the gain adjustment state determination unit 230 according to the second embodiment.

FIG. 17 is a diagram for describing a processing procedure of the gain adjustment state determination unit 230 according to the second embodiment. First, the gain adjustment state determination unit 230 performs processes Steps e-1 to e-3 illustrated in FIG. 7 in Step l-1. Next, the gain adjustment state determination unit 230 acquires the correcting function activation stop flag Flss generated by the gain correcting function activation stop unit 270 in Step 1-2. Next, the gain adjustment state determination unit 230 determines whether the correcting function activation stop flag Flss acquired in Step 1-2 is "2" (activated) in Step 1-3.

In a case where it is determined that the correcting function activation stop flag Flss is "2" (activated) in Step 1-3, the gain adjustment state determination unit 230 determines whether the peak detection flag Flpk acquired in Step 1-1 is "1" (on) in Step 1-4.

In a case where it is determined that the peak detection flag Flpk is "1" (on) in Step 1-4, the gain adjustment state determination unit 230 determines whether the adjustment state determination flag Flst set in Step 1-6, 1-8, 1-10, 1-17, 1-21, 1-23, or 1-27 described below is "0" (end) in Step 1-5. In a case where it is determined that the adjustment state determination flag Flst is "0" (end) in Step 1-5, the gain adjustment state determination unit 230 sets the adjustment state determination flag Flst to "5" (switching start) in Step 1-6. On the other hand, in a case where it is determined that the correction state determination flag Flst is not "0" (end) in Step 1-5, the gain adjustment state determination unit 230 determines whether the adjustment state determination flag Flst is "5" (switching start) in Step 1-7.

In a case where it is determined that the adjustment state determination flag Flst is "5" (switching start) in Step 1-7, the gain adjustment state determination unit 230 sets the adjustment state determination flag Flst to "6" (switching) in Step 1-8. Next, the gain adjustment state determination unit 230 determines whether a third count value Cnt3 is "0" in Step 1-9.

In a case where it is determined that the third count value Cnt3 is "0" in Step 1-9, the gain adjustment state determination unit 230 sets the adjustment state determination flag Flst to "7" (switching completion) in Step 1-10. Next, the gain adjustment state determination unit 230 sets the third count value Cnt3 to a predetermined value X4 in Step 1-11. Herein, it is preferable to set the predetermined value X4 to a value which is a multiple of "2" and equal to or more than "4" in order to correctly determine an adjustment direction of a detection gain described below.

On the other hand, in a case where it is determined that the third count value Cnt3 is not "0" in Step 1-9, the gain adjustment state determination unit 230 counts down the third count value Cnt3 in Step 1-12.

In addition, in a case where it is determined that the adjustment state determination flag Flst is not "5" (switching start) in Step 1-7, the gain adjustment state determination unit 230 determines whether the adjustment state determination flag Flst is "6" (switching) in Step 1-13. In a case where it is determined that the adjustment state determination flag Flst is "6" (switching) in Step 1-13, the procedure proceeds to the process of Step 1-9 described above. On the other hand, in a case where it is determined that the adjustment state determination flag Flst is not "6" (switching) in Step 1-13, the gain adjustment state determination unit 230 determines whether the adjustment state determination flag Flst is "7" (switching completion) in Step 1-14.

In a case where it is determined that the adjustment state determination flag Flst is "7" (switching completion) in Step 1-14, the gain adjustment state determination unit 230 determines whether the positive peak value Pkp of the q-axis harmonic current acquired in Step 1-1 is larger than the first positive threshold Thp1 in Step 1-15.

In a case where it is determined that the positive peak value Pkp of the q-axis harmonic current is larger than the first positive threshold Thp1 in Step 1-15, the gain adjustment state determination unit 230 sets the first count value Cnt1 to the predetermined value X1 in Step 1-16. Herein, the predetermined value X1 is set to a positive integer which is a multiple of "2" as described in the first embodiment. Next, the gain adjustment state determination unit 230 sets the adjustment state determination flag Flst to "1" (search) in Step 1-17. Next, the gain adjustment state determination unit 230 sets the second count value Cnt2 to "3" in Step 1-18.

On the other hand, in a case where it is determined that the positive peak value Pkp of the q-axis harmonic current is not larger than the first positive threshold Thp1 in Step 1-15, the gain adjustment state determination unit 230 determines whether the negative peak value Pkn of the q-axis harmonic current acquired in Step 1-1 is smaller than the first negative threshold Thn1 in Step 1-19.

In a case where it is determined that the negative peak value Pkn of the q-axis harmonic current is smaller than the first negative threshold Thn1 in Step 1-19, the processes of Steps 1-16 to 1-18 described above are performed. On the other hand, in a case where it is determined that the negative peak value Pkn of the q-axis harmonic current is not smaller than the first negative threshold Thn1 in Step 1-19, the gain adjustment state determination unit 230 counts down the second count value Cnt2 in Step 1-20. Next, the gain adjustment state determination unit 230 sets the adjustment state determination flag Flst to "0" (end) in Step 1-21.

In addition, in a case where it is determined that the adjustment state determination flag Flst is not "7" (switching completion) in Step 1-14, the gain adjustment state determination unit 230 determines whether the adjustment state determination flag Flst is "4" (reset) in Step 1-22. In a case where it is determined that the adjustment direction determination flag Flst is "4" (reset) in Step 1-22, the procedure proceeds to the process of Step 1-15 described above. On the other hand, in a case where it is determined that the adjustment direction determination flag Flst is not "4" (reset) in Step 1-22, the gain adjustment state determination unit 230 performs the processes of Steps e-11 to e-21 illustrated in FIG. 7 in Step 1-23.

In addition, in a case where it is determined that the peak detection flag Flpk is not "1" (on) in Step 1-4, the gain adjustment state determination unit 230 restarts the process from Step 1-1 at the next calculation timing without performing any process.

In addition, in a case where it is determined that the correcting function activation stop flag Flss is not "2" (activated) in Step 1-3, the gain adjustment state determination unit 230 determines whether the correcting function activation stop flag Flss is "1" (activation start) in Step 1-24. In a case where it is determined that the correcting function activation stop flag Flss is (activation start) in Step 1-24, the gain adjustment state determination unit 230 sets the second count value Cnt2 to "3" in Step 1-25. Next, the gain adjustment state determination unit 230 sets the third count value Cnt3 to the predetermined value X4 in Step 1-26. Next, the gain adjustment state determination unit 230 sets the adjustment state determination flag Flst to "0" (end) in Step 1-27.

On the other hand, in a case where it is determined that the correcting function activation stop flag Flss is not "1" (activation start) in Step 1-24, the gain adjustment state determination unit 230 restarts the process from Step 1-1 at the next calculation timing without performing any process.

Since the adjustment state determination flag Flst is generated in this way, even in a case where the gain adjustment unit 250 described below fails in adjusting the detection gain of each phase, the failure of gain adjustment is detected in Step l-23 (specifically, Step e-15 and Step e-17 illustrated in FIG. 7) described above. Further, it is possible to generate a signal to reset the detection gain of each phase to an initial value (specifically, by the process of Step e-16 illustrated in FIG. 7). Therefore, the gain adjustment unit 250 can perform the adjustment of the detection gain of each phase again.

In addition, in a case where the adjustment of the detection gain of each phase succeeds, the adjustment state determination flag Flst is regularly changed in an order of "5" (switching start of a phase to be adjusted in the detection gain), "6" (switching of a phase to be adjusted in the detection gain), "7" (switching completion of a phase to be adjusted in the detection gain), "1" (search of an adjustment direction of the detection gain), "2" (adjustment start of the detection gain), "3" (adjustment continuation of the detection gain), and "0" (adjustment completion of the detection gain) until the second count value Cnt2 becomes "0".

In addition, while the details will be described below, a 2-phase gain unbalance of the gain Gsu of the U-phase current sensor 50 and the gain Gsv of the V-phase current sensor 55 is corrected first in this embodiment. Next, a 2-phase gain unbalance of the gain Gsu of the U-phase current sensor 50 and the gain Gsw of the W-phase current sensor 58 is corrected. Then, a 2-phase gain unbalance of the gain Gsv of the V-phase current sensor 55 and the gain Gsw of the W-phase current sensor 58 is corrected. Repeating these processes, a 3-phase gain unbalance of the gain Gsu of the U-phase current sensor 50, the gain Gsv of the V-phase current sensor 55, and the gain Gsw of the W-phase current sensor 58 can be corrected.

(Description of Process of Gain Adjustment Direction Search Unit 240)

Figure 18:
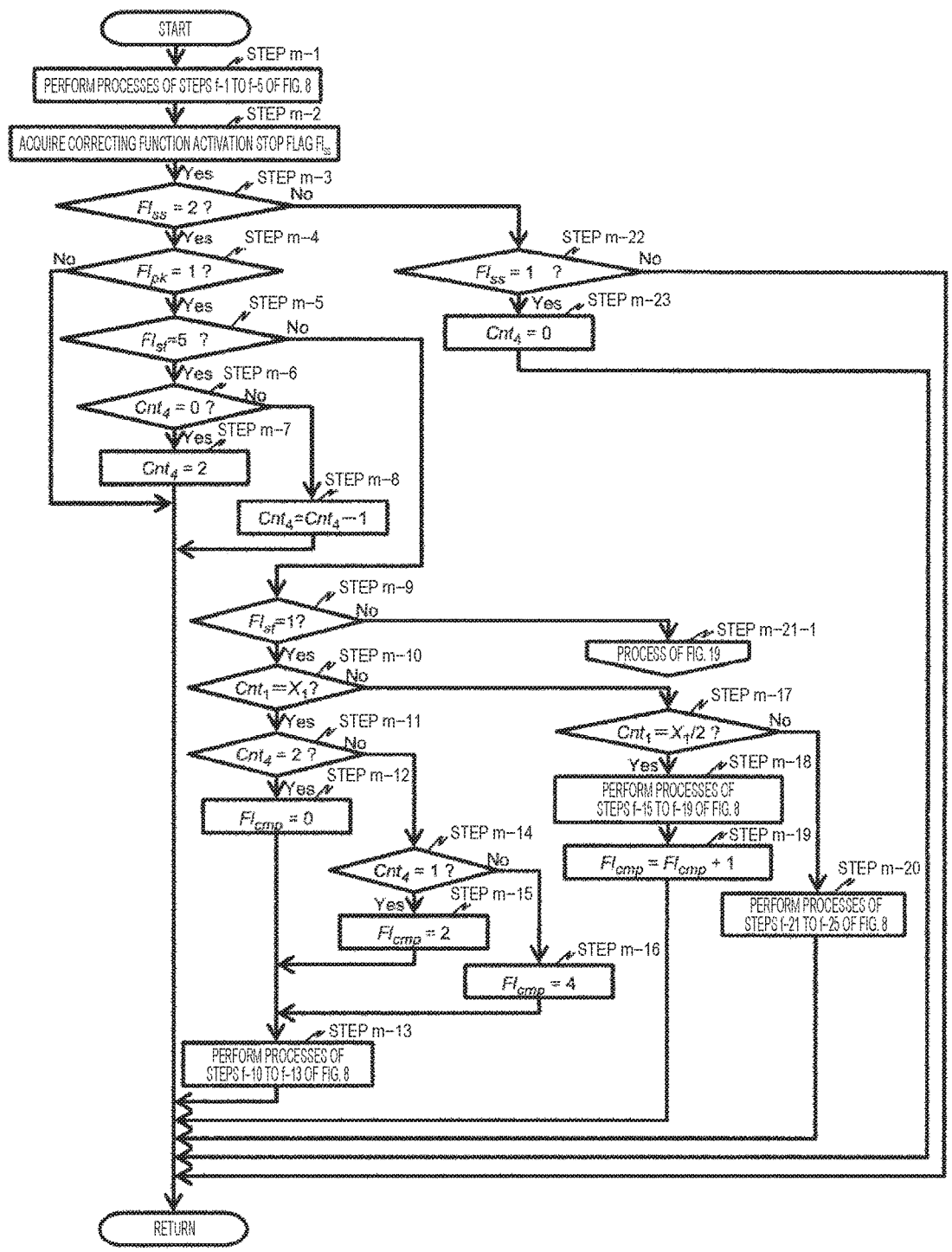
FIG. 18 is a diagram for describing a processing procedure of the gain adjustment direction search unit 240 according to the second embodiment.

FIG. 18 is a diagram for describing a processing procedure of the gain adjustment direction search unit 240 according to the second embodiment. First, the gain adjustment direction search unit 240 performs the processes of Steps f-2 to f-5 illustrated in FIG. 8 in Step m-1. Next, the gain adjustment direction search unit 240 acquires the correcting function activation stop flag Flss generated by the gain correcting function activation stop unit 270 in Step m-2. Next, the gain adjustment direction search unit 240 determines whether the correcting function activation stop flag Flss acquired in Step m-2 is "2" (activated) in Step m-3.

In a case where it is determined that the correcting function activation stop flag Flss is "2" (activated) in Step m-3, the gain adjustment direction search unit 240 determines whether the peak detection flag Flpk acquired in Step m-1 is "1" (on) in Step m-4.

In a case where it is determined that the peak detection flag Flpk is "1" (on) in Step m-4, the gain adjustment direction search unit 240 determines whether the adjustment state determination flag Flst acquired in Step m-1 is "5" (switching start) in Step m-5.

In Step m-5, it is determined whether the adjustment state determination flag Flst is "5" (switching start). In a case where it is determined that the adjustment state determination flag Flst is "5" (switching start) in Step m-5, the gain adjustment direction search unit 240 determines whether a fourth count value Cnt4 is "0" in Step m-6.

In a case where it is determined that the fourth count value Cnt4 is "0" in Step m-6, the gain adjustment direction search unit 240 sets the fourth count value Cnt4 to "2" in Step m-7. On the other hand, in a case where it is determined that the fourth count value Cnt4 is not "0" in Step m-6, the gain adjustment direction search unit 240 counts down the fourth count value Cnt4 in Step m-8.

While the details will be described below, when the fourth count value Cnt4 is "2", a mode of correcting the variation of the gain Gsv of the U-phase current sensor 50 and the gain Gsv of the V-phase current sensor 55 is obtained, and the U-phase detection gain Gcu and the V-phase detection gain Gcv are adjusted. In addition, when the fourth count value Cnt4 is "1", a mode of correcting the variation of the gain Gsu of the U-phase current sensor 50 and the gain Gsw of the W-phase current sensor 58 is obtained, and the U-phase detection gain Gcu and a W-phase detection gain Gcw are adjusted. In addition, when the fourth count value Cnt4 is "0", a mode of correcting the gain Gsv of the V-phase current sensor 55 and the gain Gsw of the W-phase current sensor 58 is obtained, and the V-phase detection gain Gcv and the W-phase detection gain Gcw are adjusted.

In addition, in a case where it is determined that the adjustment state determination flag Flst is not "5" (switching start) in Step m-5, the gain adjustment direction search unit 240 determines whether the adjustment state determination flag Flst is "1" (search) in Step m-9.

In a case where it is determined that the adjustment state determination flag Flst is "1" (search) in Step m-9, the gain adjustment direction search unit 240 determines whether the first count value Cnt1 is equal to the predetermined value X1 in Step m-10.

In a case where it is determined that the first count value Cnt1 is equal to the predetermined value X1 in Step m-10, the gain adjustment direction search unit 240 determines whether the fourth count value Cnt4 is "2" in Step m-11.

In a case where it is determined that the fourth count value Cnt4 is "2" in Step m-11, the gain adjustment direction search unit 240 sets the adjustment direction determination flag Flcmp to "0" (a signal to increase the U-phase detection gain Gcu in a positive direction, and the V-phase detection gain Gcv in a negative direction) in Step m-12. Next, the gain adjustment direction search unit 240 performs the processes of Steps f-10 to f-13 illustrated in FIG. 8 in Step m-13.

On the other hand, in a case where it is determined that the fourth count value Cnt4 is not "2" in Step m-11, the gain adjustment direction search unit 240 determines whether the fourth count value Cnt4 is "1" in Step m-14. In a case where it is determined that the fourth count value Cnt4 is "1" in Step m-14, the gain adjustment direction search unit 240 sets the adjustment direction determination flag Flcmp to "2" (a signal to increase the U-phase detection gain Gcu in a positive direction, and the W-phase detection gain Gcw in a negative direction) in Step m-15, and performs the process of Step m-13 described above.

On the other hand, in a case where it is determined that the fourth count value Cnt4 is not "1" in Step m-14, the gain adjustment direction search unit 240 sets the adjustment direction determination flag Flcmp to "4" (a signal to increase the V-phase detection gain Gcv in a positive direction, and the W-phase detection gain Gcw in a negative direction) in Step m-16, and performs the process of Step m-13 described above.

In addition, in a case where it is determined that the first count value Cnt1 is not equal to the predetermined value X1 in Step m-10, the gain adjustment direction search unit 240 determines whether the first count value Cnt1 is equal to (X1/2) in Step m-17. In a case where it is determined that the first count value Cnt1 is equal to (X1/2) in Step m-17, the gain adjustment direction search unit 240 performs the processes of Steps f-15 to f-19 illustrated in FIG. 8 in Step m-18.

Next, the gain adjustment direction search unit 240 adds "1" to the current adjustment direction determination flag Flcmp in Step m-19, and determines the newest adjustment direction determination flag Flcmp. For example, in a case where it is determined that the current adjustment direction determination flag Flcmp is "0" (a signal to increase the U-phase detection gain Gcu in a positive direction, and the V-phase detection gain Gcv in a negative direction), the newest adjustment direction determination flag Flcmp becomes "1" (a signal to increase the U-phase detection gain Gcu in a negative direction, and the V-phase detection gain Gcv in a positive direction). In addition, in a case where it is determined that the current adjustment direction determination flag Flcmp is "2" (a signal to increase the U-phase detection gain Gcu in a positive direction, and the W-phase detection gain Gcw in a negative direction), the newest adjustment direction determination flag Flcmp becomes "3" (a signal to increase the U-phase detection gain Gcu in a negative direction, and the W-phase detection gain Gcw in a positive direction). In addition, in a case where it is determined that the current adjustment direction determination flag Flcmp is "4" (a signal to increase the V-phase detection gain Gcv in a positive direction, and the W-phase detection gain Gcw in a negative direction), the newest adjustment direction determination flag Flcmp becomes "5" (a signal to increase the V-phase detection gain Gcv in a negative direction, and the W-phase detection gain Gcw in a positive direction).

On the other hand, in a case where it is determined that the first count value Cnt1 is not equal to (X1/2) in Step m-17, the gain adjustment direction search unit 240 performs the processes of Steps f-21 to f-25 illustrated in FIG. 8 in Step m-20.

In addition, in a case where it is determined that the adjustment state determination flag Flst is not "1" (search) in Step m-9, the gain adjustment direction search unit 240 proceeds to the process of FIG. 19 (described below) in Step m-21-1.

In addition, in a case where it is determined that the peak detection flag Flpk is not "1" (on) in Step m-4, the gain adjustment direction search unit 240 restarts the process from Step m-1 at the next calculation timing without performing any process.

In addition, in a case where it is determined that the correcting function activation stop flag Flss is not "2" (activated) in Step m-3, the gain adjustment direction search unit 240 determines whether the correcting function activation stop flag Flss is "1" (activation start) in Step m-22.

In a case where it is determined that the correcting function activation stop flag Flss is "1" (activation start) in Step m-22, the gain adjustment direction search unit 240 sets the fourth count value Cnt4 to "0" in Step m-23. In this way, when the correcting function activation stop flag Flss is "1" (activation start), the fourth count value Cnt4 is set to "0" to set the fourth count value Cnt4 to "2" at the moment when the correcting function activation stop flag Flss becomes "2" (activated). Therefore, it can be made to start from the mode of correcting the variation of the gain Gsv of the U-phase current sensor 50 and the gain Gsv of the V-phase current sensor 55.

On the other hand, in a case where it is determined that the correcting function activation stop flag Flss is not "1" (activation start) in Step m-22, the gain adjustment direction search unit 240 restarts the process from Step m-1 at the next calculation timing without performing any process.

Figure 19:
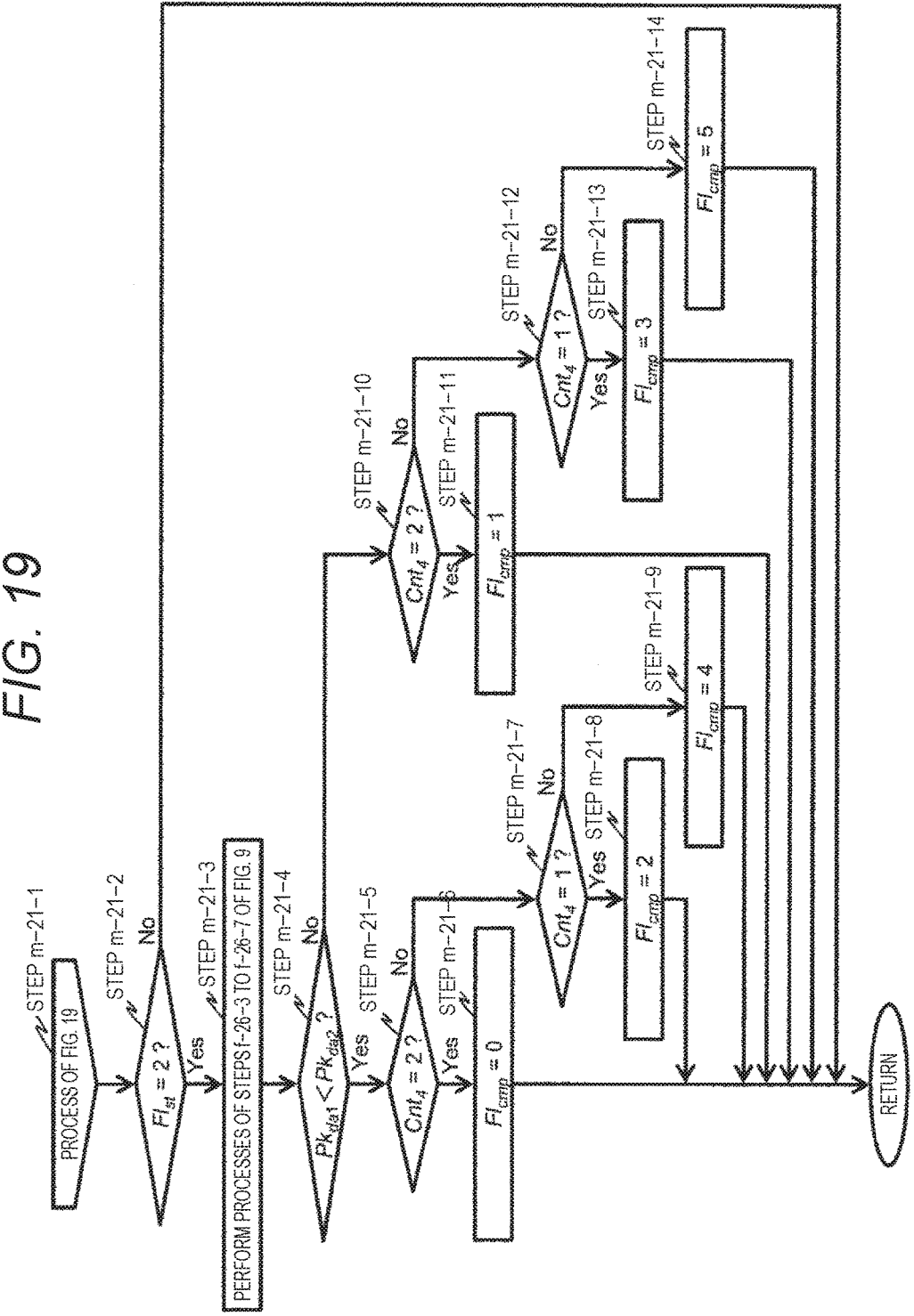
FIG. 19 is a diagram for describing a processing procedure of the gain adjustment direction search unit 240 when the adjustment state determination flag Flst is not "1" (search) in Step m-9 illustrated in FIG. 18.

FIG. 19 is a diagram for describing a processing procedure of the gain adjustment direction search unit 240 when the adjustment state determination flag Flst is not "1" (search) in Step m-9 illustrated in FIG. 18. First, the gain adjustment direction search unit 240 determines whether the adjustment state determination flag Flst is "2" (start) in Step m-21-2.

In a case where it is determined that the adjustment state determination flag Flst is "2" (start) in Step m-21-2, the gain adjustment direction search unit 240 performs the processes of Steps f-26-3 to f-26-7 illustrated in FIG. 9 in Step m-21-3. Next, in Step m-21-4, the gain adjustment direction search unit 240 determines whether the average value Pkda1 of the first peak-to-peak value calculated in Step m-18 illustrated in FIG. is smaller than the average value Pkda2 of the second peak-to-peak value calculated in Step m-21-3.

In a case where it is determined that the average value Pkda1 of the first peak-to-peak value is smaller than the average value Pkda2 of the second peak-to-peak value in Step m-21-4, the gain adjustment direction search unit 240 determines whether the fourth count value Cnt4 is equal to "2" in Step m-21-5.

In a case where it is determined that the fourth count value Cnt4 is equal to "2" in Step m-21-5, the gain adjustment direction search unit 240 sets the adjustment direction determination flag Flcmp to "0" (a signal to increase the U-phase detection gain Gcu in a positive direction, and the V-phase detection gain Gcv in a negative direction) in Step m-21-6. On the other hand, in a case where it is determined that the fourth count value Cnt4 is not equal to "2" in Step m-21-5, the gain adjustment direction search unit 240 determines whether the fourth count value Cnt4 is equal to "1" in Step m-21-7.

In a case where it is determined that the fourth count value Cnt4 is equal to "1" in Step m-21-7, the gain adjustment direction search unit 240 sets the adjustment direction determination flag Flcmp to "2" (a signal to increase the U-phase detection gain Gcu in a positive direction, and the W-phase detection gain Gcw in a negative direction) in Step m-21-8. On the other hand, in a case where it is determined that the fourth count value Cnt4 is not equal to "1" in Step m-21-7, the gain adjustment direction search unit 240 sets the adjustment direction determination flag Flcmp to "4" (a signal to increase the V-phase detection gain Gcv in a positive direction, and the W-phase detection gain Gcw in a negative direction) in Step m-21-9.

In addition, in a case where it is determined that the average value Pkda1 of the first peak-to-peak value is not smaller than the average value Pkda2 of the second peak-to-peak value in Step m-21-4, the gain adjustment direction search unit 240 determines whether the fourth count value Cnt4 is equal to "2" in Step m-21-10.

In a case where it is determined that the fourth count value Cnt4 is equal to "2" in Step m-21-10, the gain adjustment direction search unit 240 sets the adjustment direction determination flag Flcmp to "1" (a signal to increase the U-phase detection gain Gcu in a negative direction, and the V-phase detection gain Gcv in a positive direction) in Step m-21-11. On the other hand, in a case where it is determined that the fourth count value Cnt4 is not equal to "2" in Step m-21-10, the gain adjustment direction search unit 240 determines whether the fourth count value Cnt4 is equal to "1" in Step m-21-12.

In a case where it is determined that the fourth count value Cnt4 is equal to "1" in Step m-21-12, the gain adjustment direction search unit 240 sets the adjustment direction determination flag Flcmp to "3" (a signal to increase the U-phase detection gain Gcu in a negative direction, and the W-phase detection gain Gcw in a positive direction) in Step m-21-13. On the other hand, in a case where it is determined that the fourth count value Cnt4 is not equal to "1" in Step m-21-12, the gain adjustment direction search unit 240 sets the adjustment direction determination flag Flcmp to "5" (a signal to increase the V-phase detection gain Gcv in a negative direction, and the W-phase detection gain Gcw in a positive direction) in Step m-21-14.

In this way, a final adjustment direction determination flag Flcmp is determined on the basis of the magnitude relation between the average value Pkda1 of the first peak-to-peak value and the average value Pkda2 of the second peak-to-peak value which are calculated in a period when the adjustment state determination flag Flst is "1" (search). Therefore, it is possible to adjust the detection gain of each phase to make the peak-to-peak value of the q-axis current harmonic wave small in the gain adjustment unit 250 (described below). Further, even in a case where the q-axis harmonic current iqh calculated by the harmonic extraction unit 220 or the positive and negative peak values of the q-axis harmonic current calculated by the peak detection unit 225 are deviated due to an influence of noises, the adjustment direction determination flag Flcmp can be determined with accuracy to make the peak-to-peak value of the q-axis current harmonic wave small.

Herein, the description has been given about a method of adjusting both the selected first and second phase detection gains. However, the selected first phase detection gain is set as the reference gain, and only the selected second phase detection gain may be adjusted. Alternatively, the selected second phase detection gain is set as the reference gain, and only the selected first phase detection gain may be adjusted. For example, in a case where the U phase is selected as the first phase, and the V phase is selected as the second phase, the U-phase detection gain Gcu is set as the reference gain, and only the V-phase detection gain Gcv may be adjusted, or the V-phase detection gain Gcv is set as the reference gain, and the U-phase detection gain Gcu may be adjusted. In addition, in a case where the U phase is selected as the first phase, and the W phase is selected as the second phase, the U-phase detection gain Gcu is set as the reference gain, and only the W-phase detection gain Gcw may be adjusted, or the W-phase detection gain Gcw is set as the reference gain, and the U-phase detection gain Gcu may be adjusted. In addition, when the V phase is selected as the first phase, and the W phase is selected as the second phase, the V-phase detection gain Gcv is set as the reference gain, and only the W-phase detection gain Gcw may be adjusted, or the W-phase detection gain Gcw is set as the reference gain, and only the V-phase detection gain Gcv may be adjusted.

Figure 20:
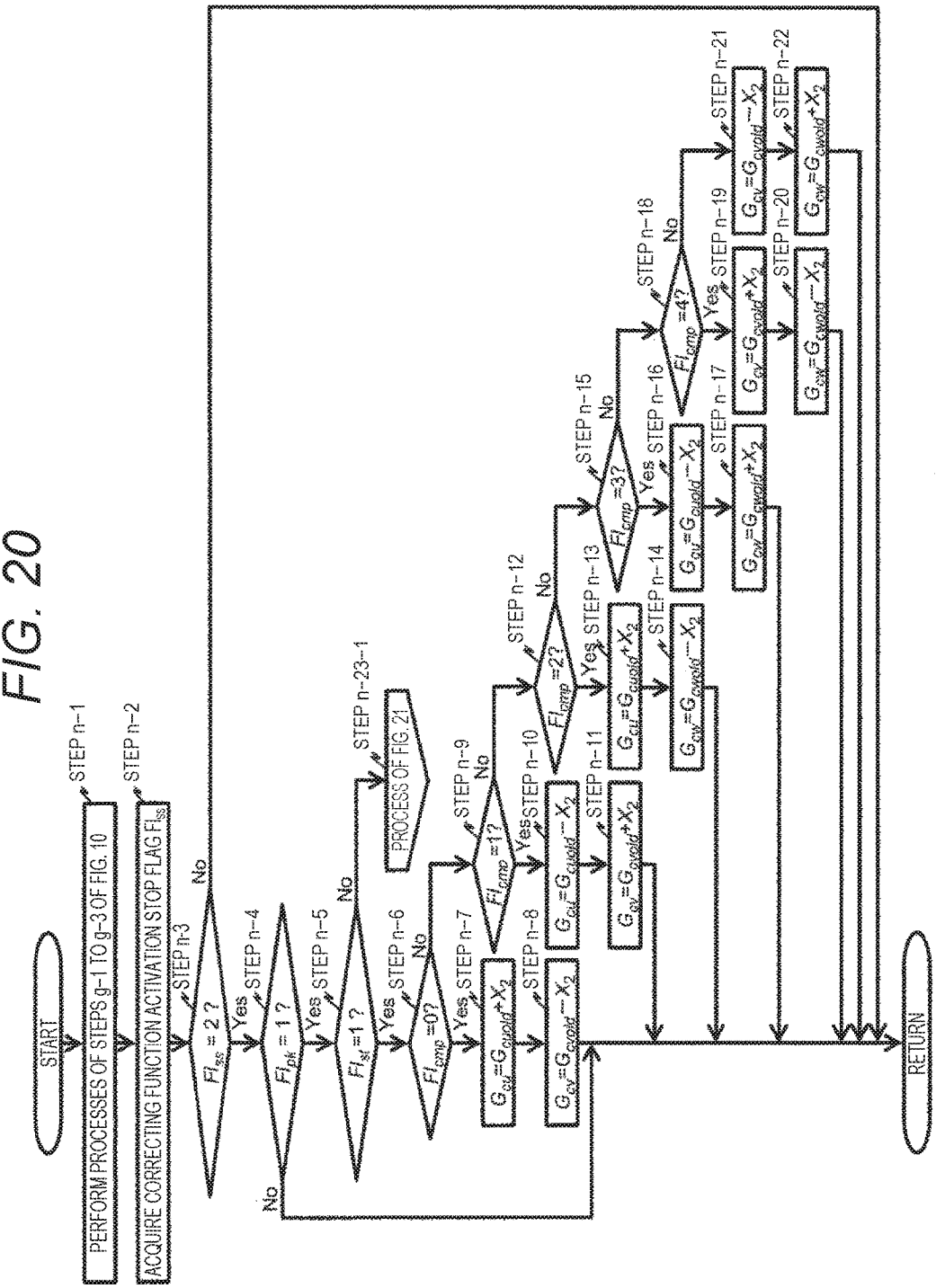
FIG. 20 is a diagram for describing a processing procedure of the gain adjustment unit 250 according to the second embodiment.

FIG. 20 is a diagram for describing a processing procedure of the gain adjustment unit 250 according to the second embodiment. First, the gain adjustment unit 250 performs the processes of g-1 to g-3 illustrated in FIG. 10 in Step n-1. Next, the gain adjustment unit 250 acquires the correcting function activation stop flag Flss generated by the gain correcting function activation stop unit 270 in Step n-2. Next, the gain adjustment unit 250 determines whether the correcting function activation stop flag Flss acquired in Step n-2 is (activated) in Step n-3.

In a case where it is determined that the correcting function activation stop flag Flss is "2" (activated) in Step n-3, the gain adjustment unit 250 determines whether the peak detection flag Flpk acquired in Step n-1 is "1" (on) in Step n-4.

In a case where it is determined that the peak detection flag Flpk is "1" (on) in Step n-4, the gain adjustment unit 250 determines whether the adjustment state determination flag Flst acquired in Step n-1 is "1" (search) in Step n-5.

In a case where it is determined that the adjustment state determination flag Flst is "1" (search) in Step n-5, the gain adjustment unit 250 determines whether the adjustment direction determination flag Flcmp is "0" (a signal to increase the U-phase detection gain Gcu in a positive direction, and the V-phase detection gain Gcv in a negative direction) in Step n-6.

In a case where it is determined that the adjustment direction determination flag Flcmp is "0" (a signal to increase the U-phase detection gain Gcu in a positive direction, and the V-phase detection gain Gcv in a negative direction) in Step n-6, the gain adjustment unit 250 adds the predetermined value X2 to the past value Gcuold of the U-phase detection gain, and increases the U-phase detection gain Gcu in the positive direction in Step n-7. Next, the gain adjustment unit 250 subtracts the predetermined value X2 from the past value Gcvold of the V-phase detection gain, and increases the V-phase detection gain Gcv in the negative direction in Step n-8.

On the other hand, in a case where it is determined that the adjustment direction determination flag Flcmp is not "0" (a signal to increase the U-phase detection gain Gcu in a positive direction, and the V-phase detection gain Gcv in a negative direction) in Step n-6, the gain adjustment unit 250 determines whether the adjustment direction determination flag Flcmp is "1" (a signal to increase the U-phase detection gain Gcu in a negative direction, and the V-phase detection gain Gcv in a positive direction) in Step n-9.

In a case where it is determined that the adjustment direction determination flag Flcmp is "1" (a signal to increase the U-phase detection gain Gcu in a negative direction, and the V-phase detection gain Gcv in a positive direction) in Step n-9, the gain adjustment unit 250 subtracts the predetermined value X2 from the past value Gcuold of the U-phase detection gain, and increases the U-phase detection gain Gcu in the negative direction in Step n-10. Next, the gain adjustment unit 250 adds the predetermined value X2 to the past value Gcvold of the V-phase detection gain, and increases the V-phase detection gain Gcv in the positive direction in Step n-11.

On the other hand, in a case where it is determined that the adjustment direction determination flag Flcmp is not "1" (a signal to increase the U-phase detection gain Gcu in a negative direction, and the V-phase detection gain Gcv in a positive direction) in Step n-9, the gain adjustment unit 250 determines whether the adjustment direction determination flag Flcmp is "2" (a signal to increase the U-phase detection gain Gcu in a positive direction, and the W-phase detection gain Gcw in a negative direction) in Step n-12.

In a case where it is determined that the adjustment direction determination flag Flcmp is "2" (a signal to increase the U-phase detection gain Gcu in a positive direction, and the W-phase detection gain Gcw in a negative direction) in Step n-12, the gain adjustment unit 250 adds the predetermined value X2 to the past value Gcuold of the U-phase detection gain, and increases the U-phase detection gain Gcu in the positive direction in Step n-13. Next, the gain adjustment unit 250 subtracts the predetermined value X2 from a past value Gcwold of the W-phase detection gain, and increases the W-phase detection gain Gcw in the negative direction in Step n-14.

On the other hand, in a case where it is determined that the adjustment direction determination flag Flcmp is not "2" (a signal to increase the U-phase detection gain Gcu in a positive direction, and the W-phase detection gain Gcw in a negative direction) in Step n-12, the gain adjustment unit 250 determines whether the adjustment direction determination flag Flcmp is "3" (a signal to increase the U-phase detection gain Gcu in a negative direction, and the W-phase detection gain Gcw in a positive direction) in Step n-15.

In a case where it is determined that the adjustment direction determination flag Flcmp is "3" (a signal to increase the U-phase detection gain Gcu in a negative direction, and the W-phase detection gain Gcw in a positive direction) in Step n-15, the gain adjustment unit 250 subtracts the predetermined value X2 from the past value Gcuold of the U-phase detection gain, and increases the U-phase detection gain Gcu in the negative direction in Step n-16. Next, the gain adjustment unit 250 adds the predetermined value X2 to the past value Gcwold of the W-phase detection gain, and increases the W-phase detection gain Gcw in the positive direction in Step n-17.

On the other hand, in a case where it is determined that the adjustment direction determination flag Flcmp is not "3" (a signal to increase the U-phase detection gain Gcu in a negative direction, and the W-phase detection gain Gcw in a positive direction) in Step n-15, the gain adjustment unit 250 determines whether the adjustment direction determination flag Flcmp is "4" (a signal to increase the V-phase detection gain Gcv in a positive direction, and the W-phase detection gain Gcw in a negative direction) in Step n-18.

In a case where it is determined that the adjustment direction determination flag Flcmp is "4" (a signal to increase the V-phase detection gain Gcv in a positive direction, and the W-phase detection gain Gcw in a negative direction) in Step n-18, the gain adjustment unit 250 adds the predetermined value X2 to the past value Gcvold of the V-phase detection gain, and increases the V-phase detection gain Gcv in the positive direction in Step n-19. Next, the gain adjustment unit 250 subtracts the predetermined value X2 from the past value Gcwold of the W-phase detection gain, and increases the W-phase detection gain Gcw in the negative direction in Step n-20.

On the other hand, in a case where it is determined that the adjustment direction determination flag Flcmp is not "4" (a signal to increase the V-phase detection gain Gcv in a positive direction, and the W-phase detection gain Gcw in a negative direction) in Step n-18, the gain adjustment unit 250 subtracts the predetermined value X2 from the past value Gcvold of the V-phase detection gain, and increases the V-phase detection gain Gcv in the negative direction in Step n-21. Next, the gain adjustment unit 250 adds the predetermined value X2 to the past value Gcwold of the W-phase detection gain in Step n-22, and increases the W-phase detection gain Gcw in the positive direction.

In addition, in a case where it is determined that the adjustment state determination flag Flst is not "1" (search) in Step n-5, the gain adjustment unit 250 proceeds to the process of FIG. 21 (described below) in Step n-23-1.

In addition, in a case where it is determined that the peak detection flag Flpk is not "1" (on) in Step n-4, the gain adjustment unit 250 restarts the process from Step n-1 at the next calculation timing without performing any process.

In addition, in a case where it is determined that the correcting function activation stop flag Flss is not "2" (activated) in Step n-3, the gain adjustment unit 250 restarts the process from Step n-1 at the next calculation timing without performing any process.

Figure 21:
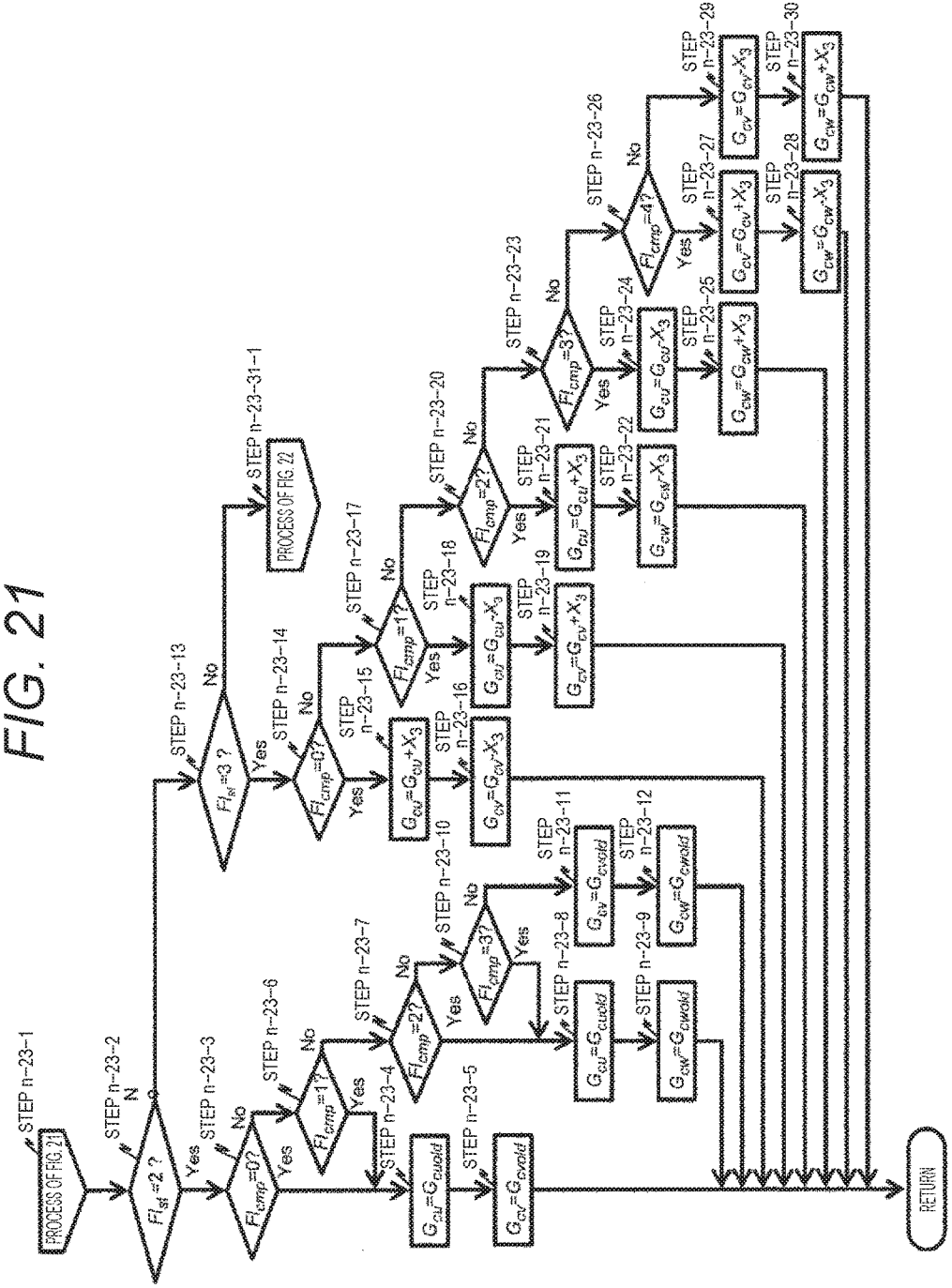
FIG. 21 is a diagram for describing a processing procedure of the gain adjustment unit 250 when the adjustment state determination flag Flst is not "1" (search) in Step n-5 illustrated in FIG. 20.

FIG. 21 is a diagram for describing a processing procedure of the gain adjustment unit 250 when it is determined that the adjustment state determination flag Flst is not "1" (search) in Step n-5 illustrated in FIG. 20. First, the gain adjustment unit 250 determines whether the adjustment state determination flag Flst is "2" (start) in Step n-23-2.

In a case where it is determined that the adjustment state determination flag Flst is "2" (start) in Step n-23-2, the gain adjustment unit 250 determines whether the adjustment direction determination flag Flcmp is "0" (a signal to increase the U-phase detection gain Gcu in a positive direction, and the V-phase detection gain Gcv in a negative direction) in Step n-23-3.

In a case where it is determined that the adjustment direction determination flag Flcmp is "0" (a signal to increase the U-phase detection gain Gcu in a positive direction, and the V-phase detection gain Gcv in a negative direction) in Step n-23-3, the gain adjustment unit 250 sets the past value Gcuold of the U-phase detection gain as the U-phase detection gain Gcu in Step n-23-4. Next, the gain adjustment unit 250 sets the past value Gcvold of the V-phase detection gain as the V-phase detection gain Gcv in Step n-23-5.

On the other hand, in a case where it is determined that the adjustment direction determination flag Flcmp is not "0" (a signal to increase the U-phase detection gain Gcu in a positive direction, and the V-phase detection gain Gcv in a negative direction) in Step n-23-3, the gain adjustment unit 250 determines whether the adjustment direction determination flag Flcmp is "1" (a signal to increase the U-phase detection gain Gcu in a negative direction, and the V-phase detection gain Gcv in a positive direction) in Step n-23-6.

In a case where it is determined that the adjustment direction determination flag Flcmp is "1" (a signal to increase the U-phase detection gain Gcu in a negative direction, and the V-phase detection gain Gcv in a positive direction) in Step n-23-6, the gain adjustment unit 250 proceeds to the process of Step n-23-4 described above.

On the other hand, in a case where it is determined that the adjustment direction determination flag Flcmp is not "1" (a signal to increase the U-phase detection gain Gcu in a negative direction, and the V-phase detection gain Gcv in a positive direction) in Step n-23-6, the gain adjustment unit 250 determines whether the adjustment direction determination flag Flcmp is "2" (a signal to increase the U-phase detection gain Gcu in a positive direction, and the W-phase detection gain Gcw in a negative direction) in Step n-23-7.

In a case where it is determined that the adjustment direction determination flag Flcmp is "2" (a signal to increase the U-phase detection gain Gcu in a positive direction, and the W-phase detection gain Gcw in a negative direction) in Step n-23-7, the gain adjustment unit 250 sets the past value Gcuold of the U-phase detection gain as the U-phase detection gain Gcu in Step n-23-8. Next, the gain adjustment unit 250 sets the past value Gcwold of the W-phase detection gain as the W-phase detection gain Gcw in Step n-23-9.

On the other hand, in a case where it is determined that the adjustment direction determination flag Flcmp is not "2" (a signal to increase the U-phase detection gain Gcu in a positive direction, and the W-phase detection gain Gcw in a negative direction) in Step n-23-7, the gain adjustment unit 250 determines whether the adjustment direction determination flag Flcmp is "3" (a signal to increase the U-phase detection gain Gcu in a negative direction, and the W-phase detection gain Gcw in a positive direction) in Step n-23-10.

In a case where it is determined that the adjustment direction determination flag Flcmp is "3" (a signal to increase the U-phase detection gain Gcu in a negative direction, and the W-phase detection gain Gcw in a positive direction) in Step n-23-10, the gain adjustment unit 250 proceeds to the process of Step n-23-8 described above.

On the other hand, in a case where it is determined that the adjustment direction determination flag Flcmp is not "3" (a signal to increase the U-phase detection gain Gcu in a negative direction, and the W-phase detection gain Gcw in a positive direction) in Step n-23-10, the gain adjustment unit 250 sets the past value Gcvold of the V-phase detection gain as the V-phase detection gain Gcv in Step n-23-11. Next, the gain adjustment unit 250 sets the past value Gcwold of the W-phase detection gain as the W-phase detection gain Gcw in Step n-23-12.

In addition, in a case where it is determined that the adjustment state determination flag Flst is not "2" (start) in Step n-23-2, the gain adjustment unit 250 determines whether the adjustment state determination flag Flst is "3" (continuation) in Step n-23-13.

In a case where it is determined that the adjustment state determination flag Flst is "3" (continuation) in Step n-23-13, the gain adjustment unit 250 determines whether the adjustment direction determination flag Flcmp is "0" (a signal to increase the U-phase detection gain Gcu in a positive direction, and the V-phase detection gain Gcv in a negative direction) in Step n-23-14.

In a case where it is determined that the adjustment direction determination flag Flcmp is "0" (a signal to increase the U-phase detection gain Gcu in a positive direction, and the V-phase detection gain Gcv in a negative direction) in Step n-23-14, the gain adjustment unit 250 adds the predetermined value X3 to the U-phase detection gain Gcu calculated at the last time, and calculates the newest U-phase detection gain Gcu in Step n-23-15. Next, the gain adjustment unit 250 subtracts the predetermined value X3 from the V-phase detection gain Gcv calculated at the last time, and calculates the newest V-phase detection gain Gcv in Step n-23-16.

On the other hand, in a case where it is determined that the adjustment direction determination flag Flcmp is not "0" (a signal to increase the U-phase detection gain Gcu in a positive direction, and the V-phase detection gain Gcv in a negative direction) in Step n-23-14, the gain adjustment unit 250 determines whether the adjustment direction determination flag Flcmp is "1" (a signal to increase the U-phase detection gain Gcu in a negative direction, and the V-phase detection gain Gcv in a positive direction) in Step n-23-17.

In a case where it is determined that the adjustment direction determination flag Flcmp is "1" (a signal to increase the U-phase detection gain Gcu in a negative direction, and the V-phase detection gain Gcv in a positive direction) in Step n-23-17, the gain adjustment unit 250 subtracts the predetermined value X3 from the U-phase detection gain Gcu calculated at the last time, and calculates the newest U-phase detection gain Gcu in Step n-23-18. Next, the gain adjustment unit 250 adds the predetermined value X3 to the V-phase detection gain Gcv calculated at the last time, and calculates the newest V-phase detection gain Gcv in Step n-23-19.

On the other hand, in a case where it is determined that the adjustment direction determination flag Flcmp is not "1" (a signal to increase the U-phase detection gain Gcu in a negative direction, and the V-phase detection gain Gcv in a positive direction) in Step n-23-17, the gain adjustment unit 250 determines whether the adjustment direction determination flag Flcmp is "2" (a signal to increase the U-phase detection gain Gcu in a positive direction, and the W-phase detection gain Gcw in a negative direction) in Step n-23-20.

In a case where it is determined that the adjustment direction determination flag Flcmp is "2" (a signal to increase the U-phase detection gain Gcu in a positive direction, and the W-phase detection gain Gcw in a negative direction) in Step n-23-20, the gain adjustment unit 250 adds the predetermined value X3 to the U-phase detection gain Gcu calculated at the last time, and calculates the newest U-phase detection gain Gcu in Step n-23-21. Next, the gain adjustment unit 250 subtracts the predetermined value X3 from the W-phase detection gain Gcw calculated at the last time, and calculates the newest W-phase detection gain Gcw in Step n-23-22.

On the other hand, in a case where it is determined that the adjustment direction determination flag Flcmp is not "2" (a signal to increase the U-phase detection gain Gcu in a positive direction, and the W-phase detection gain Gcw in a negative direction) in Step n-23-20, the gain adjustment unit 250 determines whether the adjustment direction determination flag Flcmp is "3" (a signal to increase the U-phase detection gain Gcu in a negative direction, and the W-phase detection gain Gcw in a positive direction) in Step n-23-23.

In a case where it is determined that the adjustment direction determination flag Flcmp is "3" (a signal to increase the U-phase detection gain Gcu in a negative direction, and the W-phase detection gain Gcw in a positive direction) in Step n-23-23, the gain adjustment unit 250 subtracts the predetermined value X3 from the U-phase detection gain Gcu calculated at the last time, and calculates the newest U-phase detection gain Gcu in Step n-23-24. Next, the gain adjustment unit 250 adds the predetermined value X3 to the W-phase detection gain Gcw calculated at the last time, and calculates the newest W-phase detection gain Gcw in Step n-23-25.

On the other hand, in a case where it is determined that the adjustment direction determination flag Flcmp is not "3" (a signal to increase the U-phase detection gain Gcu in a negative direction, and the W-phase detection gain Gcw in a positive direction) in Step n-23-23, the gain adjustment unit 250 determines whether the adjustment direction determination flag Flcmp is "4" (a signal to increase the V-phase detection gain Gcv in a positive direction, and the W-phase detection gain Gcw in a negative direction) in Step n-23-26.

In a case where it is determined that the adjustment direction determination flag Flcmp is "4" (a signal to increase the V-phase detection gain Gcv in a positive direction, and the W-phase detection gain Gcw in a negative direction) in Step n-23-26, the gain adjustment unit 250 adds the predetermined value X3 to the V-phase detection gain Gcv calculated at the last time, and calculates the newest V-phase detection gain Gcv in Step n-23-27. Next, the gain adjustment unit 250 subtracts the predetermined value X3 from the W-phase detection gain Gcw calculated at the last time, and calculates the newest W-phase detection gain Gcw in Step n-23-28.

On the other hand, in a case where it is determined that the adjustment direction determination flag Flcmp is not "4" (a signal to increase the V-phase detection gain Gcv in a positive direction, and the W-phase detection gain Gcw in a negative direction) in Step n-23-26, the gain adjustment unit 250 subtracts the predetermined value X3 from the V-phase detection gain Gcv calculated at the last time, and calculates the newest V-phase detection gain Gcv in Step n-23-29.

Next, the gain adjustment unit 250 adds the predetermined value X3 to the W-phase detection gain Gcw calculated at the last time, and calculates the newest W-phase detection gain Gcw in Step n-23-30. In addition, in a case where it is determined that the adjustment state determination flag Flst is not "3" (continuation) in Step n-23-13, the gain adjustment unit 250 proceeds to the process of FIG. 22 described below in Step n-23-31-1.

Figure 22:
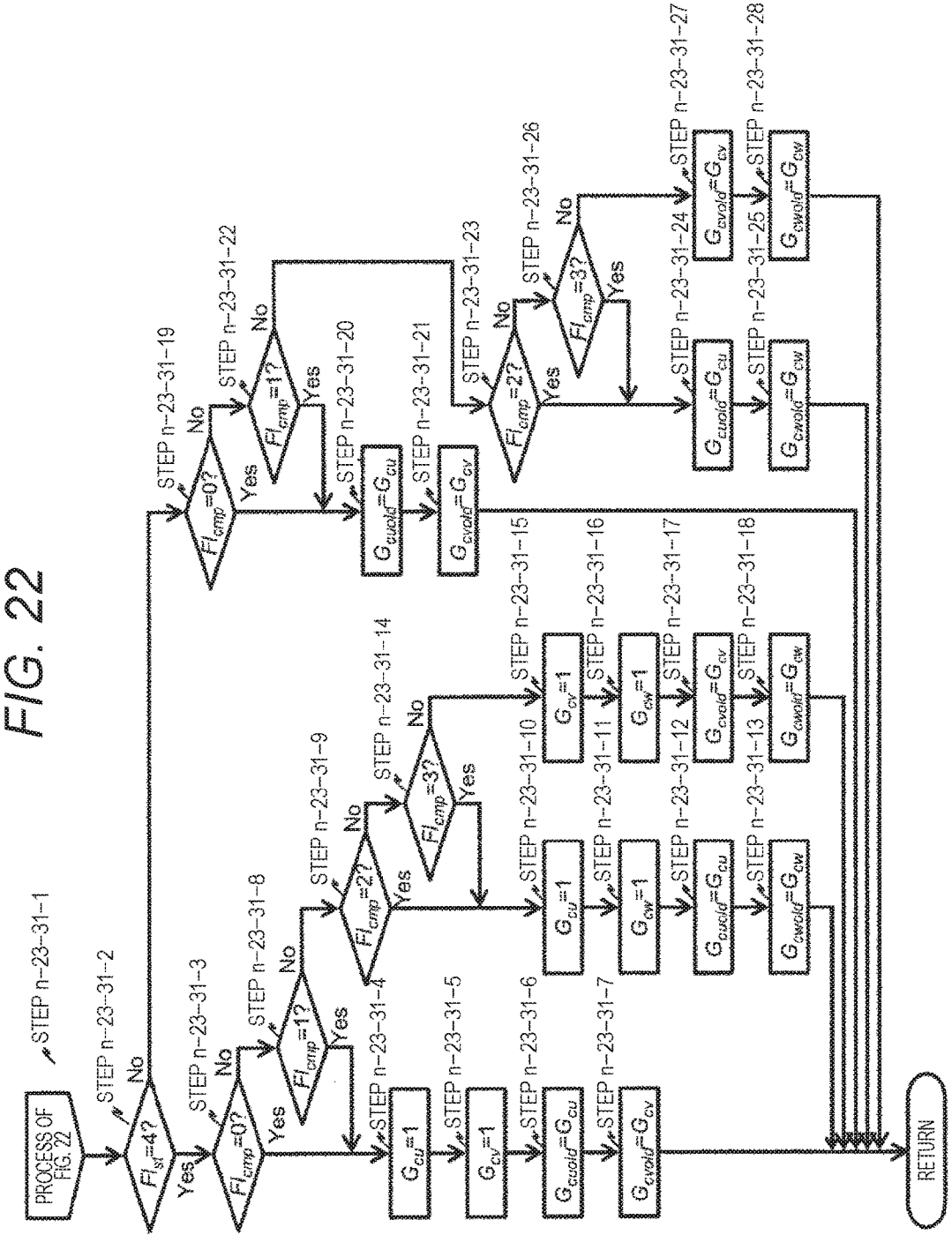
FIG. 22 is a diagram for describing a processing procedure of the gain adjustment unit 250 when the adjustment state determination flag Flst is not "3" (continuation) in Step n-23-13 illustrated in FIG. 21.

FIG. 22 is a diagram for describing a processing procedure of the gain adjustment unit 250 when it is determined that the adjustment state determination flag Flst is not "3" (continuation) in Step n-23-13 illustrated in FIG. 21. First, the gain adjustment unit 250 determines whether the adjustment state determination flag Flst is "4" (reset) in Step n-23-31-2.

In a case where it is determined that the adjustment state determination flag Flst is "4" (reset) in Step n-23-31-2, the gain adjustment unit 250 determines whether the adjustment direction determination flag Flcmp is "0" (a signal to increase the U-phase detection gain Gcu in a positive direction, and the V-phase detection gain Gcv in a negative direction) in Step n-23-31-3.

In a case where it is determined that the adjustment direction determination flag Flcmp is "0" (a signal to increase the U-phase detection gain Gcu in a positive direction, and the V-phase detection gain Gcv in a negative direction) in Step n-23-31-3, the gain adjustment unit 250 sets the U-phase detection gain Gcu to "1" (initial value) in Step n-23-31-4. Next, the gain adjustment unit 250 sets the V-phase detection gain Gcv to "1" (initial value) in Step n-23-31-5. Next, the gain adjustment unit 250 sets the U-phase detection gain Gcu set in Step n-23-31-4 as the past value Gcuold of the U-phase detection gain in Step n-23-31-6. Next, the gain adjustment unit 250 sets the V-phase detection gain Gcv set in Step n-23-31-5 as the past value Gcvold of the V-phase detection gain in Step n-23-31-7.

On the other hand, in a case where it is determined that the adjustment direction determination flag Flcmp is not "0" (a signal to increase the U-phase detection gain Gcu in a positive direction, and the V-phase detection gain Gcv in a negative direction) in Step n-23-31-3, the gain adjustment unit 250 determines whether the adjustment direction determination flag Flcmp is "1" (a signal to increase the U-phase detection gain Gcu in a negative direction, and the V-phase detection gain Gcv in a positive direction) in Step n-23-31-8.

In a case where it is determined that the adjustment direction determination flag Flcmp is "1" (a signal to increase the U-phase detection gain Gcu in a negative direction, and the V-phase detection gain Gcv in a positive direction) in Step n-23-31-8, the gain adjustment unit 250 proceeds to the process of Step n-23-31-4 described above. On the other hand, in a case where it is determined that the adjustment direction determination flag Flcmp is not "1" (a signal to increase the U-phase detection gain Gcu in a negative direction, and the V-phase detection gain Gcv in a positive direction) in Step n-23-31-8, the gain adjustment unit 250 determines whether the adjustment direction determination flag Flcmp is "2" (a signal to increase the U-phase detection gain Gcu in a positive direction, and the W-phase detection gain Gcw in a negative direction) in Step n-23-31-9.

In a case where it is determined that the adjustment direction determination flag Flcmp is "2" (a signal to increase the U-phase detection gain Gcu in a positive direction, and the W-phase detection gain Gcw in a negative direction) in Step n-23-31-9, the gain adjustment unit 250 sets the U-phase detection gain Gcu to "1" (initial value) in Step n-23-31-10. Next, the gain adjustment unit 250 sets the W-phase detection gain Gcw to "1" (initial value) in Step n-23-31-11. Next, the gain adjustment unit 250 sets the U-phase detection gain Gcu set in Step n-23-31-10 as the past value Gcuold of the U-phase detection gain in Step n-23-31-12. Next, the gain adjustment unit 250 sets the W-phase detection gain Gcw set in Step n-23-31-11 as the past value Gcwold of the W-phase detection gain in Step n-23-31-13.

On the other hand, in a case where it is determined that the adjustment direction determination flag Flcmp is not "2" (a signal to increase the U-phase detection gain Gcu in a positive direction, and the W-phase detection gain Gcw in a negative direction) in Step n-23-31-9, the gain adjustment unit 250 determines whether the adjustment direction determination flag Flcmp is "3" (a signal to increase the U-phase detection gain Gcu in a negative direction, and the W-phase detection gain Gcw in a positive direction) in Step n-23-31-14. In a case where it is determined that the adjustment direction determination flag Flcmp is "3" (a signal to increase the U-phase detection gain Gcu in a negative direction, and the W-phase detection gain Gcw in a positive direction) in Step n-23-31-14, the gain adjustment unit 250 proceeds to the process of Step n-23-31-10 described above.

On the other hand, in a case where it is determined that the adjustment direction determination flag Flcmp is not "3" (a signal to increase the U-phase detection gain Gcu in a negative direction, and the W-phase detection gain Gcw in a positive direction) in Step n-23-31-14, the gain adjustment unit 250 sets the V-phase detection gain Gcv to "1" (initial value) in Step n-23-31-15. Next, the gain adjustment unit 250 sets the W-phase detection gain Gcw to "1" (initial value) in Step n-23-31-16. Next, the gain adjustment unit 250 sets the V-phase detection gain Gcv set in Step n-23-31-15 as the past value Gcvold of the V-phase detection gain in Step n-23-31-17. Next, the gain adjustment unit 250 sets the W-phase detection gain Gcw set in Step n-23-31-16 as the past value Gcwold of the W-phase detection gain in Step n-23-31-18.

In addition, in a case where it is determined that the adjustment state determination flag Flst is not "4" (reset) in Step n-23-31-2, the gain adjustment unit 250 determines whether the adjustment direction determination flag Flcmp is "0" (a signal to increase the U-phase detection gain Gcu in a positive direction, and the V-phase detection gain Gcv in a negative direction) in Step n-23-31-19.

In a case where it is determined that the adjustment direction determination flag Flcmp is "0" (a signal to increase the U-phase detection gain Gcu in a positive direction, and the V-phase detection gain Gcv in a negative direction) in Step n-23-31-19, the gain adjustment unit 250 sets the U-phase detection gain Gcu as the past value Gcuold of the U-phase detection gain in Step n-23-31-20. Next, the gain adjustment unit 250 sets the V-phase detection gain Gcv as the past value Gcvold of the V-phase detection gain in Step n-23-31-21.

On the other hand, in a case where it is determined that the adjustment direction determination flag Flcmp is not "0" (a signal to increase the U-phase detection gain Gcu in a positive direction, and the V-phase detection gain Gcv in a negative direction) in Step n-23-31-19, the gain adjustment unit 250 determines whether the adjustment direction determination flag Flcmp is "1" (a signal to increase the U-phase detection gain Gcu in a negative direction, and the V-phase detection gain Gcv in a positive direction) in Step n-23-31-22. In a case where it is determined that the adjustment direction determination flag Flcmp is "1" (a signal to increase the U-phase detection gain Gcu in a negative direction, and the V-phase detection gain Gcv in a positive direction) in Step n-23-31-22, the gain adjustment unit 250 performs the processes of Steps n-23-31-20 and n-23-31-21 described above.

On the other hand, in a case where it is determined that the adjustment direction determination flag Flcmp is not "1" (a signal to increase the U-phase detection gain Gcu in a negative direction, and the V-phase detection gain Gcv in a positive direction) in Step n-23-31-22, the gain adjustment unit 250 determines whether the adjustment direction determination flag Flcmp is "2" (a signal to increase the U-phase detection gain Gcu in a positive direction, and the W-phase detection gain Gcw in a negative direction) in Step n-23-31-23.

In a case where it is determined that the adjustment direction determination flag Flcmp is "2" (a signal to increase the U-phase detection gain Gcu in a positive direction, and the W-phase detection gain Gcw in a negative direction) in Step n-23-31-23, the gain adjustment unit 250 sets the U-phase detection gain Gcu as the past value Gcuold of the U-phase detection gain in Step n-23-31-24. Next, the gain adjustment unit 250 sets the W-phase detection gain Gcw as the past value Gcwold of the W-phase detection gain in Step n-23-31-25.

On the other hand, in a case where it is determined that the adjustment direction determination flag Flcmp is not "2" (a signal to increase the U-phase detection gain Gcu in a positive direction, and the W-phase detection gain Gcw in a negative direction) in Step n-23-31-23, the gain adjustment unit 250 determines whether the adjustment direction determination flag Flcmp is "3" (a signal to increase the U-phase detection gain Gcu in a negative direction, and the W-phase detection gain Gcw in a positive direction) in Step n-23-31-26. In a case where it is determined that the adjustment direction determination flag Flcmp is "3" (a signal to increase the U-phase detection gain Gcu in a negative direction, and the W-phase detection gain Gcw in a positive direction) in Step n-23-31-26, the gain adjustment unit 250 proceeds to the process of Step n-23-31-24 described above.

On the other hand, in a case where it is determined that the adjustment direction determination flag Flcmp is not "3" (a signal to increase the U-phase detection gain Gcu in a negative direction, and the W-phase detection gain Gcw in a positive direction) in Step n-23-31-26, the gain adjustment unit 250 sets the V-phase detection gain Gcv as the past value Gcvold of the V-phase detection gain in Step n-23-31-27. Next, the gain adjustment unit 250 sets the W-phase detection gain Gcw as the past value Gcwold of the W-phase detection gain in Step n-23-31-28.

In this way, the peak-to-peak value of the q-axis current harmonic wave can be reduced by adjusting the U-phase detection gain Gcu, the V-phase detection gain Gcv, and the W-phase detection gain Gcw on the basis of the state of the adjustment direction determination flag Flcmp. In other words, it is possible to correct the variation of the gain Gsu of the U-phase current sensor 50, the gain Gsv of the V-phase current sensor 55, and the gain Gsw of the W-phase current sensor 58. In addition, the U-phase detection gain Gcu, the V-phase detection gain Gcv, and the W-phase detection gain Gcw are adjusted when the electrical angle θe of the rotor 64 of the motor 60 is changed by π/2.

Herein, the description has been given about a method of adjusting both the selected first and second phase detection gains. However, the selected first phase detection gain is set as the reference gain, and only the selected second phase detection gain may be adjusted. Alternatively, the selected second phase detection gain is set as the reference gain, and only the selected first phase detection gain may be adjusted. For example, in a case where the U phase is selected as the first phase, and the V phase is selected as the second phase, the U-phase detection gain Gcu is set as the reference gain, and only the V-phase detection gain Gcv may be adjusted, or the V-phase detection gain Gcv is set as the reference gain, and the U-phase detection gain Gcu may be adjusted. In addition, in a case where the U phase is selected as the first phase, and the W phase is selected as the second phase, the U-phase detection gain Gcu is set as the reference gain, and only the W-phase detection gain Gcw may be adjusted, or the W-phase detection gain Gcw is set as the reference gain, and the U-phase detection gain Gcu may be adjusted. In addition, when the V phase is selected as the first phase, and the W phase is selected as the second phase, the V-phase detection gain Gcv is set as the reference gain, and only the W-phase detection gain Gcw may be adjusted, or the W-phase detection gain Gcw is set as the reference gain, and only the V-phase detection gain Gcv may be adjusted.

(Description of Process of Detection Current Conversion Unit 170)

Figure 23:
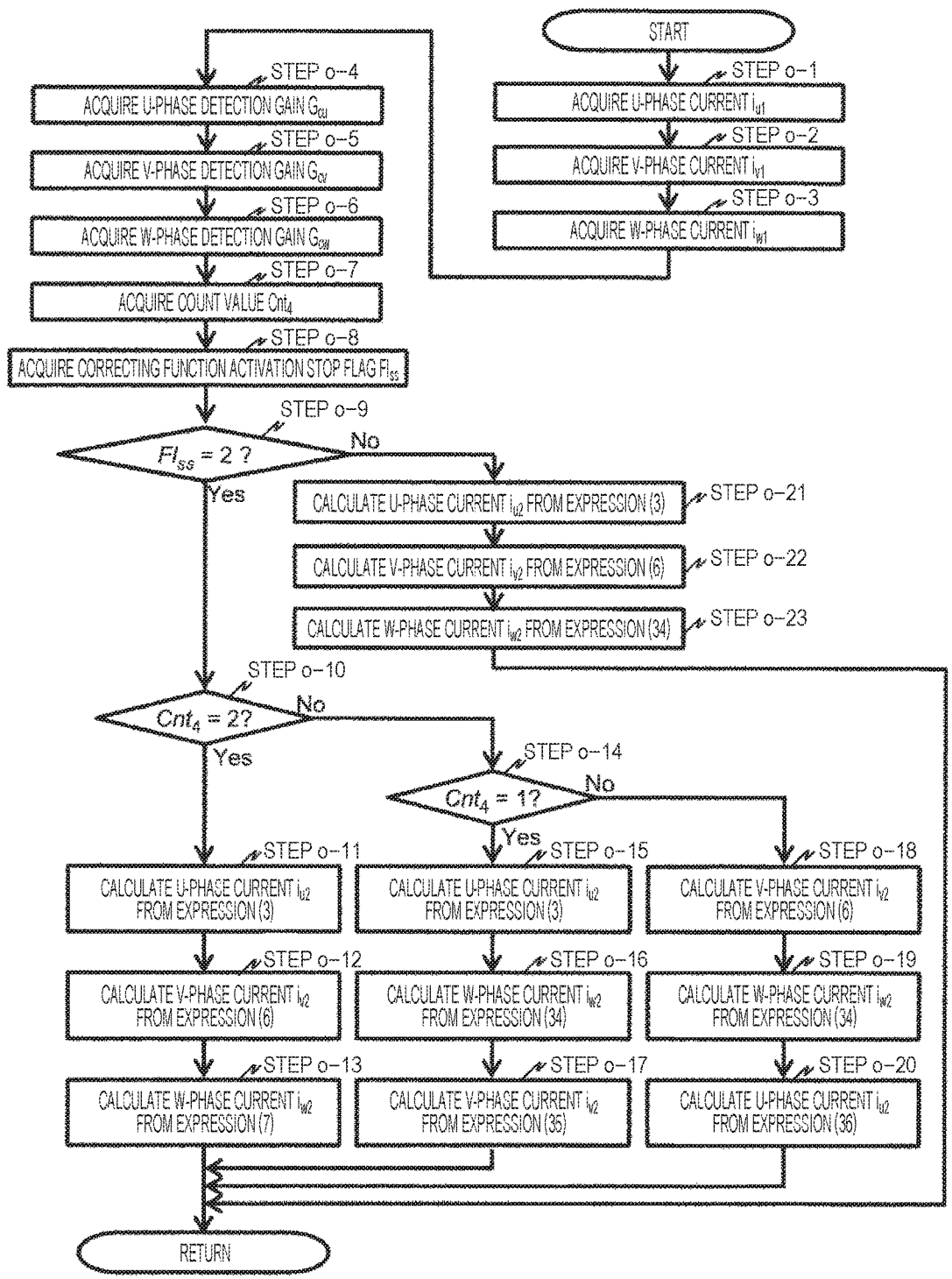
FIG. 23 is a diagram for describing a processing procedure of the detection current conversion unit 170 according to the second embodiment.

FIG. 23 is a diagram for describing a processing procedure of the detection current conversion unit 170 according to the second embodiment. First, the detection current conversion unit 170 acquires the UVW-phase currents iu1, iv1, and iw1 detected by the UVW-phase current sensors 50, 55, and 58 in Steps o-1 to o-3 respectively. Herein, the U-phase current iu1 and the V-phase current iv1 acquired in Steps o-1 and o-2 are defined by Expression (2) and Expression (4) respectively, and the W-phase current iw1 acquired in Step o-3 is defined by Expression (33) using a true W-phase current iwt flowing to the W-phase winding 63 of the motor 60 and the gain Gsw of the W-phase current sensor 58.

[Math. 33]

$$i_{w1} = i_{wt} G_{sw} \qquad (33)$$

Next, the detection current conversion unit 170 acquires the UVW-phase detection gains Gcu, Gcv, and Gcw in Steps o-4 to o-6. Next, the detection current conversion unit 170 acquires the fourth count value Cnt4 generated by the gain adjustment direction search unit 240 in Step o-7. Next, the detection current conversion unit 170 acquires the correcting function activation stop flag Flss generated by the gain correcting function activation stop unit 270 in Step o-8. Next, the detection current conversion unit 170 determines whether the correcting function activation stop flag Flss acquired in Step o-8 is "2" (activated) in Step o-9.

In a case where it is determined that the correcting function activation stop flag Flss is "2" (activated) in Step o-9, the detection current conversion unit 170 determines whether the fourth count value Cnt4 acquired in Step o-7 is equal to "2" in Step o-10.

In a case where it is determined that the fourth count value Cnt4 is equal to "2" in Step o-10, the detection current conversion unit 170 substitutes the U-phase current iu1 acquired in Step o-1 and the U-phase detection gain Gcu acquired in Step o-4 into Expression (3), and calculates the U-phase current iu2 in Step o-11. Next, the detection current conversion unit 170 substitutes the V-phase current iv1 acquired in Step o-2 and the V-phase detection gain Gcv acquired in Step o-5 into Expression (6), and calculates the V-phase current iv2 in Step o-12. Next, the detection current conversion unit 170 substitutes the U-phase current iu2 calculated in Step o-11 and the V-phase current iv2 calculated in Step o-12 into Expression (7), and calculates the W-phase current iw2 in Step o-13. In other words, in a case where it is determined that the correcting function activation stop flag Flss is "2" (activated), and the fourth count value Cnt4 is equal to "2", the detection current conversion unit 170 calculates the UVW-phase currents iu2, iv2, and iw2 like the detection current conversion unit of the 2-phase current detection system in which the current sensors are attached only to the U phase and the V phase.

At this time, the gain adjustment unit 250 adjusts the values of the U-phase detection gain Gcu and the V-phase detection gain Gcv such that the multiplied value of the gain Gsu of the U-phase current sensor 50 and the U-phase detection gain Gcu shown in Expression (3) becomes equal to the multiplied value of the gain Gsv of the V-phase current sensor 55 and the V-phase detection gain Gcv shown in Expression (6). In this way, the variation of the gain Gsu of the U-phase current sensor 50 and the gain Gsv of the V-phase current sensor 55 is corrected by adjusting the U-phase detection gain Gcu and the V-phase detection gain Gcv.

On the other hand, in a case where it is determined that the fourth count value Cnt4 is not "2" in Step o-10, the detection current conversion unit 170 determines whether the fourth count value Cnt4 is "1" in Step o-14. In a case where it is determined that the fourth count value Cnt4 is equal to "1" in Step o-14, the detection current conversion unit 170 substitutes the U-phase current iu1 acquired in Step o-1 and the U-phase detection gain Gcu acquired in Step o-4 into Expression (3), and calculates the U-phase current iu2 in Step o-15. Next, the detection current conversion unit 170 substitutes the W-phase current iu1 acquired in Step o-3 and the W-phase detection gain Gcw acquired in Step o-6 into Expression (34), and calculates the W-phase current iw2 in Step o-16.

[Math. 34]

$$i_{w2}=i_{w1}G_{cw}=i_{wt}G_{sv}G_{cw} \quad (34)$$

Next, the detection current conversion unit 170 substitutes the U-phase current iu2 acquired in Step o-15 and the W-phase current iw2 acquired in Step o-16 into Expression (35), and calculates the V-phase current iv2 in Step o-17.

[Math. 35]

$$i_{v2}=-i_{u2}-i_{w2} \quad (35)$$

In other words, in a case where it is determined that the correcting function activation stop flag Flss is "2" (activated), and the fourth count value Cnt4 is equal to "1", the detection current conversion unit 170 calculates the UVW-phase currents iu2, iv2, and iw2 like the detection current conversion unit of the 2-phase current detection system in which the current sensors are attached only to the U phase and the W phase. At this time, the gain adjustment unit 250 adjusts the values of the U-phase detection gain Gcu and the W-phase detection gain Gcw such that the multiplied value of the gain Gsu of the U-phase current sensor 50 and the U-phase detection gain Gcu shown in Expression (3) becomes equal to the multiplied value of the gain Gsw of the W-phase current sensor 58 and the W-phase detection gain Gcw shown in Expression (34). In this way, the variation of the gain Gsu of the U-phase current sensor 50 and the gain Gsw of the W-phase current sensor 58 is corrected by adjusting the U-phase detection gain Gcu and the W-phase detection gain Gcw.

On the other hand, in a case where it is determined that the fourth count value Cnt4 is not equal to "1" in Step o-14, the detection current conversion unit 170 substitutes the V-phase current iv2 acquired in Step o-2 and the V-phase detection gain Gcv acquired in Step o-5 into Expression (6), and calculates the V-phase current iv2 in Step o-18. Next, the detection current conversion unit 170 substitutes the W-phase current iw2 acquired in Step o-3 and the W-phase detection gain Gcw acquired in Step o-6 into Expression (34), and calculates the W-phase current iw2 in Step o-19. Next, the detection current conversion unit 170 substitutes the V-phase current iv2 calculated in Step o-18 and the W-phase current iw2 calculated in Step o-19 into Expression (36), and calculates the U-phase current iu2 in Step o-20.

[Math. 36]

$$i_{u2}=-i_{v2}-i_{w2} \quad (36)$$

In other words, in a case where it is determined that the correcting function activation stop flag Flss is "2" (activated), and the fourth count value Cnt4 is equal to "0", the detection current conversion unit 170 calculates the UVW-phase currents iu2, iv2, and iw2 like the detection current conversion unit of the 2-phase current detection system in which the current sensors are attached only to the V phase and the W phase. At this time, the gain adjustment unit 250 adjusts the values of the V-phase detection gain Gcv and the W-phase detection gain Gcw such that the multiplied value of the gain Gsv of the V-phase current sensor 55 and the V-phase detection gain Gcv shown in Expression (6) becomes equal to the multiplied value of the gain Gsw of the W-phase current sensor 58 and the W-phase detection gain Gcw shown in Expression (34). In this way, the variation of the gain Gsv of the V-phase current sensor 55 and the gain Gsw of the W-phase current sensor 58 is corrected by adjusting the V-phase detection gain Gcv and the W-phase detection gain Gcw.

In addition, in a case where it is determined that the correcting function activation stop flag Flss is not "2" (activated) in Step o-9, the detection current detecting unit 170 substitutes the U-phase current iu1 acquired in Step o-1 and the U-phase detection gain Gcu acquired in Step o-4 into Expression (3), and calculates the U-phase current iu2 in Step o-21. Next, the detection current detecting unit 170 substitutes the V-phase current iv1 acquired in Step o-2 and the V-phase detection gain Gcv acquired in Step o-5 into Expression (6), and calculates the V-phase current iv2 in Step o-22. Next, the detection current detecting unit 170 substitutes the W-phase current iw1 acquired in Step o-3 and the W-phase detection gain Gcw acquired in Step o-6 into Expression (34), and calculates the W-phase current iw2 in Step o-23. In other words, in a case where it is determined that the correcting function activation stop flag Flss is not "2" (activated), the detection current conversion unit 170 calculates the UVW-phase currents iu2, iv2, and iw2 like the detection current conversion unit of the 3-phase current detection system in which the current sensors are attached to all of the U phase, the V phase, and the W phase.

(Description of Relation Among q-Axis Harmonic Current iqh, Flag, and Detection Gain)

Figure 24:
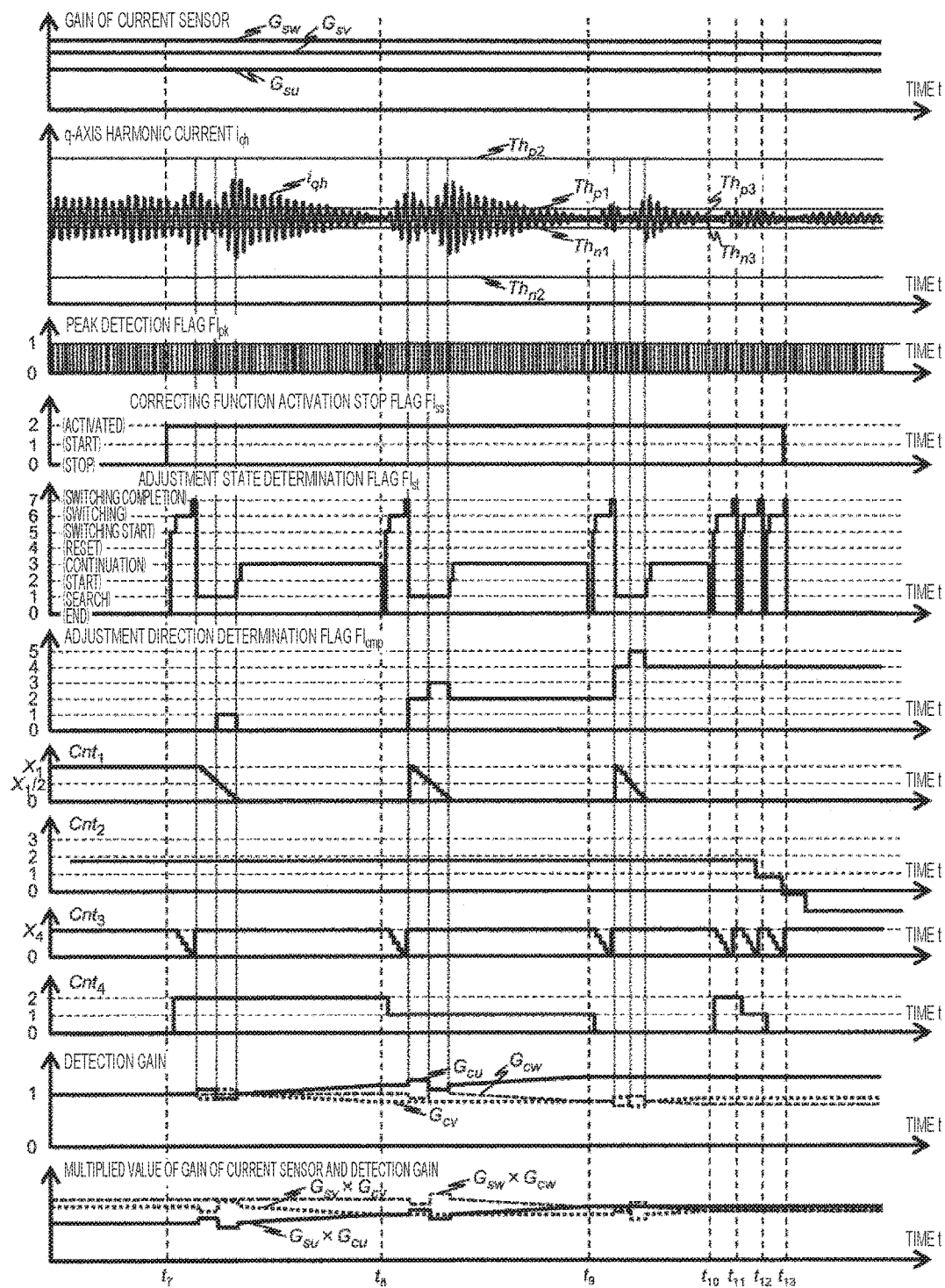
FIG. 24 is a diagram for describing a relation among the gain Gsu of the U-phase current sensor 50, the gain Gsv of the V-phase current sensor 55, the gain Gsw of the W-phase current sensor 58, the q-axis harmonic current iqh, the peak detection flag Flpk, the correcting function activation stop flag Flss, the adjustment state determination flag Flst, the adjustment direction determination flag Flcmp, the first count value Cnt1, the second count value Cnt2, the third count value Cnt3, the fourth count value Cnt4, the U-phase detection gain Gcu, the V-phase detection gain Gcv, and the W-phase detection gain Gcw.

FIG. 24 is a diagram for describing a relation among the gain Gsu of the U-phase current sensor 50, the gain Gsv of the V-phase current sensor 55, the gain Gsw of the W-phase current sensor 58, the q-axis harmonic current iqh, the peak detection flag Flpk, the correcting function activation stop flag Flss, the adjustment state determination flag Flst, the adjustment direction determination flag Flcmp, the first count value Cnt1, the second count value Cnt2, the third count value Cnt3, the fourth count value Cnt4, and the U-phase detection gain Gcu, the V-phase detection gain Gcv, and the W-phase detection gain Gcw which are adjusted in the above order. Herein, the magnitude relation among the gain Gsu of the U-phase current sensor 50, the gain Gsv of the V-phase current sensor 55, and the gain Gsw of the W-phase current sensor is assumed as shown in Expression (37), and is set to correct the variation of the gain Gsu of the U-phase current sensor 50, the gain Gsv of the V-phase current sensor 55, and the gain Gsw of the W-phase current sensor from time t7.

[Math. 37]

$$G_{su} < G_{sv} < G_{sw} \qquad (37)$$

First, at time t7, the correcting function activation stop flag Flss is changed from "0" (stop) to "1" (activation start). Immediately thereafter, the correcting function activation stop flag Flss is switched from "1" (activation start) to "2" (activated). The adjustment state determination flag Flst is switched from "0" (end) to "5" (switching start) along with the switching, and at the same time, the fourth count value Cnt4 is changed from "0" to "2". When the correcting function activation stop flag Flss is "2" (activated) and the fourth count value Cnt4 is "2", the UVW-phase currents iu2, iv2, and iw2 are calculated by Expression (3), Expression (6), and Expression (7) respectively.

Next, the adjustment state determination flag Flst is switched from "5" (switching start) to "6" (switching) at the moment when the peak detection flag Flpk is changed from "0" to "1". Simultaneously, the third count value Cnt3 starts to be counted down from the predetermined value X4. Then, the adjustment state determination flag Flst is switched from "6" (switching) to "7" (switching completion) at the moment when the third count value Cnt3 becomes "0".

At this time, the negative peak value Pkn of the q-axis harmonic current iqh is smaller than the first negative threshold Thn1. Therefore, the adjustment state determination flag Flst is switched from "7" (switching completion) to "1" (search). The first count value Cnt1 starts to be counted down from the predetermined value X1 at the moment when the adjustment state determination flag Flst is switched from "7" (switching completion) to "1" (search). Then, at the moment when the first count value Cnt1 becomes equal to (X1/2), the adjustment direction determination flag Flcmp is switched from "0" (a signal to increase the U-phase detection gain Gcu in a positive direction, and the V-phase detection gain Gcv in a negative direction) to "1" (a signal to increase the U-phase detection gain Gcu in a negative direction, and the V-phase detection gain Gcv in a positive direction).

Then, when the adjustment state determination flag Flst is "1" (search) and the adjustment direction determination flag Flcmp is "0", the U-phase detection gain Gcu is increased from "1" (initial value) by the predetermined value X2 in the positive direction, and the V-phase detection gain Gcv is increased from "1" (initial value) by the predetermined value X2 in the negative direction. Herein, a period where the U-phase detection gain Gcu is increased from "1" (initial value) by the predetermined value X2 in the positive direction and the V-phase detection gain Gcv is increased from "1" (initial value) by the predetermined value X2 in the negative direction is referred to as Period F.

On the other hand, when the adjustment state determination flag Flst is "1" (search) and the adjustment direction determination flag Flcmp is "1", the U-phase detection gain Gcu is increased from "1" (initial value) by the predetermined value X2 in the negative direction, and the V-phase detection gain Gcv is increased from "1" (initial value) by the predetermined value X2 in the positive direction. Herein, a period when the U-phase detection gain Gcu is increased from "1" (initial value) by the predetermined value X2 in the negative direction and the V-phase detection gain Gcv is increased from "1" (initial value) by the predetermined value X2 in the positive direction is referred to as Period G.

Next, it can be seen that the average value of the peak-to-peak value of the q-axis harmonic current iqh of Period F is smaller than the average value of the peak-to-peak value of the q-axis harmonic current iqh of Period G. Therefore, the adjustment direction determination flag Flcmp is switched from "1" (a signal to increase the U-phase detection gain Gcu in a negative direction, and the V-phase detection gain Gcv in a positive direction) to "0" (a signal to increase the U-phase detection gain Gcu in a positive direction, and the V-phase detection gain Gcv in a negative direction) at the moment when the first count value Cnt1 becomes "0" and the adjustment state determination flag Flst is switched from "1" (search) to "2" (start). Then, the adjustment state determination flag Flst is switched from "2" (start) to "3" (continuation) immediately after the adjustment direction determination flag Flcmp is switched from "1" (a signal to increase the U-phase detection gain Gcu in a negative direction, and the V-phase detection gain Gcv in a positive direction) to "0" (a signal to increase the U-phase detection gain Gcu in a positive direction, and the V-phase detection gain Gcv in a negative direction). Then, when the adjustment state determination flag Flst is "3" (continuation) and the adjustment direction determination flag Flcmp is "0", the U-phase detection gain Gcu is gradually increased at a pitch of the predetermined value X3 in the positive direction, and the V-phase detection gain Gcv is gradually increased at a pitch of the predetermined value X3 in the negative direction.

Then, at time t8, the positive and negative peak values Pkp and Pkn of the q-axis harmonic current iqh fall within the range of the third positive and negative thresholds Thp3 and Thn3. Therefore, the adjustment state determination flag Flst is switched from "3" (continuation) to "0" (end), and the adjustment of the U-phase detection gain Gcu and the V-phase detection gain Gcv is ended.

Next, the adjustment state determination flag Flst is switched from "0" (end) to "5" (switching start) immediately after time t8. Simultaneously, the fourth count value Cnt4 is changed from "2" to "1". When the correcting function activation stop flag Flss is "2" (activated) and the fourth count value Cnt4 is "1", the UVW-phase currents iu2, iv2, and iw2 are calculated by Expression (3), Expression (35), and Expression (34) respectively.

Next, the adjustment state determination flag Flst is switched from "5" (switching start) to "6" (switching) at the moment when the peak detection flag Flpk is changed from "0" to "1". Simultaneously, the third count value Cnt3 starts to be counted down from the predetermined value X4. Then, the adjustment state determination flag Flst is switched from "6" (switching) to "7" (switching completion) at the moment when the third count value Cnt3 becomes "0".

At this time, the positive peak value Pkp of the q-axis harmonic current iqh is larger than the first positive threshold Thp1. Therefore, the adjustment state determination flag Flst is switched from "7" (switching completion) to "1" (search). At the moment when the adjustment state determination flag Flst is switched from "7" (switching completion) to "1" (search), the adjustment direction determination flag Flcmp is switched from "0" (a signal to increase the U-phase detection gain Gcu in a positive direction, and the V-phase detection gain Gcv in a negative direction) to "2" (a signal to increase the U-phase detection gain Gcu in a positive direction, and the W-phase detection gain Gcw in a negative direction), and at the same time, the first count value Cnt1 starts to be counted down from the predetermined value X1. Then, at the moment when the first count value Cnt1 becomes equal to (X1/2), the adjustment direction determination flag Flcmp is switched from "2" (a signal to increase the U-phase detection gain Gcu in a positive direction, and the W-phase detection gain Gcw in a negative direction) to "3" (a signal to increase the U-phase detection gain Gcu in a negative direction, and the W-phase detection gain Gcw in a positive direction).

Then, when the adjustment state determination flag Flst is "1" (search) and the adjustment direction determination flag Flcmp is "2", the U-phase detection gain Gcu is increased from "1" (initial value) by the predetermined value X2 in the positive direction, and the W-phase detection gain Gcv is increased from "1" (initial value) by the predetermined value X2 in the negative direction. Herein, a period where the U-phase detection gain Gcu is increased from "1" (initial value) by the predetermined value X2 in the positive direction and the W-phase detection gain Gcw is increased from "1" (initial value) by the predetermined value X2 in the negative direction is referred to as Period H.

On the other hand, when the adjustment state determination flag Flst is "1" (search) and the adjustment direction determination flag Flcmp is "3", the U-phase detection gain Gcu is increased from "1" (initial value) by the predetermined value X2 in the negative direction, and the W-phase detection gain Gcw is increased from "1" (initial value) by the predetermined value X2 in the positive direction. Herein, a period where the U-phase detection gain Gcu is increased from "1" (initial value) by the predetermined value X2 in the negative direction and the W-phase detection gain Gcw is increased from "1" (initial value) by the predetermined value X2 in the positive direction is referred to as Period I.

Next, it can be seen that the average value of the peak-to-peak value of the q-axis harmonic current iqh in Period H is smaller than the average value of the peak-to-peak value of the q-axis harmonic current iqh in Period I. Therefore, at the moment when the first count value Cnt1 becomes "0" and the adjustment state determination flag Flst is switched from "1" (search) to "2" (start), the adjustment direction determination flag Flcmp is switched from "3" (a signal to increase the U-phase detection gain Gcu in a negative direction, and the W-phase detection gain Gcw in a positive direction) to "2" (a signal to increase the U-phase detection gain Gcu in a positive direction, and the W-phase detection gain Gcw in a negative direction). Then, immediately after the adjustment direction determination flag Flcmp is switched from "3" (a signal to increase the U-phase detection gain Gcu in a negative direction, and the W-phase detection gain Gcw in a positive direction) to "2" (a signal to increase the U-phase detection gain Gcu in a positive direction, and the W-phase detection gain Gcw in a negative direction), the adjustment state determination flag Flst is switched from "2" (start) to "3" (continuation). Then, when the adjustment state determination flag Flst is "3" (continuation) and the adjustment direction determination flag Flcmp is "2", the U-phase detection gain Gcu is gradually increased at a pitch of the predetermined value X3 in the positive direction, and the W-phase detection gain Gcw is gradually increased at a pitch of the predetermined value X3 in the negative direction.

Then, at time t9, the positive and negative peak values Pkp and Pkn of the q-axis harmonic current iqh fall within the range of the third positive and negative thresholds Thp3 and Thn3. Therefore, the adjustment state determination flag Flst is switched from "3" (continuation) to "0" (end), and the adjustment of the U-phase detection gain Gcu and the W-phase detection gain Gcw is ended.

Next, the adjustment state determination flag Flst is switched from "0" (end) to "5" (switching start) immediately after time t8. Simultaneously, the fourth count value Cnt4 is changed from "1" to "0". When the correcting function activation stop flag Flss is "2" (activated) and the fourth count value Cnt4 is "0", the UVW-phase currents iu2, iv2, and iw2 are calculated by Expression (36), Expression (6), and Expression (34) respectively.

Next, the adjustment state determination flag Flst is switched from "5" (switching start) to "6" (switching) at the moment when the peak detection flag Flpk is changed from "0" to "1". Simultaneously, the third count value Cnt3 starts to be counted down from the predetermined value X4. Then, the adjustment state determination flag Flst is switched from "6" (switching) to "7" (switching completion) at the moment when the third count value Cnt3 becomes "0".

At this time, the positive peak value Pkp of the q-axis harmonic current iqh is larger than the first positive threshold Thp1. Therefore, the adjustment state determination flag Flst is switched from "7" (switching completion) to "1" (search). At the moment when the adjustment state determination flag Flst is switched from "7" (switching completion) to "1" (search), the adjustment direction determination flag Flcmp is switched from "2" (a signal to increase the U-phase detection gain Gcu in a positive direction, and the W-phase detection gain Gcw in a negative direction) to "4" (a signal to increase the V-phase detection gain Gcv in a positive direction, and the W-phase detection gain Gcw in a negative direction), and the first count value Cnt1 starts to be counted down from the predetermined value X1. Then, at the moment when the first count value Cnt1 becomes equal to (X1/2), the adjustment direction determination flag Flcmp is switched from "4" (a signal to increase the V-phase detection gain Gcv in a positive direction, and the W-phase detection gain Gcw in a negative direction) to "5" (a signal to increase the V-phase detection gain Gcv in a negative direction, and the W-phase detection gain Gcw in a positive direction).

Then, when the adjustment state determination flag Flst is "1" (search) and the adjustment direction determination flag Flcmp is "4", the V-phase detection gain Gcv is increased from "1" (initial value) by the predetermined value X2 in the positive direction, and the W-phase detection gain Gcw is increased from "1" (initial value) by the predetermined value X2 in the negative direction. Herein, a period where the V-phase detection gain Gcv is increased from "1" (initial value) by the predetermined value X2 in the positive direction and the W-phase detection gain Gcw is increased from "1" (initial value) by the predetermined value X2 in the negative direction is referred to as Period J.

On the other hand, when the adjustment state determination flag Flst is "1" (search) and the adjustment direction determination flag Flcmp is "5", the V-phase detection gain Gcv is increased from "1" (initial value) by the predetermined value X2 in the negative direction, and the W-phase detection gain Gcw is increased from "1" (initial value) by the predetermined value X2 in the positive direction. Herein, a period where the V-phase detection gain Gcv is increased from "1" (initial value) by the predetermined value X2 in the negative direction and the W-phase detection gain Gcw is increased from "1" (initial value) by the predetermined value X2 in the positive direction is referred to as Period K.

Next, it can be seen that the average value of the peak-to-peak value of the q-axis harmonic current iqh in Period J is smaller than the average value of the peak-to-peak value of the q-axis harmonic current iqh in Period K. Therefore, at the moment when the first count value Cnt1 becomes "0" and the adjustment state determination flag Flst is switched from "1" (search) to "2" (start), the adjustment direction determination flag Flcmp is switched from "5" (a signal to increase the V-phase detection gain Gcv in a negative direction, and the W-phase detection gain Gcw in a positive direction) to "4" (a signal to increase the V-phase detection gain Gcv in a positive direction, and the W-phase detection gain Gcw in a negative direction). Then, immediately after the adjustment direction determination flag Flcmp is switched from "5" (a signal to increase the V-phase detection gain Gcv in a negative direction, and the W-phase detection gain Gcw in a positive direction) to "4" (a signal to increase the V-phase detection gain Gcv in a positive direction, and the W-phase detection gain Gcw in a negative direction), the adjustment state determination flag Flst is switched from "2" (start) to "3" (continuation). Then, when the adjustment state determination flag Flst is "3" (continuation) and the adjustment direction determination flag Flcmp is "4", the V-phase detection gain Gcv is gradually increased at a pitch of the predetermined value X3 in the positive direction, and the W-phase detection gain Gcw is gradually increased at a pitch of the predetermined value X3 in the negative direction.

Then, at time t10, the positive and negative peak values Pkp and Pkn of the q-axis harmonic current iqh fall within the range of the third positive and negative thresholds Thp3 and Thn3. Therefore, the adjustment state determination flag Flst is switched from "3" (continuation) to "0" (end), and the adjustment of the V-phase detection gain Gcv and the W-phase detection gain Gcw is ended.

Next, the adjustment state determination flag Flst is switched from "0" (end) to "5" (switching start) immediately after time t10. Simultaneously, the fourth count value Cnt4 is changed from "0" to "2". When the correcting function activation stop flag Flss is "2" (activated) and the fourth count value Cnt4 is "2", the UVW-phase currents iu2, iv2, and iw2 are calculated by Expression (3), Expression (6), and Expression (7) respectively.

Next, at the moment when the peak detection flag Flpk is changed from "0" to "1", the adjustment state determination flag Flst is switched from "5" (switching start) to "6" (switching), and the third count value Cnt3 starts to be counted down from the predetermined value X4. Then, the adjustment state determination flag Flst is switched from "6" (switching) to "7" (switching completion) at the moment when the third count value Cnt3 becomes "0". At this time, since the positive and negative peak values Pkp and Pkn of the q-axis harmonic current iqh fall within the range of the first positive and negative thresholds Thp1 and Thn1, the second count value Cnt2 is changed from "3" to "2" at the same time when the adjustment state determination flag Flst is switched from "7" (switching completion) to "0" (end).

Next, the adjustment state determination flag Flst is switched from "0" (end) to "5" (switching start) immediately after time t11. Simultaneously, the fourth count value Cnt4 is changed from "2" to "1". When the correcting function activation stop flag Flss is "2" (activated) and the fourth count value Cnt4 is "1", the UVW-phase currents iu2, iv2, and iw2 are calculated by Expression (3), Expression (35), and Expression (34) respectively.

Next, at the moment when the peak detection flag Flpk is changed from "0" to "1", the adjustment state determination flag Flst is switched from "5" (switching start) to "6" (switching), and the third count value Cnt3 starts to be counted down from the predetermined value X4. Then, the adjustment state determination flag Flst is switched from "6" (switching) to "7" (switching completion) at the moment when the third count value Cnt3 becomes "0". At this time, since the positive and negative peak values Pkp and Pkn of the q-axis harmonic current iqh fall within the range of the first positive and negative thresholds Thp1 and Thn1, the adjustment state determination flag Flst is switched from "7" (switching completion) to "0" (end). Simultaneously, the second count value Cnt1 is changed from "2" to "1".

Next, the adjustment state determination flag Flst is switched from "0" (end) to "5" (switching start) immediately after time t12. Simultaneously, the fourth count value Cnt4 is changed from "1" to "0". When the correcting function activation stop flag Flss is "2" (activated) and the fourth count value Cnt4 is "1", the UVW-phase currents iu2, iv2, and iw2 are calculated by Expression (6), Expression (36), and Expression (34) respectively.

Next, at the moment when the peak detection flag Flpk is changed from "0" to "1", the adjustment state determination flag Flst is switched from "5" (switching start) to "6" (switching), and the third count value Cnt3 starts to be counted down from the predetermined value X4. Then, the adjustment state determination flag Flst is switched from "6" (switching) to "7" (switching completion) at the moment when the third count value Cnt3 becomes "0". At this time, since the positive and negative peak values Pkp and Pkn of the q-axis harmonic current iqh fall within the range of the first positive and negative thresholds Thp1 and Thn1, the adjustment state determination flag Flst is switched from "7" (switching completion) to "0" (end). Simultaneously, the second count value Cnt1 is changed from "1" to "0".

Since the second count value Cnt2 becomes "0" at time t13, the correcting function activation stop flag Flss is changed from "2" (activated) to "0" (stop), and the correcting function is stopped. Further, when the correcting function activation stop flag Flss is "0" (stop), the UVW-phase currents iu2, iv2, and iw2 are calculated by Expression (3), Expression (6), and Expression (34) respectively.

In this way, the multiplied value of the gain Gsu of the U-phase current sensor 50 and the U-phase detection gain Gcu, the multiplied value of the gain Gsv of the V-phase current sensor 55 and the V-phase detection gain Gcv, and the multiplied value of the gain Gsw of the W-phase current sensor 58 and the W-phase detection gain Gcw can be substantially matched to each other by adjusting the U-phase detection gain Gcu, the V-phase detection gain Gcv, and the W-phase detection gain Gcw. In other words, it is possible to correct a variation between the gain Gsv of the U-phase current sensor 50, the gain Gsv of the V-phase current sensor 55, the gain Gsw of the W-phase current sensor 58.

In addition, the harmonic current iqh having two times the electrical angular frequency fe of the rotor 64 of the motor 60 which is contained in the q-axis current iq draws a waveform which is increased only in a certain period after being decreased (or increased) only in a certain period, and then is gradually decreased immediately after the variation of the gain Gsu of the U-phase current sensor 50 and the gain Gsv of the V-phase current sensor 55 starts to be corrected, immediately after the variation of the gain Gsu of the U-phase current sensor 50 and the gain Gsw of the W-phase current sensor 55 starts to be corrected, or immediately after the variation of the gain Gsv of the V-phase current sensor 50 and the gain Gsw of the W-phase current sensor 55 starts to be corrected.

Third Embodiment

Figure 25:
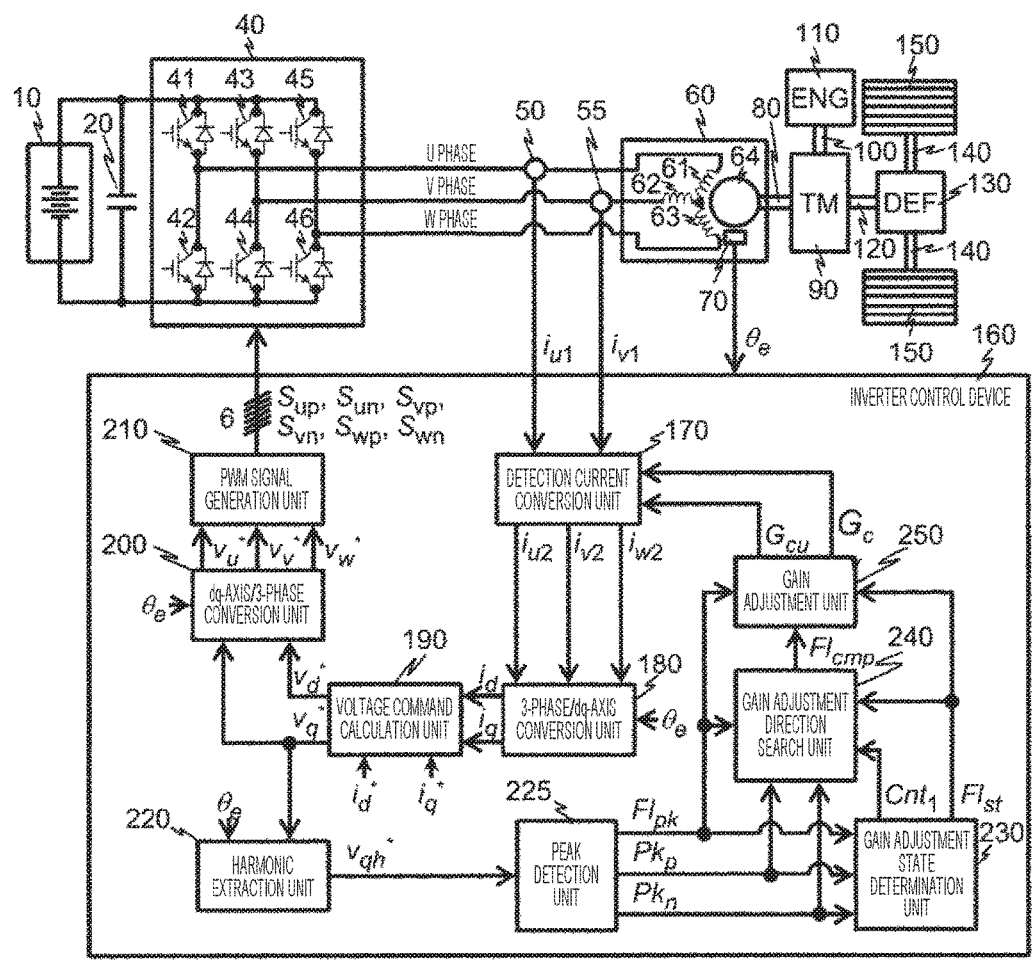
FIG. 25 is a diagram for describing a vehicle system according to a third embodiment.

FIG. 25 is a diagram for describing a vehicle system according to a third embodiment. The first embodiment has been described about the method of correcting the variation of the gains of the current sensors in the 2-phase current detection system in which the current sensors are attached to the U phase and the V phase, the U phase and the W phase, or the V phase and the W phase. In the method, the harmonic current having two times the electrical angular frequency fe of the rotor 64 of the motor 60 which is contained in the q-axis current iq (or the d-axis current id) calculated by the 3-phase/dq-axis conversion unit 180 is extracted by the harmonic extraction unit 220, and the gains of the current sensors are corrected in order to make the peak-to-peak value of the extracted q-axis harmonic current iqh (or the d-axis harmonic current idh) fall in the range of the third positive and negative thresholds Thp3 and Thn3.

This embodiment has been described about the method of correcting the variation of the gains of the current sensors in the 2-phase current detection system in which the current sensors are attached to the U phase and the V phase, the U phase and the W phase, or the V phase and the W phase. In the method, a harmonic voltage command having two times the electrical angular frequency fe of the rotor 64 of the motor 60 which is contained in the q-axis voltage command vq* (or the d-axis voltage command vd*) calculated by the voltage command calculation unit 190 is extracted by the harmonic extraction unit 220, and the gains of the current sensors are corrected in order to make the peak-to-peak value of the extracted q-axis harmonic voltage command vqh* (or a d-axis harmonic voltage command vdh*) fall within the range of the third positive and negative thresholds Thp3 and Thn3. The other configurations are the same as those of the first embodiment, and thus the description thereof will be omitted.

Fourth Embodiment

Figure 26:
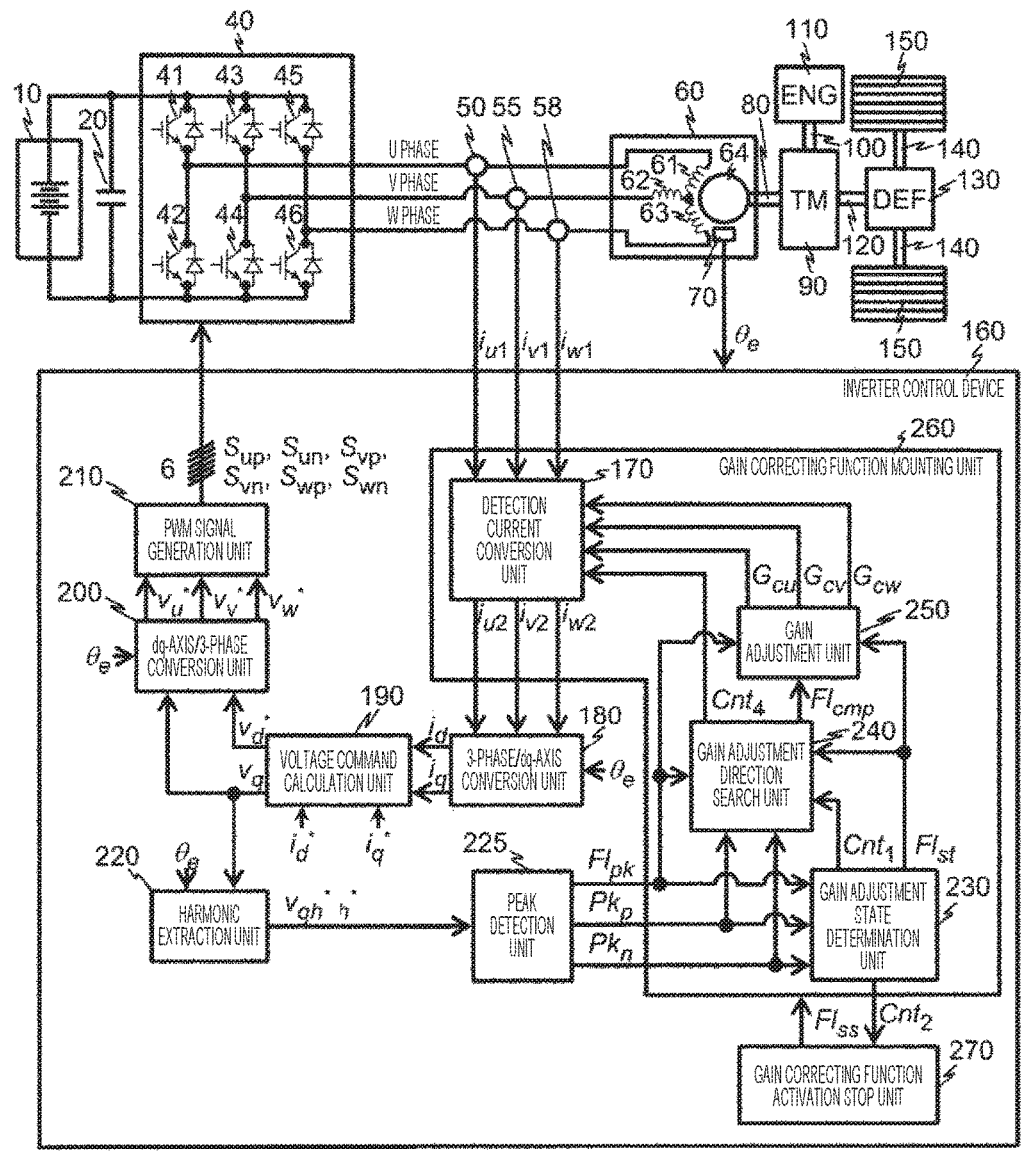
FIG. 26 is a diagram for describing a vehicle system according to a fourth embodiment.

FIG. 26 is a diagram for describing a vehicle system according to a fourth embodiment. The second embodiment has been described about the method of correcting the variation of the gains of the current sensors in the 3-phase current detection system in which the current sensors are attached to all of the U phase, the V phase, and the W phase. In the method, the harmonic current having two times the electrical angular frequency fe of the rotor 64 of the motor 60 which is contained in the q-axis current iq (or the d-axis current id) calculated by the 3-phase/dq-axis conversion unit 180 is extracted by the harmonic extraction unit 220, and the gains of the current sensors are corrected in order to make the peak-to-peak value of the extracted q-axis harmonic current iqh (or the d-axis harmonic current idh) fall within the range of the third positive and negative thresholds Thp3 and Thn3.

This embodiment has been described about the method of correcting the variation of the gains of the current sensors in the 3-phase current detection system in which the current sensors are attached to all of the U phase, the V phase, and the W phase. In the method, the harmonic voltage command having two times the electrical angular frequency fe of the rotor 64 of the motor 60 which is contained in the q-axis voltage command vq* (or the d-axis voltage command vd*) calculated by the voltage command calculation unit 190 is extracted by the harmonic extraction unit 220, and the gains of the current sensors are corrected in order to make the peak-to-peak value of the extracted q-axis harmonic voltage command vqh* (or the d-axis harmonic voltage command vdh*) fall within the range of the third positive and negative thresholds Thp3 and Thn3. The other configurations are the same as those of the second embodiment, and thus the description thereof will be omitted.

REFERENCE SIGNS LIST 10 battery
20 smoothing capacitor
40 inverter
41 switching element of U-phase upper arm of inverter 40
42 switching element of U-phase lower arm of inverter 40
43 switching element of V-phase upper arm of inverter 40
44 switching element of V-phase lower arm of inverter 40
45 switching element of W-phase upper arm of inverter 40
46 switching element of W-phase lower arm of inverter 40
50 U-phase current sensor
55 V-phase current sensor
58 W-phase current sensor
60 motor
61 U-phase winding of motor 60
62 V-phase winding of motor 60
63 W-phase winding of motor 60
64 rotor of motor 60
70 angle sensor
80 output shaft of motor 60
90 transmission
100 crank shaft
110 engine
120 propeller shaft
130 differential gear
140 drive shaft
150 driving wheel
160 inverter control device
170 detection current conversion unit
180 3-phase/dq-axis conversion unit
190 voltage command calculation unit
200 dq-axis/3-phase conversion unit
210 PWM signal generation unit
220 harmonic extraction unit
225 peak detection unit
230 gain adjustment state determination unit
240 gain adjustment direction search unit
250 gain adjustment unit
260 gain correcting function mounting unit
270 gain correcting function activation stop unit
iq q-axis current
id d-axis current
θe electrical angle of rotor 64 of motor 60
fe electrical angular frequency of rotor 64 of motor 60
θx predetermined value
X1 predetermined value
X2 predetermined value
X3 predetermined value
X4 predetermined value
id* d-axis current command
iq* q-axis current command
vd* d-axis voltage command
vq* q-axis voltage command
vu* U-phase voltage command
vv* V-phase voltage command
vw* W-phase voltage command Δid difference between d-axis current command id* and d-axis current id
Δiq difference between q-axis current command iq* and q-axis current iq
idh harmonic current having two times electrical angular frequency fe which is contained in d-axis current id
iqh harmonic current having two times electrical angular frequency fe which is contained in q-axis current iq
iu1 U-phase current detected by U-phase current sensor 50
iv1 V-phase current detected by V-phase current sensor 55
iw1 W-phase current detected by W-phase current sensor 58
iu2 U-phase current corrected by detection current conversion unit 170
iv2 V-phase current corrected by detection current conversion unit 170
iw2 W-phase current corrected by detection current conversion unit 170
iut true U-phase current flowing to U-phase winding 61 of motor 60
ivt true V-phase current flowing to V-phase winding 62 of motor 60
iwt true W-phase current flowing to W-phase winding 63 of motor 60
Pkp positive peak value of q-axis harmonic current
Pkn negative peak value of q-axis harmonic current
Gsu gain of U-phase current sensor 50
Gsv gain of V-phase current sensor 55
Gsw gain of W-phase current sensor 58
Gcu U-phase detection gain
Gcv V-phase detection gain
Gcw W-phase detection gain
Sup PWM signal to control ON/OFF of IGBT of switching element 41
Sun PWM signal to control ON/OFF of IGBT of switching element 42
Svp PWM signal to control ON/OFF of IGBT of switching element 43
Svn PWM signal to control ON/OFF of IGBT of switching element 44
Swp PWM signal to control ON/OFF of IGBT of switching element 45
Swn PWM signal to control ON/OFF of IGBT of switching element 46
Kpd d-axis proportional gain
Kid d-axis integral gain
Kpq q-axis proportional gain
Kiq q-axis integral gain
Δθe difference value between newest electrical angle θe and past electrical angle θeold
vqh* harmonic voltage command having two times electrical angular frequency fe which is contained in q-axis voltage command vq*
vdh* harmonic voltage command having two times electrical angular frequency fe which is contained in d-axis voltage command vd*
Cnt1 first count value
Cnt2 second count value
Cnt3 third count value
Cnt4 fourth count value
Thp1 first positive threshold
Thn1 first negative threshold
Thp2 second positive threshold
Thn2 second negative threshold
Thp3 third positive threshold
Thn3 third negative threshold
Flpk peak detection flag
Flst adjustment state determination flag
Flss correcting function activation stop flag
Flcmp adjustment direction determination flag
iqold q-axis current before one calculation cycle
θeold past electrical angle
Pkps1 integrated value of first positive peak value obtained by integrating positive peak value of q-axis harmonic current
Pkps2 integrated value of second positive peak value obtained by integrating positive peak value of q-axis harmonic current
Pkns1 integrated value of first negative peak value obtained by integrating negative peak value of q-axis harmonic current
Pkps2 integrated value of second negative peak value obtained by integrating negative peak value of q-axis harmonic current
Pkpa1 average value of first positive peak value
Pkna1 average value of first negative peak value
Pkda1 average value of first peak-to-peak value
Pkpa2 average value of second positive peak value
Pkpa2 average value of second negative peak value
Pkda2 average value of second peak-to-peak value
Gcuold past value of U-phase detection gain
Gcvold past value of V-phase detection gain
Gcwold past value of W-phase detection gain
Δθeold difference value of electrical angle before one calculation cycle
ighold1 past value of first q-axis harmonic current
ighold2 past value of second q-axis harmonic current
iqinter q-axis current interpolation value

The invention claimed is:

1. An inverter control device which controls an output current to a 3-phase AC motor, comprising:
a 3-phase/dq-axis conversion unit which converts the output current detected by a current sensor into a dq-axis current; and
a gain adjustment unit which adjusts a detection gain of the current sensor for each phase, wherein;
in a case where a current value of a secondary harmonic component contained in the dq-axis current is equal to or more than a predetermined threshold, the gain adjustment unit corrects a gain of the current sensor such that the current value of the secondary harmonic component becomes less than the threshold,
in a first period, the gain adjustment unit sets a detection gain of a first phase current which is any one phase current of the output currents to a first gain value,
in a second period after the first period elapses, the gain adjustment unit sets the detection gain of the first phase current to a second gain value which is smaller than the first gain value, and
the gain adjustment unit switches whether the detection gain of the first phase current to be increased or decreased according to a comparison result between the current value of the secondary harmonic component contained in the dq-axis current in the first period and the current value of the secondary harmonic component contained in the dq-axis current in the second period.

2. The inverter control device according to claim 1,
wherein, in a third period after the second period elapses, the gain adjustment unit adjusts the detection gain of the first phase current to be gradually decreased in a case where the current value of the secondary harmonic component contained in the dq-axis current in the first period is larger than the current value of the secondary harmonic component contained in the dq-axis current in the second period, and adjusts the detection gain of the first phase current to be gradually increased in a case where the current value of the secondary harmonic component contained in the dq-axis current in the first period is smaller than the current value of the secondary harmonic component contained in the dq-axis current in the second period.

3. The inverter control device according to claim 1,
wherein, in the first period, the gain adjustment unit sets a detection gain of a second phase current which is a phase current different from the first phase current among the output currents to a third gain value,
wherein, in the second period, the gain adjustment unit sets the detection gain of the second phase current to a fourth gain value which is larger than the third gain value, and
wherein the gain adjustment unit switches whether the detection gain of the second phase current to be increased or decreased according to a comparison result between the current value of the secondary harmonic component contained in the dq-axis current in the first period and the current value of the secondary harmonic component contained in the dq-axis current in the second period.

4. The inverter control device according to claim 3,
wherein, in a third period after the second period elapses, the gain adjustment unit adjusts the detection gain of the second phase current to be gradually increased in a case where the current value of the secondary harmonic component contained in the dq-axis current in the first period is larger than the current value of the secondary harmonic component contained in the dq-axis current in the second period, and adjusts the detection gain of the second phase current to be gradually decreased in a case where the current value of the secondary harmonic component contained in the dq-axis current in the first period is smaller than the current value of the secondary harmonic component contained in the dq-axis current in the second period (or a voltage command value of a secondary harmonic component contained in the dq-axis voltage command in the second period).

5. The inverter control device according to claim 3,
wherein, in a fourth period after the third period elapses, the gain adjustment unit sets the detection gain of the first phase current to a fifth gain value,
wherein, in a fifth period after the fourth period elapses, the gain adjustment unit sets the detection gain of the first phase current to a sixth gain value which is smaller than the fifth gain value,
wherein, in the fourth period, the gain adjustment unit sets a detection gain of a third phase current which is a phase current different from the first phase current and the second phase current among the output currents to a seventh gain value,
wherein, in the fifth period, the gain adjustment unit sets the detection gain of the third phase current to an eighth gain value which is larger than the seventh gain value, and
wherein, the gain adjustment unit switches whether the detection gains of the first phase current and the third phase current are increased or decreased according to a comparison result between the current value of the secondary harmonic component contained in the dq-axis current in the fourth period and the current value of the secondary harmonic component contained in the dq-axis current in the fifth period.

6. The inverter control device according to claim 5,
wherein, in a sixth period after the fifth period elapses, the gain adjustment unit performs at least either the adjustment of gradually decreasing the detection gain of the first phase current or the adjustment of gradually increasing the detection gain of the third phase current in a case where the current value of the secondary harmonic component contained in the dq-axis current in the fourth period is larger than the current value of the secondary harmonic component contained in the dq-axis current in the fifth period, and performs at least either the adjustment of gradually increasing the detection gain of the first phase current or the adjustment of gradually decreasing the detection gain of the third phase current in a case where the current value of the secondary harmonic component contained in the dq-axis current in the fourth period is smaller than the current value of the secondary harmonic component contained in the dq-axis current in the fifth period.

7. The inverter control device according to claim 5,
wherein, in a seventh period after the sixth period elapses, the gain adjustment unit sets the detection gain of the second phase current to a ninth gain value,
wherein, in an eighth period after the seventh period elapses, the gain adjustment unit sets the detection gain of the second phase current to a tenth gain value which is smaller than the ninth gain value,
wherein, in the seventh period, the gain adjustment unit sets the detection gain of the third phase current to an eleventh gain value,
wherein, in the eighth period, the gain adjustment unit sets the detection gain of the third phase current to a twelfth gain value which is larger than the eleventh gain value, and
wherein the gain adjustment unit switches whether the detection gains of the second phase current and the third phase current are increased or decreased according to a comparison result between the current value of the secondary harmonic component contained in the dq-axis current in the seventh period and the current value of the secondary harmonic component contained in the dq-axis current in the eighth period.

8. The inverter control device according to claim 7,
wherein, in a ninth period after the eighth period elapses, the gain adjustment unit performs at least either the adjustment of gradually decreasing the detection gain of the second phase or the adjustment of gradually increasing the detection gain of the third phase current in a case where the current value of the secondary harmonic component contained in the dq-axis current in the seventh period is larger than the current value of the secondary harmonic component contained in the dq-axis current in the eighth period, and performs at least either the adjustment of gradually increasing the detection gain of the second phase current or the adjustment of gradually decreasing the detection gain of the third phase current in a case where the current value of the secondary harmonic component contained in the dq-axis current in the seventh period is smaller than the current value of the secondary harmonic component contained in the dq-axis current in the eighth period.

9. The inverter control device according to claim 1,
wherein the first period and the second period are periods longer than a ½ cycle of a fundamental wave current contained in the output current.

10. The inverter control device according to claim 1,
wherein the gain adjustment unit adjusts the detection gain of each phase to be increased or decreased in a cycle equal to or longer than a ¼ cycle of a fundamental wave current contained in the output current.

11. An inverter control device which controls an output current to a 3-phase AC motor, comprising:
- a 3-phase/dq-axis conversion unit which converts the output current detected by a current sensor into a dq-axis current;
- a voltage command calculation unit which generates a dq-axis voltage command on the basis of the dq-axis current and a dq-axis current command; and
- a gain adjustment unit which adjusts a detection gain of the current sensor for each phase, wherein
  - in a case where a voltage command value of a secondary harmonic component contained in the dq-axis voltage command is equal to or more than a predetermined threshold, the gain adjustment unit corrects a gain of the current sensor such that a voltage value of the secondary harmonic component becomes less than the threshold
  - in a first period, the gain adjustment unit sets a detection gain of a first phase current which is any one phase current of the output currents to a first gain value,
  - in a second period after the first period elapses, the gain adjustment unit sets the detection gain of the first phase current to a second gain value which is smaller than the first gain value, and
  - the gain adjustment unit switches whether the detection gain of the first phase current to be increased or decreased according to a comparison result between the current value of the secondary harmonic component contained in the dg-axis current in the first period and the current value of the secondary harmonic component contained in the dq-axis current in the second period.

* * * * *